(12) United States Patent
Ravelli et al.

(10) Patent No.: US 12,475,900 B2
(45) Date of Patent: Nov. 18, 2025

(54) AUDIO QUANTIZER AND AUDIO DEQUANTIZER AND RELATED METHODS

(71) Applicant: Fraunhofer-Gesellschaft zur Förderung der angewandten Forschung e.V., Munich (DE)

(72) Inventors: Emmanuel Ravelli, Erlangen (DE); Goran Markovic, Erlangen (DE); Jan Frederik Kiene, Erlangen (DE); Franz Reutelhuber, Erlangen (DE); Stefan Döhla, Erlangen (DE); Eleni Fotopoulou, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 197 days.

(21) Appl. No.: 18/150,355

(22) Filed: Jan. 5, 2023

(65) Prior Publication Data

US 2023/0197090 A1    Jun. 22, 2023

Related U.S. Application Data

(63) Continuation of application No. PCT/EP2021/068527, filed on Jul. 5, 2021.

(30) Foreign Application Priority Data

Jul. 7, 2020  (EP) .................................. 20184555

(51) Int. Cl.
*G10L 19/008* (2013.01)
*G06F 3/16* (2006.01)
(Continued)

(52) U.S. Cl.
CPC ............ *G10L 19/008* (2013.01); *G06F 3/162* (2013.01); *G10L 19/035* (2013.01);
(Continued)

(58) Field of Classification Search
CPC ....... G10L 19/00; G10L 19/008; G10L 19/22; G10L 19/035; G10L 19/038;
(Continued)

(56) References Cited

U.S. PATENT DOCUMENTS

| | | | |
|---|---|---|---|
| 5,966,688 A | | 10/1999 | Nandkumar et al. |
| 6,148,283 A | * | 11/2000 | Das .......................... G10L 19/07 |
| | | | 704/E19.025 |

(Continued)

FOREIGN PATENT DOCUMENTS

| | | |
|---|---|---|
| EP | 0910067 B1 | 8/2003 |
| JP | 2011-527441 A | 10/2011 |

(Continued)

OTHER PUBLICATIONS

Ashish Varshney, "Office Action for IN Application No. 202337001541", Apr. 30, 2024, Intellectual Property India, India.

(Continued)

*Primary Examiner* — Daniel C Washburn
*Assistant Examiner* — Sean E Serraguard
(74) *Attorney, Agent, or Firm* — Bridgeway IP Law Group, PLLC; Jihun Kim

(57) ABSTRACT

An audio quantizer for quantizing a plurality of audio information items has: a first stage vector quantizer for quantizing the plurality of audio information items to determine a first stage vector quantization result and a plurality of intermediate quantized items corresponding to the first stage vector quantization result; a residual item determiner for calculating a plurality of residual items from the plurality of intermediate quantized items and the plurality of audio information items; and a second stage vector quantizer for quantizing the plurality of residual items to obtain a second stage vector quantization result, wherein the first stage vector quantization result and the second stage vector quan- (Continued)

(DECODER)

tization result are a quantized representation of the plurality of audio information items.

32 Claims, 28 Drawing Sheets

(51) Int. Cl.
*G10L 19/00* (2013.01)
*G10L 19/035* (2013.01)
*G10L 19/038* (2013.01)
*G10L 19/22* (2013.01)
*H04S 7/00* (2006.01)

(52) U.S. Cl.
CPC ............ *G10L 19/038* (2013.01); *G10L 19/22* (2013.01); *H04S 7/307* (2013.01); *G10L 2019/0005* (2013.01)

(58) Field of Classification Search
CPC ... G10L 2019/0005; G06F 3/00; G06F 3/162; H04S 7/00; H04S 7/307
See application file for complete search history.

(56) References Cited

U.S. PATENT DOCUMENTS

| | | | |
|---|---|---|---|
| 9,595,262 | B2 | 3/2017 | Markovic et al. |
| 10,504,531 | B2 | 12/2019 | Ramo et al. |
| 2003/0215013 | A1 | 11/2003 | Budnikov |
| 2005/0200505 | A1 | 9/2005 | Venkatesha Rao et al. |
| 2006/0013405 | A1 | 1/2006 | Oh et al. |
| 2007/0016427 | A1 | 1/2007 | Thumpudi et al. |
| 2009/0037190 | A1 | 2/2009 | Liebchen |
| 2010/0023323 | A1 | 1/2010 | Gournay et al. |
| 2010/0023325 | A1* | 1/2010 | Bessette .................. G10L 19/06 704/219 |
| 2011/0224994 | A1 | 9/2011 | Norvell et al. |
| 2012/0063604 | A1 | 3/2012 | Myburg et al. |
| 2013/0030817 | A1 | 1/2013 | Purnhagen et al. |
| 2013/0238346 | A1 | 9/2013 | Vasilache et al. |
| 2013/0332153 | A1 | 12/2013 | Markovic et al. |
| 2014/0067404 | A1* | 3/2014 | Baumgarte ........... G10L 19/008 704/E21.001 |
| 2016/0133266 | A1 | 5/2016 | Melkote et al. |
| 2016/0210975 | A1 | 7/2016 | Vasilache et al. |
| 2017/0372718 | A1 | 12/2017 | Choo |
| 2018/0197553 | A1 | 7/2018 | Ghido et al. |
| 2019/0272835 | A1 | 9/2019 | Adami et al. |
| 2021/0082441 | A1 | 3/2021 | Li et al. |
| 2023/0133513 | A1 | 5/2023 | Ravelli et al. |
| 2023/0238012 | A1 | 7/2023 | Nagisetty et al. |

FOREIGN PATENT DOCUMENTS

| | | | |
|---|---|---|---|
| JP | 2016-524191 A | 8/2016 | |
| RU | 2416129 C2 | 4/2011 | |
| RU | 2648588 C2 | 3/2018 | |
| RU | 2670377 C2 | 10/2018 | |
| TW | 201923748 A | 6/2019 | |
| WO | 2017/125544 A1 | 7/2017 | |
| WO | 2019/091904 A1 | 5/2019 | |
| WO | WO-2019091573 A1 * | 5/2019 | ........... G10L 19/002 |
| WO | 2020007719 A1 | 1/2020 | |

OTHER PUBLICATIONS

ISO/IEC 11172-3, "Information technology—Coding of moving pictures and associated audio for digital storage media at up to about 1,5 Mbit/s—Part 3: Audio", Aug. 1, 1993.
ISO/IEC 13818-7, "Information technology—Generic coding of moving pictures and associated audio information—Part 7: Advanced Audio Coding (AAC)", 2003.
ISO/IEC 23003-3, "Information technology—MPEG audio technologies—Part 3: Unified speech and audio coding", 2020.
BGPP TS 26.445, "Universal Mobile Telecommunications System (UMTS); LTE; Codec for Enhanced Voice Services (EVS); Detailed algorithmic description", V13.2.0, Aug. 2016.
A. Biswas, "Advances in Perceptual Stereo Audio Coding Using Linear Prediction Techniques", Eindhoven: Technical University of Eindhoven, 2007.
ETSI TS 103 634, "Digital Enhanced Cordless Telecommunications (DECT); Low Complexity Communication Codec plus (LC3plus)" ETSI Draft Specification No. V1.1.1, Aug. 2019.
ETSI TS 103 634, "Digital Enhanced Cordless Telecommunications (DECT); Low Complexity Communication Codec plus (LC3plus)", No. V1.1.3, (Apr. 15, 2020), pp. 1-151, Apr. 15, 2020.
P.A. Volkov, "Office Action for RU Application No. 2023102503", Jun. 9, 2023, Rospatent, Russia.
"Office Action for JP Application No. 2023-501297", Mar. 12, 2024, JPO, Japan.
P.A. Volkov, "Office Action for RU Application No. 2023102502", Rospatent, Russia, Apr. 19, 2023.
"Office Action for Kprean Application No. 10-2023-7004231", Jul. 17, 2025, KIPO, Republic of Korea.
ISO/IEC, "Information technology—Coding of audio-visual objects, Part 3: Audio", 14496-3:2009, Sep. 1, 2009, Switzerland.

* cited by examiner

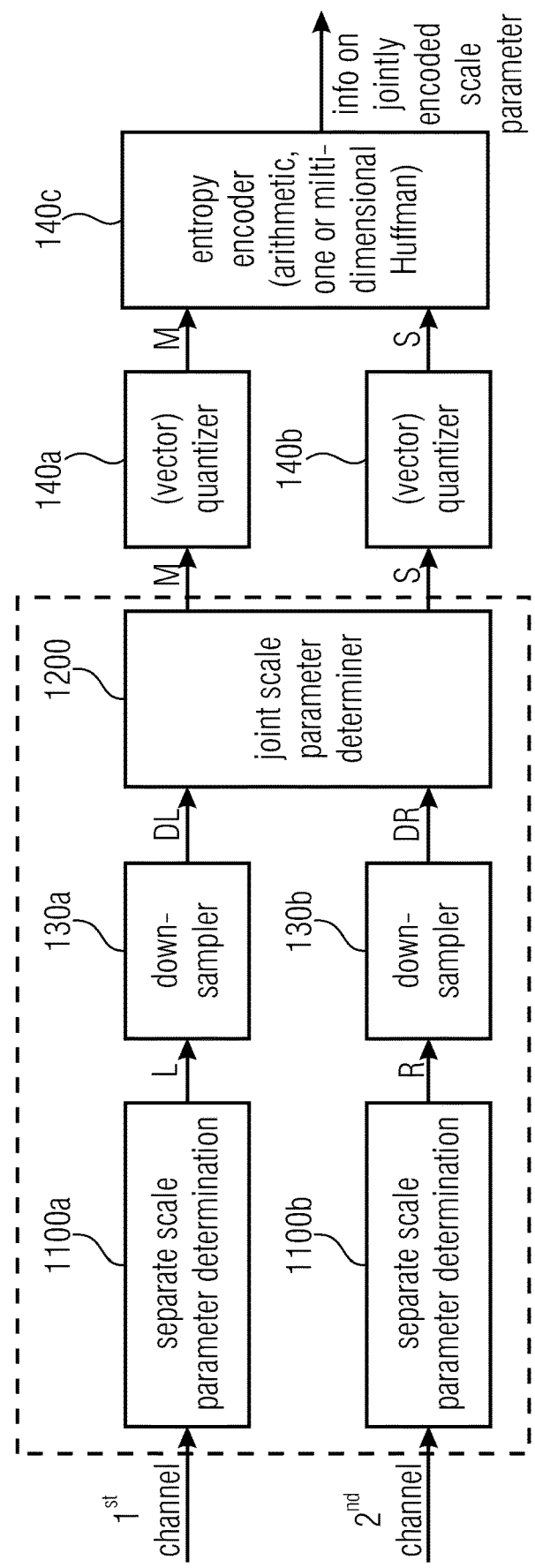
Fig. 3a (ENCODER)

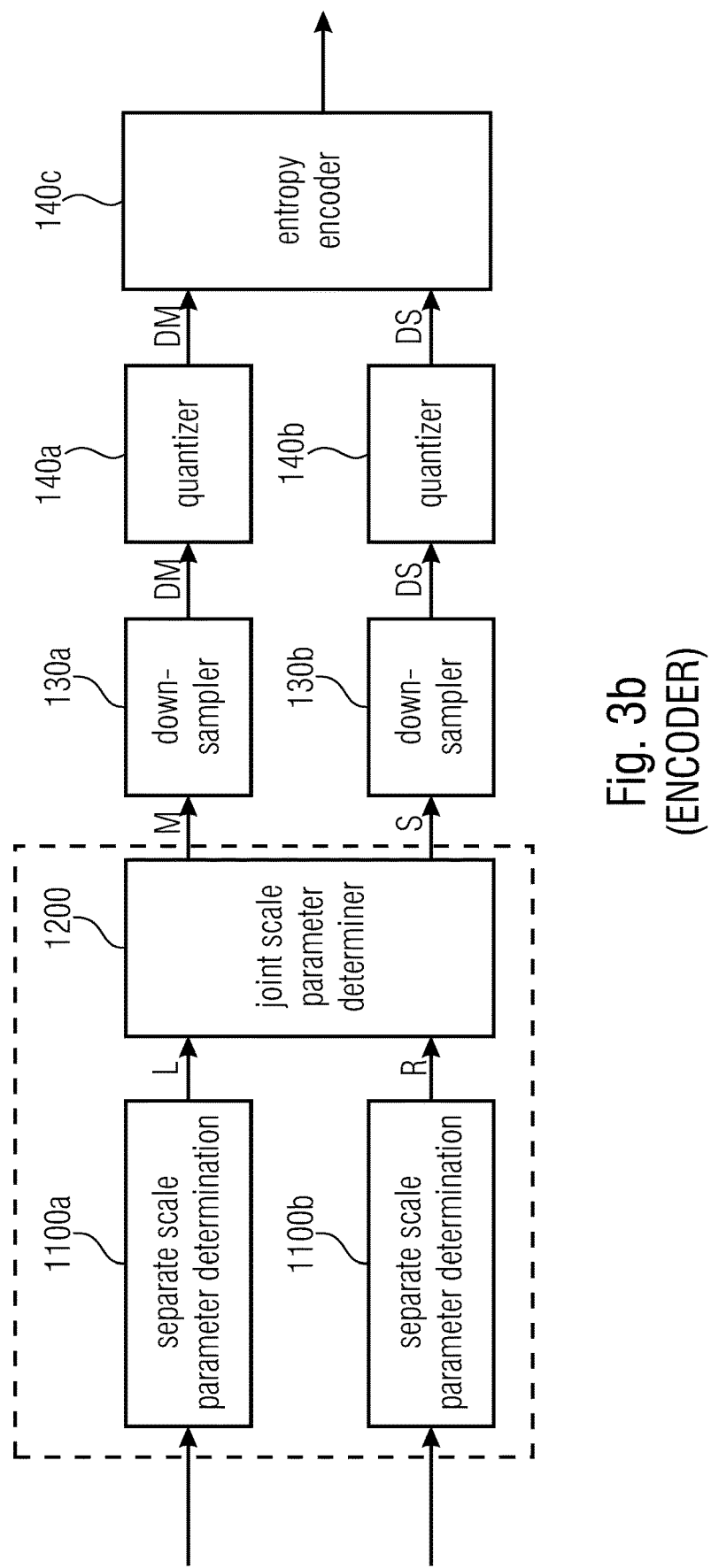
Fig. 3b (ENCODER)

(DECODER OR LOCAL DECODER IN ENCODER)

(DECODER OR LOCAL DECODER IN ENCODER)

(FOR SEPARATE SCALE PARAMETERS L, R
OR JOINT SCALE PARAMETERS M)

(FOR JOINT SCALE PARAMETERS S)

(DECODER)

(ENCODER)

(ENCODER)

(DECODER)

(SCALE FACTOR CALCULATOR)

(DOWNSAMPLER)

(SPECTRAL PROCESSOR)

AUDIO QUANTIZER AND AUDIO DEQUANTIZER AND RELATED METHODS

CROSS-REFERENCE TO RELATED APPLICATIONS

This application is a continuation of copending International Application No. PCT/EP2021/068527, filed Jul. 5, 2021, which is incorporated herein by reference in its entirety, and additionally claims priority from European Application No. 20184555.9, filed Jul. 7, 2020, which is also incorporated herein by reference in its entirety.

BACKGROUND OF THE INVENTION

The present invention is related to audio signal processing an can e.g. be applied in an MDCT-stereo processing of e.g. IVAS.

Furthermore, the present invention can be applied in Joint Coding of the Stereo Spectral Noise Shaping Parameters Spectral noise shaping shapes the quantization noise in the frequency domain such that the quantization noise is minimally perceived by the human ear and therefore, the perceptual quality of the decoded output signal can be maximized.

Spectral noise shaping is a technique used in most state-of-the-art transform-based audio codecs.

Advanced Audio Coding (AAC)

In this approach [1] [2], the MDCT spectrum is partitioned into a number of non-uniform scale factor bands. For example, at 48 KHz, the MDCT has 1024 coefficients and it is partitioned into 49 scale factor bands. In each band, a scale factor is used to scale the MDCT coefficients of that band. A scalar quantizer with constant step size is then employed to quantize the scaled MDCT coefficients. At the decoder-side, inverse scaling is performed in each band, shaping the quantization noise introduced by the scalar quantizer.

The 49 scale factors are encoded into the bitstream as side-information. Usually, a significantly high number of bits are entailed for encoding the scale factors, due to the relatively high number of scale factors and the entailed high precision. This can become a problem at low bitrate and/or at low delay.

MDCT-Based TCX

In an MDCT-based TCX, a transform-based audio codec used in the MPEG-D USAC [3] and 3GPP EVS [4] standards, spectral noise shaping is performed with the help of an LPC-based perceptual filters, similar perceptual filter as used in recent ACELP-based speech codecs (e.g. AMR-WB).

In this approach, a set of 16 Linear Prediction Coefficients (LPCs) is first estimated on a pre-emphasized input signal. The LPCs are then weighted and quantized. The frequency response of the weighted and quantized LPCs is then computed in 64 uniformly spaced bands. The MDCT coefficients are then scaled in each band using the computed frequency response. The scaled MDCT coefficients are then quantized using a scalar quantizer with a step size controlled by a global gain. At the decoder, inverse scaling is performed in every 64 bands, shaping the quantization noise introduced by the scalar quantizer.

This approach has a clear advantage over the AAC approach: it uses the encoding of only 16 (LPC)+1 (global-gain) parameters as side-information (as opposed to the 49 parameters in AAC). Moreover, 16 LPCs can be efficiently encoded with a small number of bits by employing an LSF representation and a vector quantizer. Consequently, the approach of MDCT-based TCX uses less side-information bits as the approach of AAC, which can make a significant difference at low bitrate and/or low delay.

Improved MDCT-Based TCX (Psychoacoustic LPC)

An improved MDCT-based TCX system is published in [5]. In this new approach, the autocorrelation (for estimating the LPCs) is no more performed in the time-domain but it is instead computed in the MDCT domain using an inverse transform of the MDCT coefficient energies. This allows using a non-uniform frequency scale by simply grouping the MDCT coefficients into 64 non-uniform bands and computing the energy of each band. It also reduces the complexity entailed to compute the autocorrelation.

New Spectral Noise Shaping (SNS)

In an improved technique for spectral noise shaping as described in [6] and implemented in Low Complexity Communication Codec (LC3/LC3plus), low bitrate without substantial loss of quality can be obtained by scaling, on the encoder-side, with a higher number of scale factors and by downsampling the scale parameters on the encoder-side into a second set of 16 scale parameters (SNS parameters). Thus, a low bitrate side information on the one hand and, nevertheless, a high-quality spectral processing of the audio signal spectrum due to fine scaling on the other hand are obtained.

Stereo Linear Prediction (SLP)

In the thesis described in [7], a set of linear prediction coefficients are computed not only by considering the inter-frame prediction but also considering the prediction from one channel to another. The 2-dimensional set of coefficients calculated are then quantized and encoded using similar techniques as for single channel LP, but without considering quantization of the residual in the context of the thesis. However, implementation described comes with high delay and significant complexity and therefore, it is rather unsuitable for a real-time application that uses low delay, e.g. for communication systems.

In a stereo system like the MDCT-based system that is described in [8], preprocessing of the discrete L R channel signals is performed in order to scale the spectra using frequency domain noise-shaping to the "whitened domain". Then, joint stereo processing is performed to quantize and code the whitened spectra in an optimal fashion.

The scaling parameters for the spectral noise shaping techniques described before are quantized encoded independently for each channel. This results in a double bitrate of side information needed to be sent to the decoder through the bitstream.

It is an object of the present invention to provide an improved or more efficient coding/decoding concept.

SUMMARY

According to an embodiment, an audio quantizer for quantizing a plurality of audio information items may have: a first stage vector quantizer for quantizing the plurality of audio information items to determine a first stage vector quantization result and a plurality of intermediate quantized items corresponding to the first stage vector quantization result; a residual item determiner for calculating a plurality of residual items from the plurality of intermediate quantized items and the plurality of audio information items; and a second stage vector quantizer for quantizing the plurality of residual items to obtain a second stage vector quantization result, wherein the first stage vector quantization result and the second stage vector quantization result are a quantized representation of the plurality of audio information items.

According to another embodiment, an audio dequantizer for dequantizing a quantized plurality of audio information items may have: a first stage vector dequantizer for dequantizing a first stage vector quantization result included in the quantized plurality of audio information items to obtain a plurality of intermediate quantized audio information items; a second stage vector dequantizer for dequantizing a second stage vector quantization result included in the quantized plurality of audio information items to obtain a plurality of residual items; and a combiner for combining the plurality of intermediate quantized information items and the plurality of residual items to obtain a dequantized plurality of audio information items.

According to another embodiment, a method of quantizing a plurality of audio information items may have the steps of: first stage vector quantizing the plurality of audio information items to determine a first stage vector quantization result and a plurality of intermediate quantized items corresponding to the first stage vector quantization result; calculating a plurality of residual items from the plurality of intermediate quantized items and the plurality of audio information items; and second stage vector quantizing the plurality of residual items to obtain a second stage vector quantization result, wherein the first stage vector quantization result and the second stage vector quantization result are a quantized representation of the plurality of audio information items.

According to still another embodiment, a method of dequantizing a quantized plurality of audio information items may have the steps of: first stage vector dequantizing a first stage vector quantization result included in the quantized plurality of audio information items to obtain a plurality of intermediate quantized audio information items; second stage vector dequantizing a second stage vector quantization result included in the quantized plurality of audio information items to obtain a plurality of residual items; and combining the plurality of intermediate quantized information items and the plurality of residual items to obtain a dequantized plurality of audio information items.

Another embodiment may have a non-transitory digital storage medium having stored thereon a computer program for performing a method of quantizing a plurality of audio information items having the steps of: first stage vector quantizing the plurality of audio information items to determine a first stage vector quantization result and a plurality of intermediate quantized items corresponding to the first stage vector quantization result; calculating a plurality of residual items from the plurality of intermediate quantized items and the plurality of audio information items; and second stage vector quantizing the plurality of residual items to obtain a second stage vector quantization result, wherein the first stage vector quantization result and the second stage vector quantization result are a quantized representation of the plurality of audio information items, when said computer program is run by a computer.

Another embodiment may have a non-transitory digital storage medium having stored thereon a computer program for performing a method of dequantizing a quantized plurality of audio information items having the steps of: first stage vector dequantizing a first stage vector quantization result included in the quantized plurality of audio information items to obtain a plurality of intermediate quantized audio information items; second stage vector dequantizing a second stage vector quantization result included in the quantized plurality of audio information items to obtain a plurality of residual items; and combining the plurality of intermediate quantized information items and the plurality of residual items to obtain a dequantized plurality of audio information items, when said computer program is run by a computer.

The present invention is based on the finding that bitrate savings can be obtained for cases, where the L, R signals or, generally, two or more channels of a multi-channel signal are correlated. In such a case, the extracted parameters for both channels are rather similar. Therefore, a joint quantization encoding of the parameters is applied which results in a significant saving of bitrate. This saving of bitrate can be used in several different directions. One direction can be to spend the saved bitrate on the coding of the core signal so that the overall perceptual quality of the stereo or multi-channel signal is improved. Another direction is to reach a lower overall bitrate in a case where the coding of the core signal and, therefore, the overall perceptual quality is not improved, but is left at the same quality.

In an embodiment, in accordance with a first aspect, an audio encoder comprises a scale parameter calculator for calculating a first group of jointly encoded scale parameters and a second group of jointly encoded scale parameters for a first set of scale parameters for a first channel of the multi-channel audio signal and for a second set of scale parameters for a second channel of the multi-channel audio signal. The audio encoder additionally comprises a signal processor for applying the first set of scale parameters to the first channel and for applying the second set of scale parameters to the second channel of the multi-channel audio signal. The signal processor additionally derives multi-channel audio data from the first and second channel data obtained by the application of the first and second sets of scale parameters, respectively. The audio encoder additionally has an encoded signal former for using the multi-channel audio data and the information on the first group of jointly encoded scale parameters and the information on the second group of jointly encoded scale parameters to obtain an encoded multi-channel audio signal.

Advantageously, the scale parameter calculator is configured to be adaptive so that, for each frame or sub-frame of the multi-channel audio signal, a determination is made, whether jointly encoding scale parameters or separately encoding scale parameters is to be performed. In a further embodiment, this determination is based on a similarity analysis between the channels of the multi-channel audio signal under consideration. Particularly, the similarity analysis is done by calculating an energy of the jointly encoded parameters and, particularly, an energy of one set of scale parameters from the first group and the second group of jointly encoded scale parameters. Particularly, the scale parameter calculator calculates the first group as a sum between corresponding first and second scale parameters and calculates the second group as a difference between the first and second corresponding scale parameters. Particularly, the second group and, advantageously, the scale parameters that represent the difference, are used for the determination of the similarity measure in order to decide, whether jointly encoding the scale parameters or separately encoding the scale parameters is to be performed. This situation can be signaled via a stereo or multi-channel flag.

Furthermore, it is of advantage to specifically quantize the scale parameters with a two-stage quantization process. A first stage vector quantizer quantizes the plurality of scale parameters or, generally, audio information items to determination a first stage vector quantization result and to determinate a plurality of intermediate quantizer items corresponding to the first stage vector quantization result. Furthermore, the quantizer comprises a residual item determiner for calculating a plurality of residual items from the plurality of intermediate quantized items and the plurality of audio information items. Furthermore, a second stage vector quantizer is provided for quantizing the plurality of residual items to obtain a second stage vector quantization result, wherein the first stage vector quantization result and the second stage vector quantization result together represent the quantized representation of the plurality of audio information items which are, in one embodiment, the scale parameters. Particularly, the audio information items can either be jointly encoded scale parameters or separately encoded scale parameters. Furthermore, other audio information items can be any audio information items that are useful for vector quantization. Particularly, apart from scale parameters or scale factors as specific audio information items, other audio information items useful for the vector-quantized are spectral values such as MDCT or FFT lines. Even further audio information items that can be vector-quantized are time domain audio values such as audio sampling values or groups of time domain audio samples or groups of spectral domain frequency lines or LPC data or other envelope data be it a spectral or a time envelope data representation.

In an implementation, the residual item determiner calculates, for each residual item, a difference between corresponding audio information items such as a scale parameter and a corresponding intermediate quantized item such as a quantized scale parameter or scale factor. Furthermore, the residual item determiner is configured to amplify or weight, for each residual item, a difference between a corresponding audio information item and a corresponding intermediate quantized item so that the plurality of residual items are greater than the corresponding difference or to amplify or weigh the plurality of audio information items and/or the plurality of intermediate quantized items before calculating a difference between the amplified items to obtain the residual items. By this procedure, a useful control of the quantization error can be made. Particularly, when the second group of audio information items such as the different scale parameters are quite small, which is typically the case, when the first and the second channels are correlated to each other so that joint quantization has been determined, the residual items are typically quite small. Therefore, when the residual items are amplified, the result of the quantization will comprise more values that are not quantized to 0 compared to a case, where this amplification has not been performed. Therefore, an amplification on the encoder or quantization side may be useful.

This is particularly the case when as in another embodiment, the quantization of the jointly encoded second group of scale parameters, such as the difference scale parameters, is performed. Due to the fact that these side scale parameters are anyway small, a situation may arise that, without the amplification, most of the different scale parameters are quantized to 0 anyway. Therefore, in order to avoid this situation which might result in a loss of stereo impression and, therefore, in a loss of psychoacoustic quality, the amplification is performed so that only a small amount or almost no side scale parameters are quantized to 0. This, of course, reduces the savings in bitrate. Due to this fact, however, the quantized residual data items are anyway only small, i.e., result in quantization indexes that represent small values and the bitrate increase is not too high, since quantization indexes for small values are encoded more efficiently than quantization indexes for higher values. This can even be enhanced by additionally performing an entropy coding operation that even more favors small quantization indexes with respect to bitrate over higher quantization indexes.

In another embodiment, the first stage vector quantizer is a vector quantizer having a certain codebook and the second stage vector quantizer is an algebraic vector quantizer resulting, as a quantization index, in a codebook number, a vector index in a base codebook and a Voronoi index. Advantageously, both the vector quantizer and the algebraic vector quantizer are configured to perform a split level vector quantization where both quantizers have the same split level procedure. Furthermore, the first and the second stage vector quantizers are configured in such a way that the number of bits and, therefore, the precision of the first stage vector quantizer result is greater than the number of bits or the precision of the second stage vector quantizer result, or the number of bits and, therefore, the precision of the first stage vector quantizer result is different from the number of bits or the precision of the second stage vector quantizer result. In other embodiments, the first stage vector quantizer has a fixed bitrate and the second stage vector quantizer has a variable bitrate. Thus, in general, the characteristics of the first stage and the second stage vector quantizers are different from each other.

In an embodiment of an audio decoder for decoding an encoded audio signal in accordance with the first aspect, the audio decoder comprises a scale parameter decoder for decoding the information on the jointly encoded scale parameters. Additionally, the audio decoder has a signal processor, where the scale parameter decoder is configured to combine a jointly encoded scale parameter of the first group and the jointly encoded scale parameter of the second group using different combination rules to obtain the scale parameters for the first set of scale parameters and the scale parameters for the second set of scale parameters that are then used by the signal processor.

In accordance with the further aspect of the present invention, an audio dequantizer is provided that comprises a first stage vector dequantizer, a second stage vector dequantizer and a combiner for combining the plurality of intermediate quantizer information items obtained by the first stage vector dequantizer and the plurality of residual items obtained from the second stage vector dequantizer to obtain a dequantized plurality of audio information items.

The first aspect of joint scale parameter coding can be combined with the second aspect related to the two stage vector quantization. On the other hand, the aspect of the two stage vector quantization can be applied to separately encoded scale parameters such as scale parameters for a left channel and a right channel or can be applied to the mid-scale parameters as another kind of audio information item. Thus, the second aspect of two-stage vector quantization can be applied independent from the first aspect or together with the first aspect.

Subsequently, embodiments of the present invention are summarized.

In a stereo system where transform-based (MDCT) coding is used, the scaling parameters that are extracted from any of the techniques described in the introductory section for performing the frequency-domain noise shaping in the encoder side, need to be quantized and coded to be included as side-information to the bitstream. Then in the decoder side, scaling parameters are decoded and used to scale the spectrum of each channel to shape quantization noise in a manner that is minimally perceived.

Independent coding of spectral noise shaping parameters of the two channels: left and right can be applied.

Spectral noise shaping scaling parameters are coded adaptively either independently or jointly, depending on the degree of correlation between the two channels. In summary:

A Mid/Side representation of the scaling parameters is computed

Energy of the Side parameters is calculated.

Depending on the energy—indicating the degree of correlation between the two signals—the parameters are coded:

Independently: like the current approach, using for each channel e.g. a two-stage vector quantization (VQ)

Jointly:

The mid vector is encoded using e.g. a two-stage vector quantization. The side vector is encoded using a coarser quantization scheme, e.g. by assuming that the first stage VQ output comprises quantized values of zero and applying only the second stage quantization e.g. an algebraic vector quantizer (AVQ)

One additional bit is used to signal whether the quantized side vector is zero or not.

An additional one bit to signal whether the two channels are coded jointly or independently is send to the decoder In FIG. 24 an MDCT-stereo based encoder implementation is shown as described in detail in [8]. An essential part of the stereo system described in [8] is that the stereo processing is performed on the "whitened" spectra. Therefore, each channel undergoes a pre-processing, where for each frame, after windowing, the time domain block is transformed to the MDCT-domain, then Temporal Noise Shaping (TNS) is applied adaptively, either before or after the Spectral Noise Shaping (SNS) depending on the signal characteristics. After spectral noise shaping, joint stereo processing is performed, namely an adaptive band-wise M-S, L/R decision, to quantize and code the whitened spectra coefficients in an efficient manner. As a next step, stereo Intelligent Gap Filling (IGF) analysis is done and respective information bits are written to the bitstream. Finally, the processed coefficients are quantized and coded. Similar reference numbers as in FIG. 1 have been added. The calculation and processing of the scaling factors takes place in the blocks SNS between the two TNS blocks in FIG. 24. The block window illustrates a windowing operation. The block MCLT stands for modified complex lapped transform. The block MDCT stands for modified discrete cosine transform. The block power spectrum stands for the calculation of a power spectrum. The block switching decision stands for an analysis of the input signal to determine block lengths to be used for windowing. The block TNS stands for temporal noise shaping and this feature is performed either before or after the scaling of the spectrum in the block SNS.

In the MDCT-stereo codec implementation described in [7], at the encoder side preprocessing of the discrete L-R channels is performed in order to scale the spectra using frequency domain noise-shaping to the "whitened domain". Then, joint stereo processing is performed to quantize and code the whitened spectra in an optimal fashion.

At the decoder side, as depicted in FIG. 25 and described in [8], the encoded signal is decoded and inverse quantization and inverse stereo processing is performed. Then, the spectrum of each channel is "de-whitened" by the spectral noise shaping parameters that are retrieved from the bitstream. Similar reference numbers as in FIG. 1 have been added. The decoding and processing of the scale factors takes place in the blocks 220 in FIG. 25. The blocks indicated in the figure are related to the blocks in the encoder in FIG. 24 and typically perform the corresponding inverse operations. The block "window and OLA" performs a synthesis windowing operation and a subsequent overlap and add operation to obtain the time domain output signals L and R.

The frequency-domain noise shaping (FDNS) applied in the system in [8] is here replaced with SNS as described in [6]. A block diagram of the processing path of SNS is shown in the block diagrams of FIG. 1 and FIG. 2 for the encoder and the decoder respectively.

Advantageously, a low bitrate without substantial loss of quality can be obtained by scaling, on the encoder-side, with a higher number of scale factors and by downsampling the scale parameters on the encoder-side into a second set of scale parameters or scale factors, where the scale parameters in the second set that is then encoded and transmitted or stored via an output interface is lower than the first number of scale parameters. Thus, a fine scaling on the one hand and a low bitrate on the other hand is obtained on the encoder-side.

On the decoder-side, the transmitted small number of scale factors is decoded by a scale factor decoder to obtain a first set of scale factors where the number of scale factors or scale parameters in the first set is greater than the number of scale factors or scale parameters of the second set and, then, once again, a fine scaling using the higher number of scale parameters is performed on the decoder-side within a spectral processor to obtain a fine-scaled spectral representation.

Thus, a low bitrate on the one hand and, nevertheless, a high quality spectral processing of the audio signal spectrum on the other hand are obtained.

Spectral noise shaping as done in embodiments is implemented using only a very low bitrate. Thus, this spectral noise shaping can be an essential tool even in a low bitrate transform-based audio codec. The spectral noise shaping shapes the quantization noise in the frequency domain such that the quantization noise is minimally perceived by the human ear and, therefore, the perceptual quality of the decoded output signal can be maximized.

Embodiments rely on spectral parameters calculated from amplitude-related measures, such as energies of a spectral representation. Particularly, band-wise energies or, generally, band-wise amplitude-related measures are calculated as the basis for the scale parameters, where the bandwidths used in calculating the band-wise amplitude-related measures increase from lower to higher bands in order to approach the characteristic of the human hearing as far as possible. Advantageously, the division of the spectral representation into bands is done in accordance with the well-known Bark scale.

In further embodiments, linear-domain scale parameters are calculated and are particularly calculated for the first set of scale parameters with the high number of scale parameters, and this high number of scale parameters is converted into a log-like domain. A log-like domain is generally a domain, in which small values are expanded and high values are compressed. Then, the downsampling or decimation operation of the scale parameters is done in the log-like domain that can be a logarithmic domain with the base 10, or a logarithmic domain with the base 2, where the latter is of advantage for implementation purposes. The second set of scale factors is then calculated in the log-like domain and, advantageously, a vector quantization of the second set of scale factors is performed, wherein the scale factors are in the log-like domain. Thus, the result of the vector quantization indicates log-like domain scale parameters. The second set of scale factors or scale parameters has, for example, a number of scale factors half of the number of scale factors of the first set, or even one third or yet even more advantageously, one fourth. Then, the quantized small number of scale parameters in the second set of scale parameters is brought into the bitstream and is then transmitted from the encoder-side to the decoder-side or stored as an encoded audio signal together with a quantized spectrum that has also been processed using these parameters, where this processing additionally involves quantization using a global gain. Advantageously, however, the encoder derives from these quantized log-like domain second scale factors once again a set of linear domain scale factors, which is the third set of scale factors, and the number of scale factors in the third set of scale factors is greater than the second number and is advantageously even equal to the first number of scale factors in the first set of first scale factors. Then, on the encoder-side, these interpolated scale factors are used for processing the spectral representation, where the processed spectral representation is finally quantized and, in any way entropy-encoded, such as by Huffman-encoding, arithmetic encoding or vector-quantization-based encoding, etc.

In the decoder that receives an encoded signal having a low number of spectral parameters together with the encoded representation of the spectral representation, the low number of scale parameters is interpolated to a high number of scale parameters, i.e., to obtain a first set of scale parameters where a number of scale parameters of the scale factors of the second set of scale factors or scale parameters is smaller than the number of scale parameters of the first set, i.e., the set as calculated by the scale factor/parameter decoder. Then, a spectral processor located within the apparatus for decoding an encoded audio signal processes the decoded spectral representation using this first set of scale parameters to obtain a scaled spectral representation. A converter for converting the scaled spectral representation then operates to finally obtain a decoded audio signal that is advantageously in the time domain.

Further embodiments result in additional advantages set forth below. In embodiments, spectral noise shaping is performed with the help of 16 scaling parameters similar to the scale factors used in [6] or [8] or [1]. These parameters are obtained in the encoder by first computing the energy of the MDCT spectrum in 64 non-uniform bands (similar to the 64 non-uniform bands of known technology 3), then by applying some processing to the 64 energies (smoothing, pre-emphasis, noise-floor, log-conversion), then by down-sampling the 64 processed energies by a factor of 4 to obtain 16 parameters which are finally normalized and scaled. These 16 parameters are then quantized using vector quantization (using similar vector quantization as used in known technology 2/3). The quantized parameters are then interpolated to obtain 64 interpolated scaling parameters. These 64 scaling parameters are then used to directly shape the MDCT spectrum in the 64 non-uniform bands. Similar to known technology 2 and 3, the scaled MDCT coefficients are then quantized using a scalar quantizer with a step size controlled by a global gain.

In a further embodiment, the information on the jointly encoded scale parameters for one of the two groups such as the second group advantageously related to the side scale parameters does not comprise quantization indices or other quantization bits but only information such as a flag or single bit indicating that the scale parameters for the second group are all zero for a portion or frame of the audio signal. This information is determined by the encoder by an analysis or by other means and is used by the decoder to synthesize the second group of scale parameters based on this information such as by generating zero scale parameters for the time portion or frame of the audio signal or is used by the decoder to calculate the first and the second set of scale parameters only using the first group of jointly encoded scale parameters.

In a further embodiment, the second group of jointly encoded scale parameters is quantized only using the second quantization stage of the two stage quantizer, which may be a variable rate quantizer stage. In this case, it is assumed that the first stage results in all zero quantized values, so that only the second stage is effective. In an even further embodiment, only the first quantization stage of the two stage quantizer, which may be a fixed rate quantization stage, is applied and the second stage is not used at all for a time portion or frame of the audio signal. This case corresponds to a situation, where all the residual items are assumed to be zero or smaller than the smallest or first quantization step size of the second quantization stage.

BRIEF DESCRIPTION OF THE DRAWINGS

Embodiments of the present invention are subsequently discussed with respect to the accompanying drawings, in which:

FIG. 3a illustrates another encoder in accordance with the first aspect;

FIG. 3b illustrates another implementation of an encoder in accordance with the first aspect;

DETAILED DESCRIPTION OF THE INVENTION

Figure 8A:
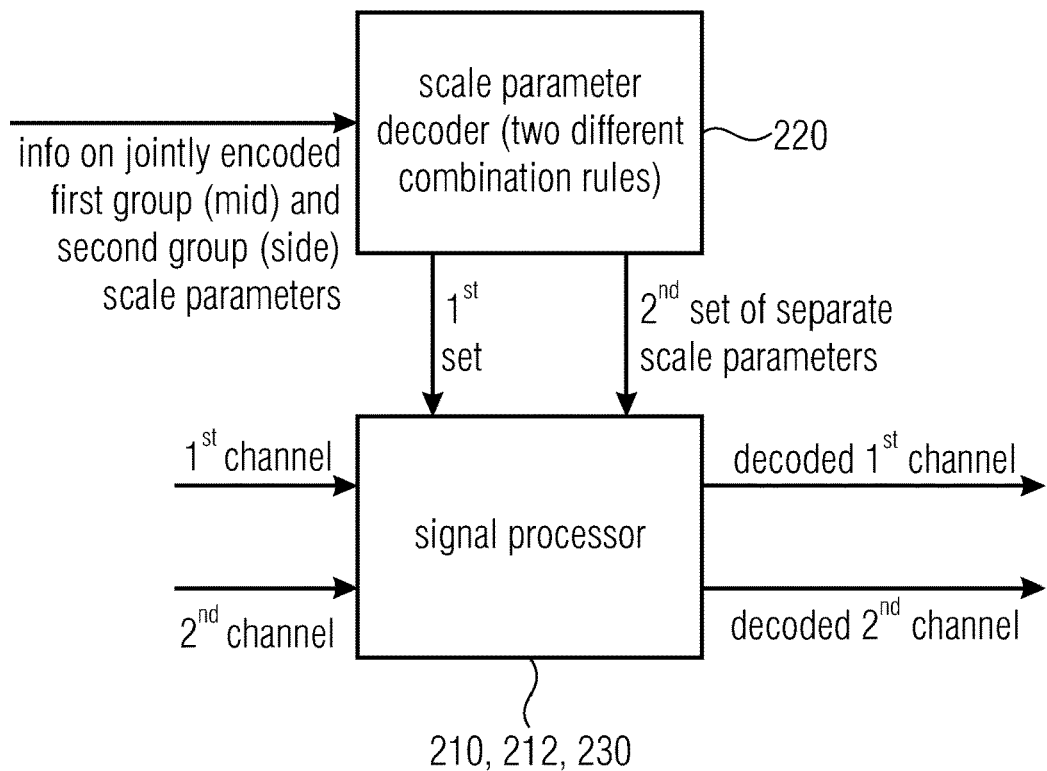
FIG. 8a illustrates a decoder in accordance with a first aspect of the present invention.

FIG. 8 illustrates an audio decoder for decoding an encoded audio signal comprising multi-channel audio data comprising data for two or more audio channels, and information on jointly encoded scale parameters. The decoder comprises a scale parameter decoder 220 and a signal processor 210, 212, 213 illustrated in FIG. 8a as a single item. The scale parameter decoder 220 receives the information on the jointly encoded first group and second group of scale parameters where, advantageously, the first group of scale parameters are mid scale parameters and the second group of scale parameters are side scale parameters. Advantageously, the signal processor receives the first channel representation of the multi-channel audio data and the second channel representation of the multi-channel audio data and applies the first set of scale parameters to a first channel representation derived from the multi-channel audio data and applies the second set of scale parameters to the second channel representation derived from the multi-channel audio data to obtain the first channel and the second channel of the decoded audio signal at the output of block 210, 212, 213 of FIG. 8a. Advantageously, the jointly encoded scale parameters comprise information on the first group of jointly encoded scale parameters such as mid-scale parameters and information on a second group of jointly encoded scale parameters such as side scale parameters. Furthermore, the scale parameter decoder 220 is configured to combine a jointly encoded scale parameter of the first group and a jointly encoded scale parameter of the second group using a first combination rule to obtain a scale parameter of the first set of scale parameters and to combine the same both jointly encoded scale parameters of the first and second groups using a second combination rule which is different from the first combination rule to obtain a scale parameter of the second set of scale parameters. Thus, the scale parameter decoder 220 applies two different combination rules.

In an embodiment, the two different combination rules are a plus or addition combination rule on the one hand and a subtraction or difference combination rule on the other hand. However, in other embodiments, the first combination rule can be a multiplication combination rule and the second combination rule can be a quotient or division combination rule. Thus, all other pairs of combination rules are useful as well depending on the representation of the corresponding scale parameters of the first group and the second group or of the first set and the second set of scale parameters.

Figure 8B:
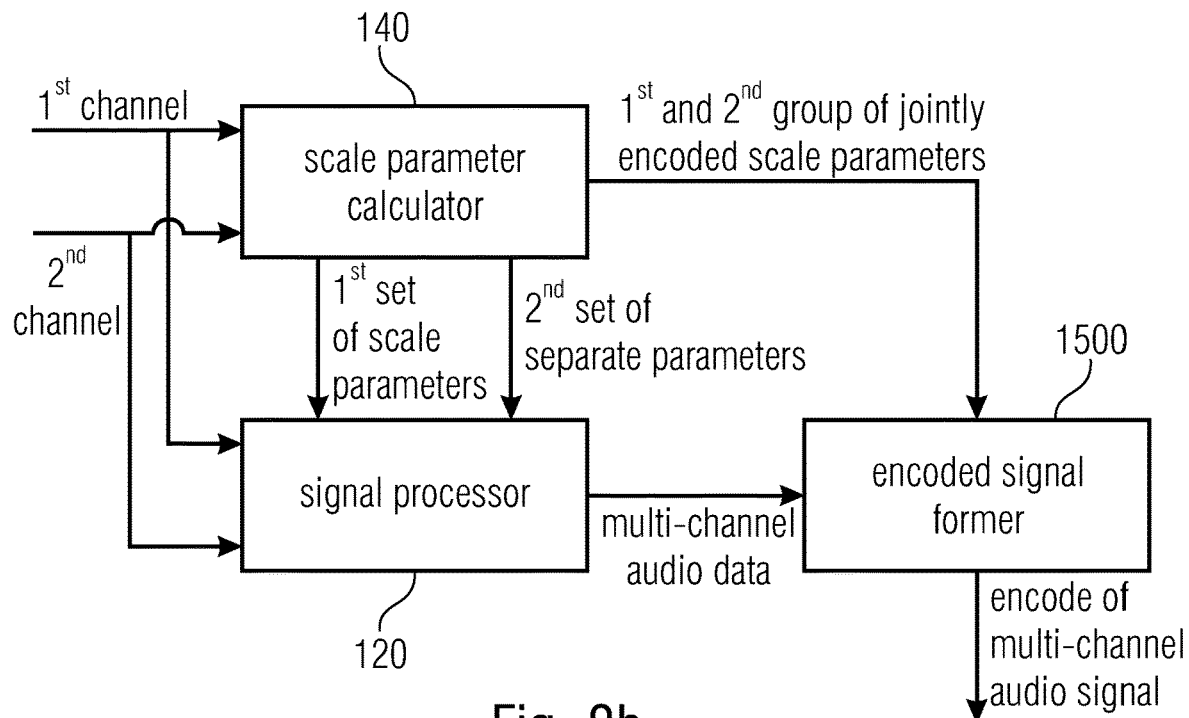
FIG. 8b illustrates an encoder in accordance with the first aspect of the present invention.

FIG. 8b illustrates a corresponding audio encoder for encoding a multi-channel audio signal comprising two or more channels. The audio encoder comprises a scale parameter calculator 140, a signal processor 120 and an encoded signal former 1480, 1500. The scale parameter calculator 140 is configured for calculating a first group of jointly encoded scale parameters and a second group of jointly encoded scale parameters from a first set of scale parameters for a first channel of the multi-channel audio signal and from a second set of scale parameters for a second channel of the multi-channel audio signal. Additionally, the signal processor is configured for applying the first set of scale parameters to the first channel of the multi-channel audio signal and for applying the second set of scale parameters to the second channel of the multi-channel audio signal for deriving encoded multi-channel audio data. The multi-channel audio data are derived from the scaled first and second channels and the multi-channel audio data are used by the encoded signal former 1480, 1500 together with the information on the first and the second group of jointly encoded scale parameters to obtain the encoded multi-channel audio signal at the output of block 1500 in FIG. 8b.

Figure 1:
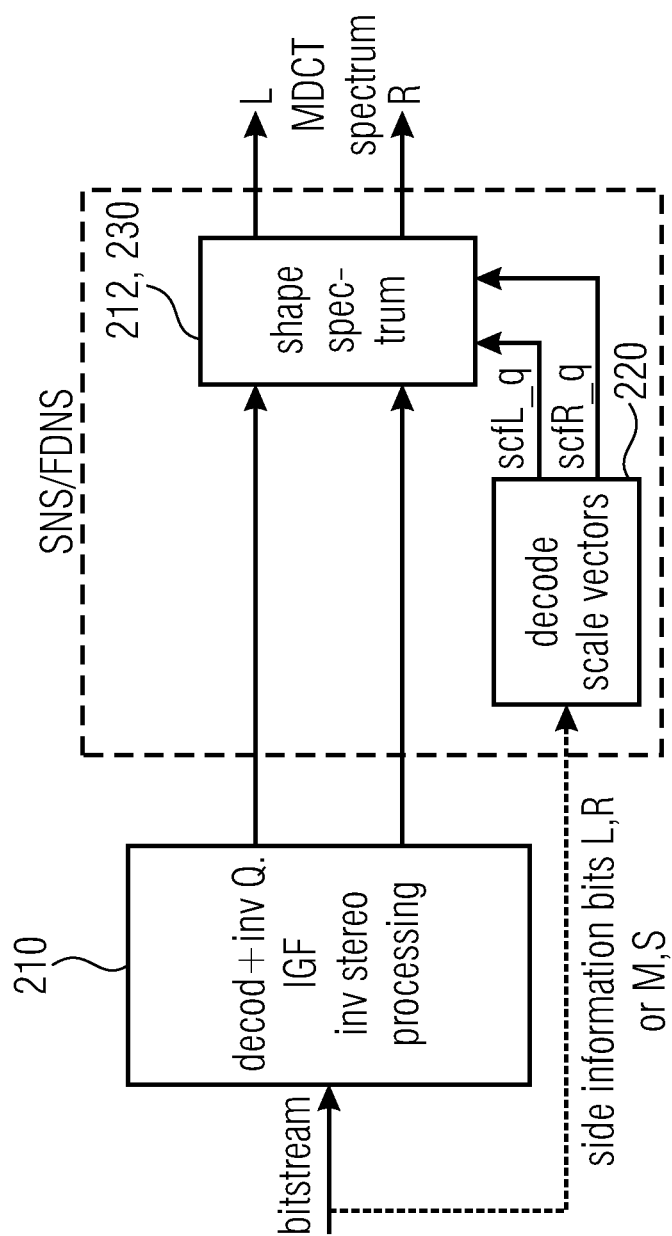
FIG. 1 illustrates a decoder in accordance with the first aspect.

FIG. 1 illustrates a further implementation of the decoder of FIG. 8a. Particularly, the bitstream is input into the signal processor 210 that performs, typically, entropy decoding and inverse quantization together with intelligent gap filling procedures (IGF procedures) and inverse stereo processing of the scaled or whitened channels. The output of block 210 are scaled or whitened decoded left and right or, generally, several decoded channels of a multi-channel signal. The bitstream comprises side information bits for the scale parameters for left and right in the case of separate encoding and side information bits for scaled jointly encoded scale parameters illustrated as M, S scale parameters in FIG. 1. This data is introduced into the scale parameter or scale factor decoder 220 that, at its output, generates the decoded left scale factors and the decoded right scale factors that are then applied in the shape spectrum block 212, 230 to finally obtain an advantageously MDCT spectrum for left and right that can then be converted into a time domain using a certain inverse MDCT operation.

Figure 2:
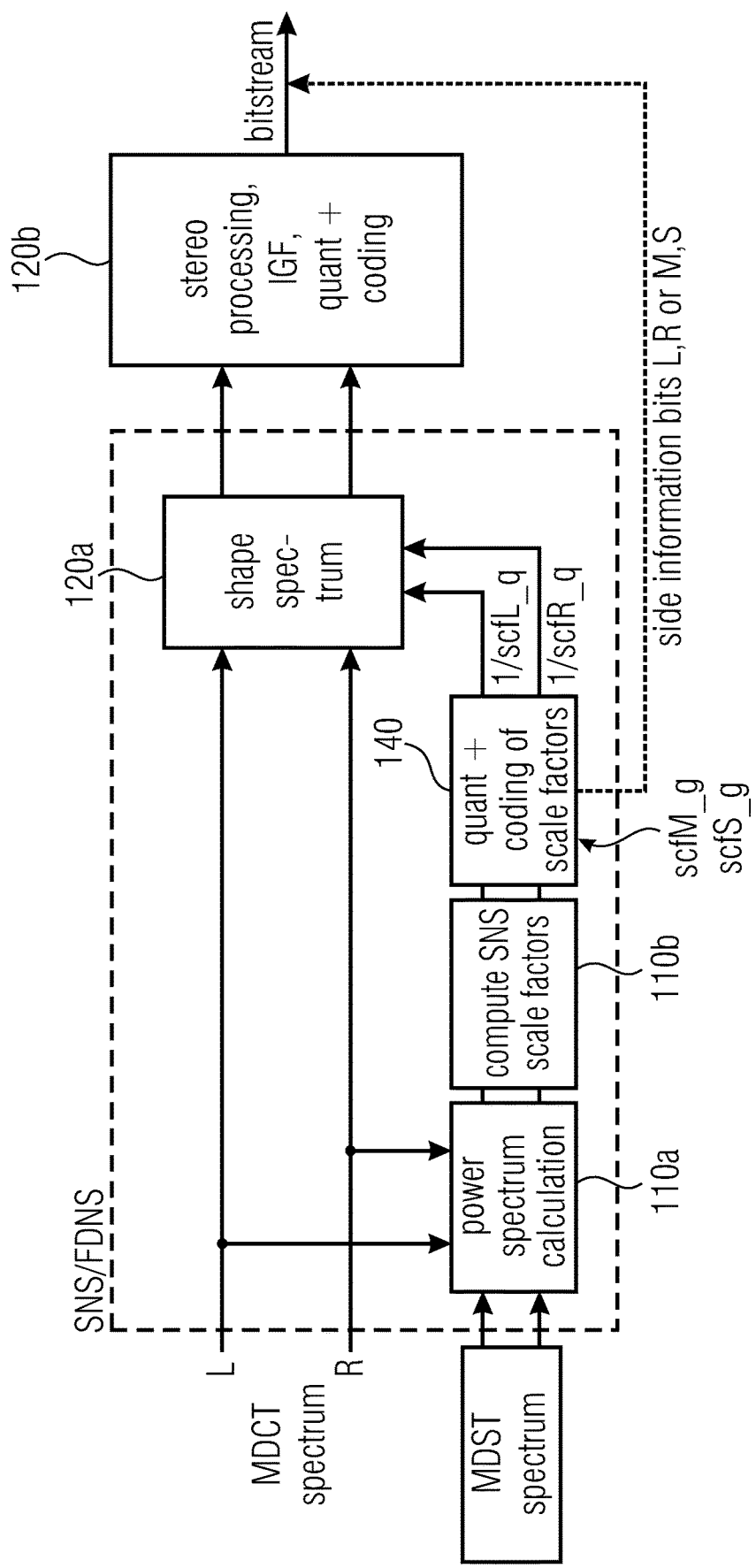
FIG. 2 illustrates an encoder in accordance with the first aspect.

The corresponding encoder-side implementation is given in FIG. 2. FIG. 2 starts from an MDCT spectrum having a left and a right channel that are input into a spectrum shaper 120a, and the output of the spectrum shaper 120a is input into a processor 120b that, for example, performs a stereo processing, intelligent gap filling operations on an encoder side and corresponding quantization and (entropy) coding operations. Thus, blocks 120a, 120b together represent the signal processor 120 of FIG. 8b. Furthermore, for the purpose of the calculation of the scale factors which is performed in the block compute SNS (spectral noise shaping) scale factors 120b, an MDST spectrum is provided as well, and the MDST spectrum together with the MDCT spectrum is forwarded into a power spectrum calculator 110a. Alternatively, the power spectrum calculator 110a can operate directly on the input signal without an MDCT or MDST spectrum procedure. Another way would be to calculate the power spectrum from a DFT operation rather than an MDCT and an MDST operation, for example. Furthermore, the scale factors are calculated by the scale parameter calculator 140 that is illustrated in FIG. 2 as a block quantization encoding of scale factors. Particularly, block 140 outputs, dependent on the similarity between the first and the second channel, either separate encoded scale factors for left and right or jointly encoded scale factors for M and S. This is illustrated in FIG. 2 to the right of block 140. Thus, in this implementation, block 110b calculates the scale factors for left and right and block 140 then determines, whether separate encoding, i.e., encoding for the left and right scale factors is better or worse than encoding of jointly encoded scale factors, i.e., M and S scale factors derived from the separate scale factors by the two different combination rules such as an addition on the one hand and a subtraction on the other hand.

The result of block 140 are side information bits for L, R or M, S that are, together with the result of block 120b, introduced into an output bitstream illustrated by FIG. 2.

FIG. 3a illustrates an implementation of the encoder of FIG. 2 or FIG. 8b. The first channel is input into a block 1100a that determines the separate scale parameters for the first channel, i.e., for channel L. Additionally, the second channel is input into block 1100b that determines the separate scale parameters for the second channel, i.e., for R. Then, the scale parameters for the left channel and the scale parameters for the right channel are correspondingly downsampled by a downsampler 130a for the first channel and a downsampler 130b for the second channel. The results are downsampled parameters (DL) for the left channel and downsampled parameters (DR) for the right channel.

Then, both these data DL and DR are input into a joint scale parameter determiner 1200. The joint scale parameter determiner 1200 generates the first group of jointly encoded scale parameters such as mid or M scale parameters and a second group of jointly encoded scale parameters such as side or S scale parameters. Both groups are input in corresponding vector quantizers 140a, 140b to obtain quantized values that are then, in a final entropy encoder 140c and to be encoded to obtain the information on the jointly encoded scale parameters.

The entropy encoder 140c may be implemented to perform an arithmetic entropy encoding algorithm or an entropy encoding algorithm with a one-dimensional or with one or more dimensional Huffman code tables.

Another implementation of the encoder is illustrated in FIG. 3b, where the downsampling is not performed with the separate scale parameters such as with left and right as illustrated at 130a, 130b in FIG. 3a. Instead, the order of operations of the joint scale parameter determination and the subsequent downsampling by the corresponding downsamplers 130a, 130b is changed. Whether the implementation of FIG. 3a or FIG. 3b is used, depends on the certain implementation, where the implementation of FIG. 3a is of advantage, since the joint scale parameter determination 1200 is already performed on the downsampled scale parameters, i.e., the two different combination rules performed by the scale parameter calculator 140 are typically performed on a lower number of inputs compared to the case in FIG. 3b.

Figure 4A:
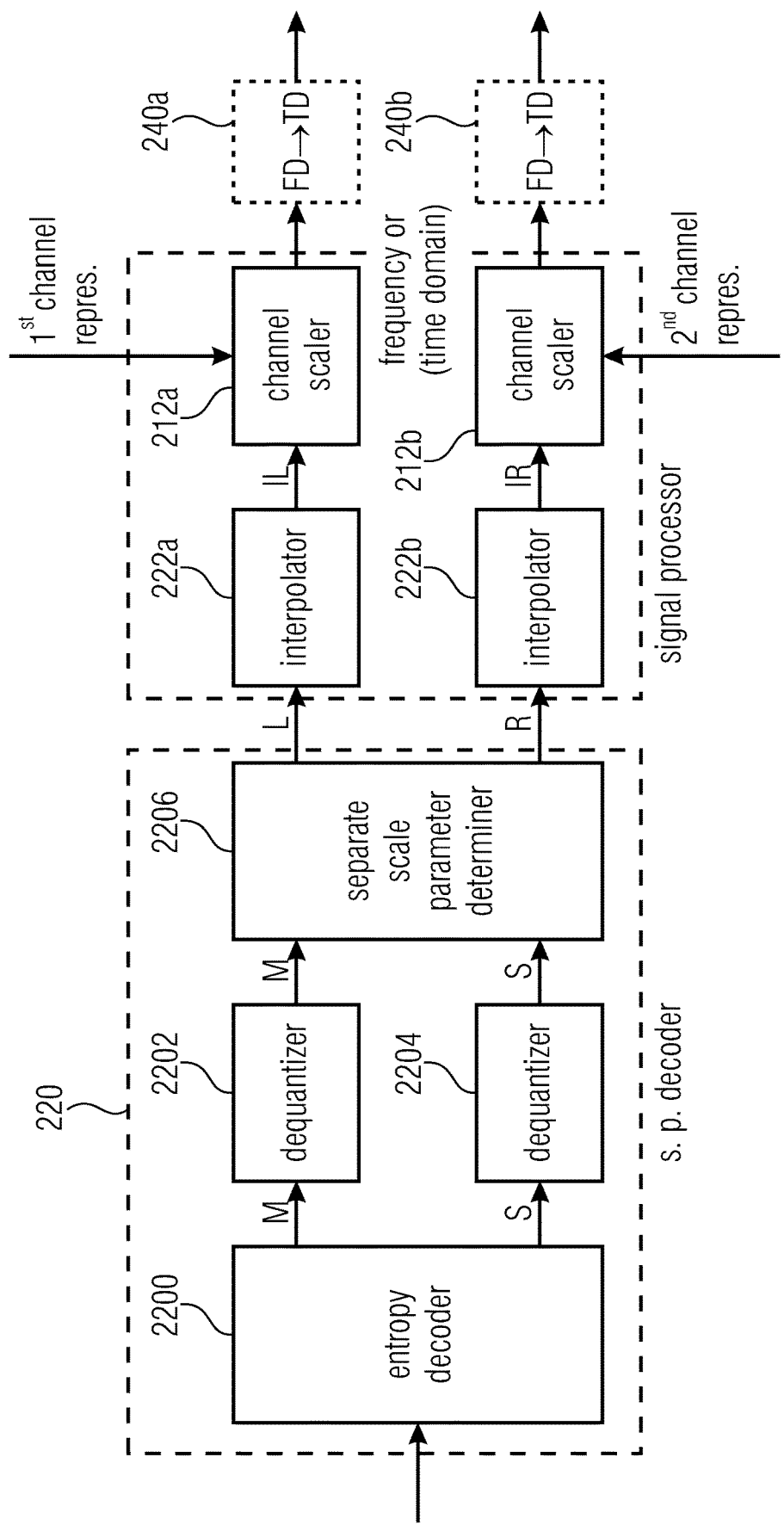
FIG. 4a illustrates a further embodiment of a decoder in accordance with the first aspect.

FIG. 4a illustrates the implementation of a decoder for decoding an encoded audio signal having multi-channel audio data comprising data for two or more audio channels and information on jointly encoded scale parameters. The decoder in FIG. 4a, however, is only part of the whole decoder of FIG. 8a, since only a part of the signal processor and, particularly, the corresponding channel scalers 212a, 212b are illustrated in FIG. 4a. With respect to the scale parameter decoder 220, this element comprises an entropy decoder 2200 reversing the procedure performed by corresponding block 140c in FIG. 3a. Furthermore, the entropy decoder outputs quantized jointly encoded scale parameters, such as quantized M scale parameters and quantized S scale parameters. The corresponding groups of scale parameters are input into dequantizers 2202 and 2204 in order to obtain dequantized values for M and S. These dequantized values are then input into a separate scale parameter determiner 2206 that outputs scale parameters for left and right, i.e., separate scale parameters. These corresponding scale parameters are input into interpolators 222a, 222b to obtain interpolated scale parameters for left (IL) and interpolated scale parameters for right (IR). Both of these data are input into a channel scaler 212a and 212b, respectively. Additionally, the channel scalers correspondingly receive the first channel representation subsequent to the whole procedure done by block 210 in FIG. 1, for example. Correspondingly, channel scaler 212b also obtains its corresponding second channel representation as output by block 210 in FIG. 1. Then, a final channel scaling or "shape spectrum" as it is named in FIG. 1 takes place to obtain a shaped spectral channel for left and right that are illustrated as "MDCT spectrum" in FIG. 1. Then, a final frequency domain to time domain conversion for each channel illustrated at 240a, 240b can be performed in order to finally obtain a decoded first channel and a decoded second channel of a multi-channel audio signal in a time domain representation.

Figure 5:
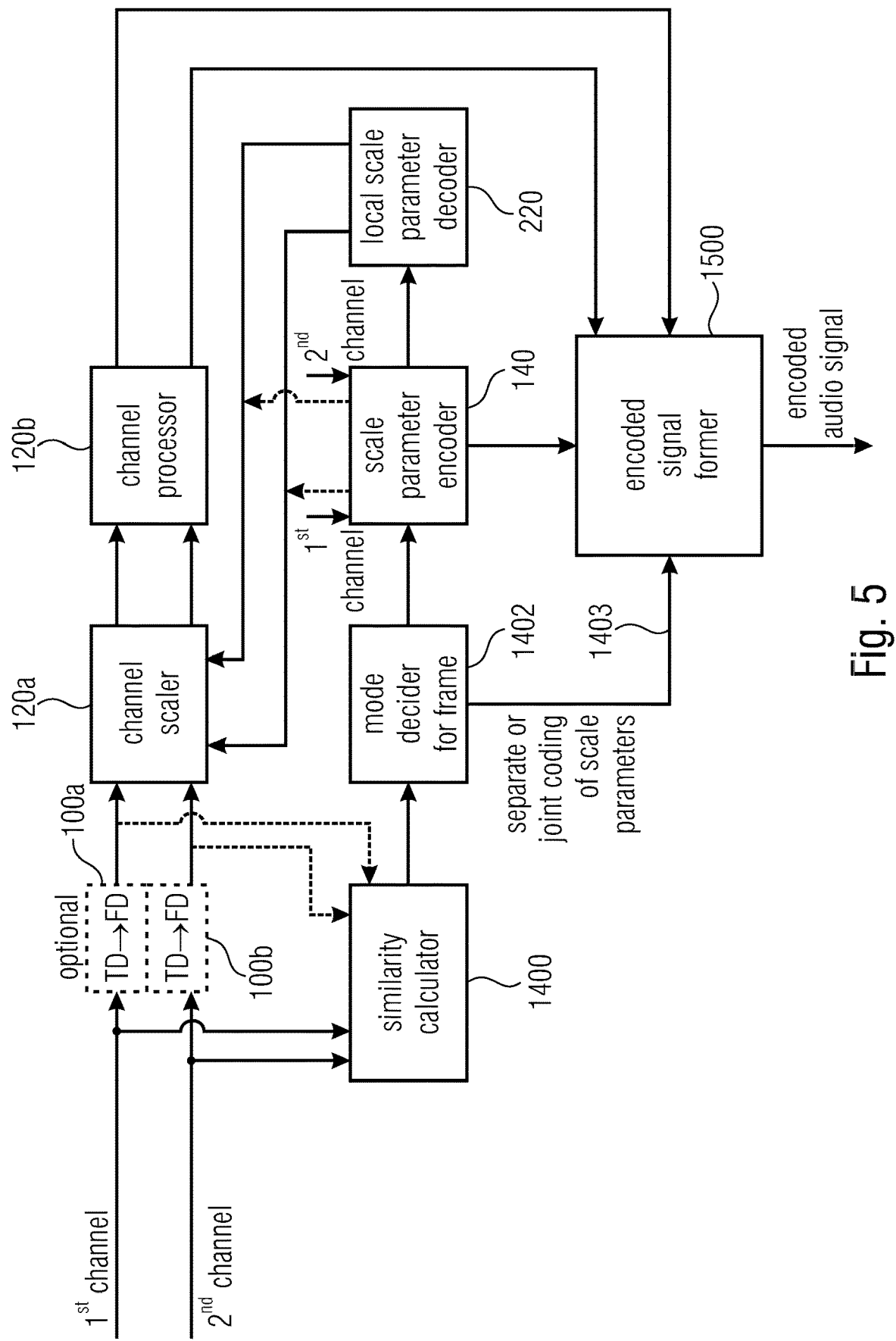
FIG. 5 illustrates a further embodiment of an encoder.

Particularly, the scale parameter decoder 220 illustrated in the left portion of FIG. 4a can be included within an audio decoder as shown in FIG. 1 or as collectively shown in FIG. 4a, but can also be included as a local decoder within an encoder as will be shown with respect to FIG. 5 explicitly showing the local scale parameter decoder 220 at the output of the scale parameter encoder 140.

Figure 4B:
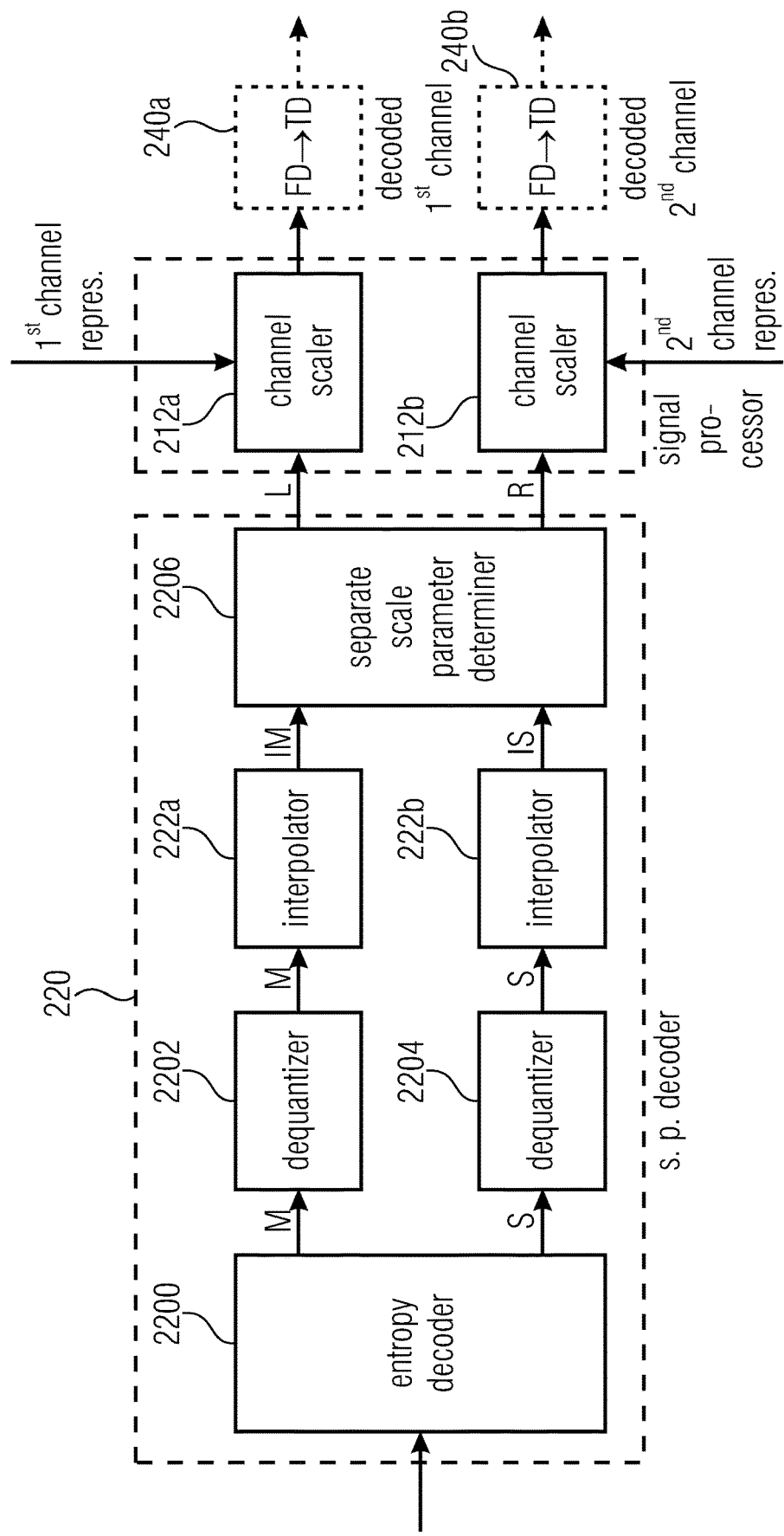
FIG. 4b illustrates another embodiment of a decoder.

FIG. 4b illustrates a further implementation where, with respect to FIG. 4a, the order of interpolation and scale parameter determination to determine the separate scale parameters is exchanged. Particularly, the interpolation takes place with the jointly encoded scale parameters M and S using interpolators 222a, 222b of FIG. 4b, and the interpolated jointly encoded scale parameters such as IM and IS are input into the separate scale parameter determiner 2206. Then, the output of block 2206 are the upsampled scale parameters, i.e., the scale parameters for each of the, for example, 64 bands illustrated in FIG. 21.

FIG. 5 illustrates a further implementation of the encoder of FIG. 8b, FIG. 2 or FIG. 3a, FIG. 3b. The first channel and the second channel are both introduced into an optional time domain-to-frequency domain converter such as 100a, 100b of FIG. 5. The spectral representation output by blocks 100a, 100b is input into a channel scaler 120a that individually scales the spectral representation for the left and the right channel. Thus, the channel scaler 120a performs a shape spectrum operation illustrated in 120a of FIG. 2. The output of the channel scaler is input into a channel processor 120b of FIG. 5, and the processed channels output of the block 120b are input into the encoded signal former 1480, 1500 to obtain the encoded audio signal.

Furthermore, for the purpose of the determination of the separately or jointly encoded scale parameters, a similarity calculator 1400 is provided that receives, as an input, the first channel and the second channel directly in the time domain. Alternatively, the similarity calculator can receive the first channel and the second channel at the output of the time domain-to-frequency domain converters 100a, 100b, i.e., the spectral representation.

Figure 6:
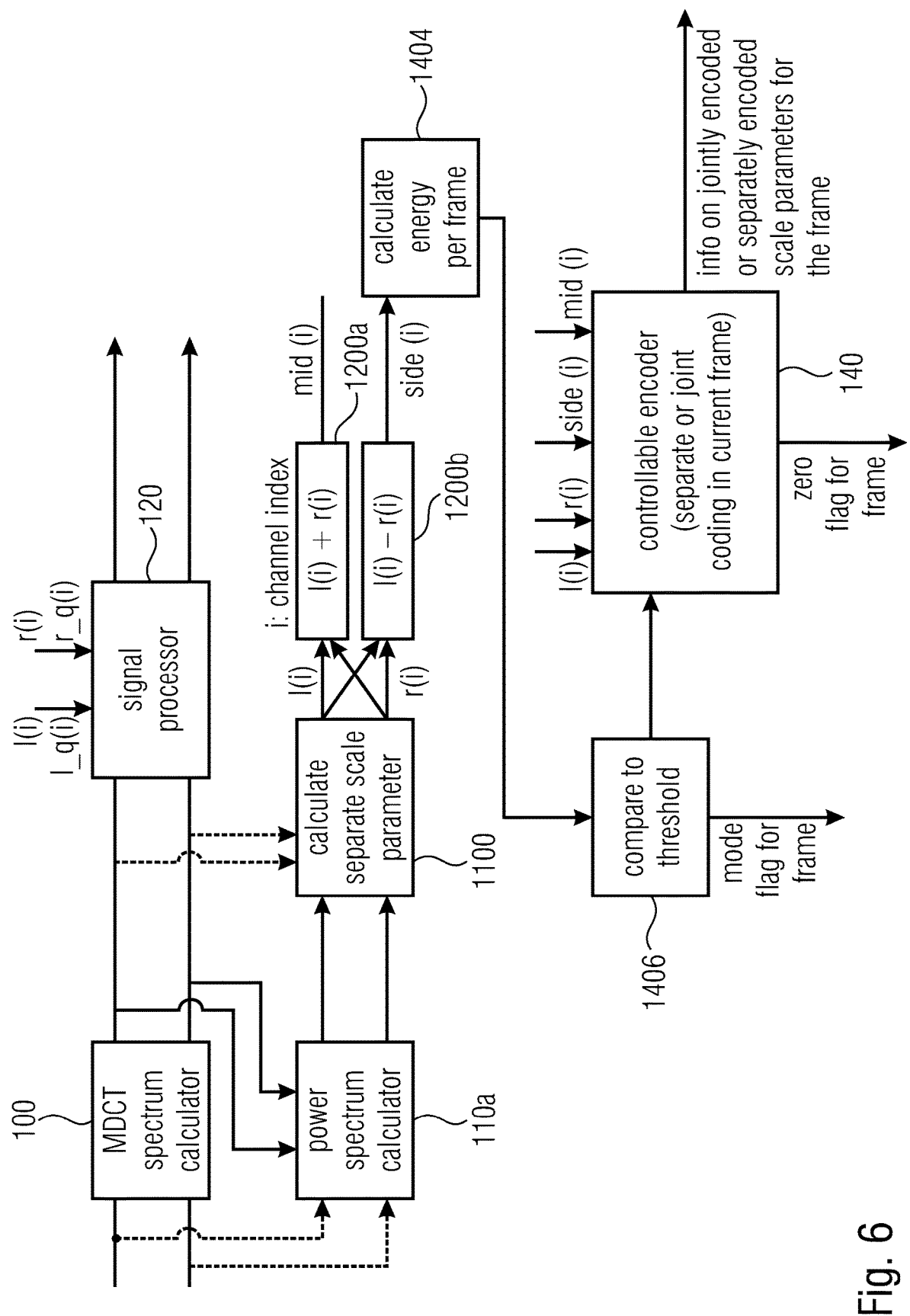
FIG. 6 illustrates a further embodiment of an encoder.

Although it will be outlined with respect to FIG. 6 that the similarity between the two channels is calculated based on the second group of jointly encoded scale parameters, i.e., based on the side scale parameters, it is to be noted that this similarity can also be calculated based on the time domain or spectral domain channels directly without explicit calculation of the jointly encoded scale parameters. Alternatively, the similarity can also be determined based on the first group of jointly encoded scale parameters, i.e., based on the mid-scale parameters. Particularly, when the energy of the side scale parameters is lower than a threshold, then it is determined that jointly encoding can be performed. Analogously, the energy of the mid-scale parameters in a frame can also be measured, and determination for a joint encoding can be done when the energy of the mid-scale parameters is greater than another threshold, for example. Thus, many different ways for determining the similarity between the first channel and the second channel can be implemented in order to decide for joint coding of scale parameters or separate coding of scale parameters.

Nevertheless, it is to be mentioned that the determination for joint or separate coding of scale parameters does not necessarily have to be identical to the determination of joint stereo coding for the channels, i.e., whether two channels are jointly coded using a mid/side representation or are separately coded in a L, R representation. The determination of joint encoding of the scale parameters is done independent on the determination of stereo processing for the actual channels, since the determination of any kind of stereo processing performed in block 120b in FIG. 2 is done after and subsequent to a scaling or shaping of the spectrum using scale factors for mid and side. Particularly, as illustrated in FIG. 2, block 140 can determine a joint coding. Thus, as illustrated by the arrow in FIG. 2 pointing to block 140, the scale factors for M and S can occur within this block. In case of the application of a local scale parameter decoder 220 within the encoder of FIG. 5, then the actually used scale parameters for shaping the spectrum, although being scale parameters for left and scale parameters for right are nevertheless derived from the encoded and decoded scale parameters for mid and side.

With respect to FIG. 5, a mode decider 1402 is provided. The mode decider 1402 receives the output of the similarity calculator 1400 and decides for a separate coding of the scale parameters when the channels are not sufficiently similar. When, however, it is determined that the channels are similar, then a joint coding of the scale parameters is determined by block 1402, and the information, whether the separate or the change joint coding of the scale parameters is applied, is signaled by a corresponding side information or flag 1403 illustrated in FIG. 5 that is provided from block 1402 to the encoded signal former 1480, 1500. Furthermore, the encoder comprises the scale parameter encoder 140 that receives the scale parameters for the first channel and the scale parameters for the second channel and encodes the scale parameters either separately or jointly as controlled by the mode decider 1402. The scale parameter encoder 140 may, in one embodiment, output the scale parameters for the first and the second channel as indicated by the broken lines so that the channel scaler 120a performs a scaling with the corresponding first and second channel scale parameters. However, it is of advantage to apply a local scale parameter decoder 220 within the encoder so that the channel scaling takes place with the locally encoded and decoded scale parameters so that the dequantized scale parameters are applied for a channel scaling in the encoder. This has the advantage that exactly the same situation takes place within the channel scaler in the encoder and the decoder at least with respect to the used scale parameters for channel scaling or spectrum shaping.

FIG. 6 illustrates a further embodiment of the present invention with respect to the audio encoder. An MDCT spectrum calculator 100 is provided that can, for example, be a time domain to frequency domain converter applying an MDCT algorithm. Furthermore, a power spectrum calculator 110a is provided as illustrated in FIG. 2. The separate scale parameters are calculated by a corresponding calculator 1100, and for the purpose of calculating the jointly encoded scale parameters, an addition block 1200a and a subtraction block 1200b. Then, for the purpose of determining the similarity, an energy calculation per frame with the side parameters, i.e., the second group of jointly encoded scale parameters is performed. In block 1406, a comparison to a threshold is performed and this block being similar to the mode decider 1402 for the frame of FIG. 5 outputs the mode flag or stereo flag for the corresponding frame. Additionally, the information is given to the controllable encoder that performs a separate or joint coding in the current frame. To this end, the controllable encoder 140 receives the scale parameters calculated by a block 1100, i.e., the separate scale parameters and, additionally, receives the jointly encoded scale parameters, i.e., the ones determined by block 1200a and 1200b.

Block 140 advantageously generates a zero flag for the frame, when block 140 determines that all side parameters of a frame are quantized to 0. This result will occur when the first and the second channel are very close to each other and the differences between the channels and, therefore, the differences between the scale factors are so that these differences are smaller than the lowest quantization threshold applied by the quantizer included in block 140. Block 140 outputs the information on the jointly encoded or separately encoded scale parameters for the corresponding frame.

Figure 9A:
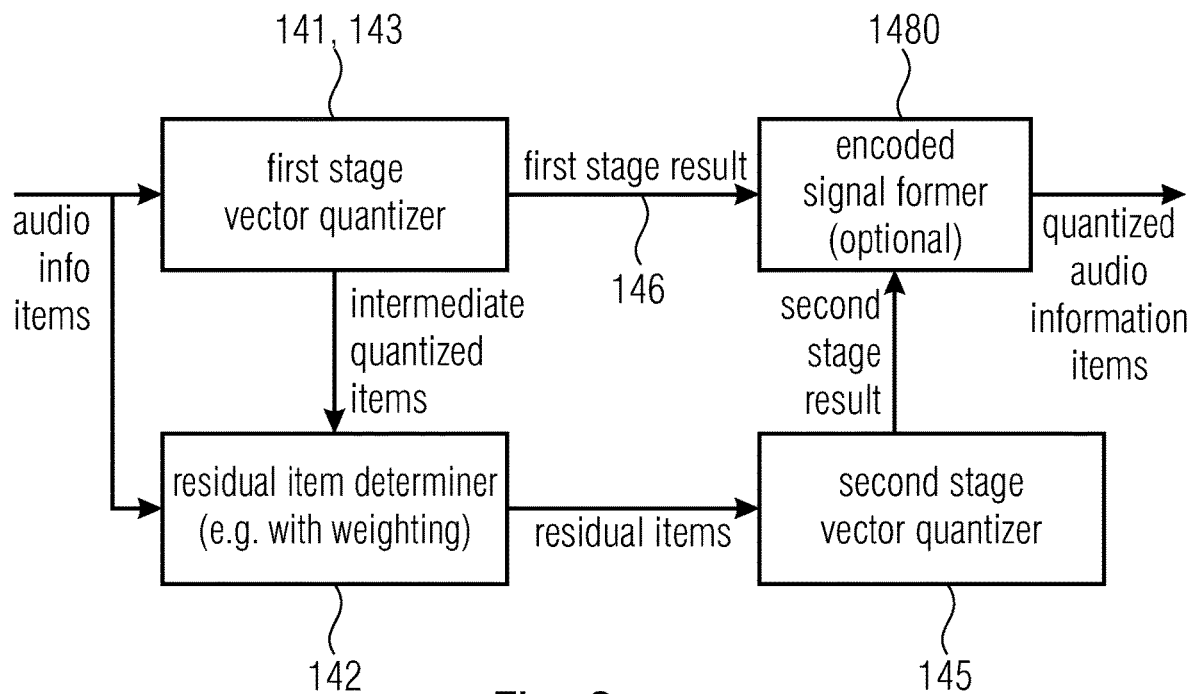
FIG. 9a illustrates an encoder in accordance with the second aspect of the present invention.

FIG. 9a illustrates an audio quantizer for quantizing a plurality of audio information items. The audio quantizer comprises a first stage vector quantizer 141, 143 for quantizing the plurality of audio information items such as scale factors or scale parameters or spectral values, etc. to determine a first stage vector quantization result 146. Additionally, block 141, 143 generates a plurality of intermediate quantized items corresponding to the first stage vector quantization result. The intermediate quantized items are, for example, the values associated with the first stage result. When the first stage result identifies a certain codebook with, for example, 16 certain (quantized) values, then the intermediate quantized items are the 16 values associated to the codebook vector index being the first stage result 146. The intermediate quantized items and the audio information items at the input into the first stage vector quantizer 141, 143 are input into a residual item determiner for calculating a plurality of residual items from the plurality of intermediate quantized items and the plurality of audio information items. This is e.g. done by calculating a difference for each item between the original item and the quantized item. The residual items are input into a second stage vector quantizer 145 for quantizing the plurality of residual items to obtain the second stage vector quantization result. Then, the first stage vector quantization result at the output of block 141, 143 and the second stage result at the output of block 145 together represent the quantized representation of the plurality of audio information items that is encoded by an optional encoded signal former 1480, 1500 that outputs the quantized audio information items that are, in the embodiment, not only quantized but are additionally entropy encoded.

Figure 9B:
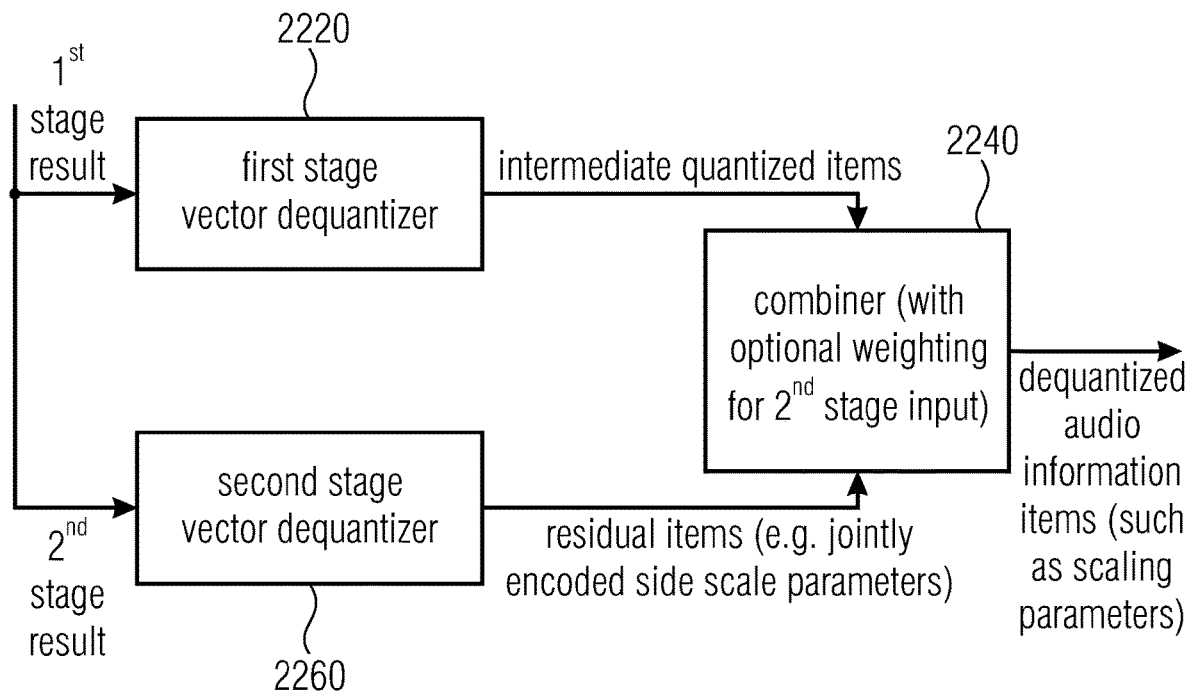
FIG. 9b illustrates a decoder in accordance with the second aspect of the present invention.

A corresponding audio dequantizer is illustrated in FIG. 9b. The audio dequantizer comprises a first stage vector dequantizer 2220 for dequantizing a first stage quantization result included in the quantized plurality of audio information items to obtain a plurality of intermediate quantized audio information items. Furthermore, a second stage vector dequantizer 2260 is provided and is configured for dequantizing a second stage vector quantization result included in the quantized plurality of audio information items to obtain a plurality of residual items. Both, the intermediate items from block 2220 and the residual items from block 2260 are combined by a combiner 2240 for combining the plurality of intermediate quantized audio items and the plurality of residual items to obtain a dequantized plurality of audio information items. Particularly, the intermediate quantized items at the output of block 2220 are separately encoded scale parameters such as for L and R or the first group of the jointly encoded scale parameters e.g. for M, and the residual items may represent the jointly encoded side scale parameters, for example, i.e., the second group of jointly encoded scale parameters.

Figure 7A:
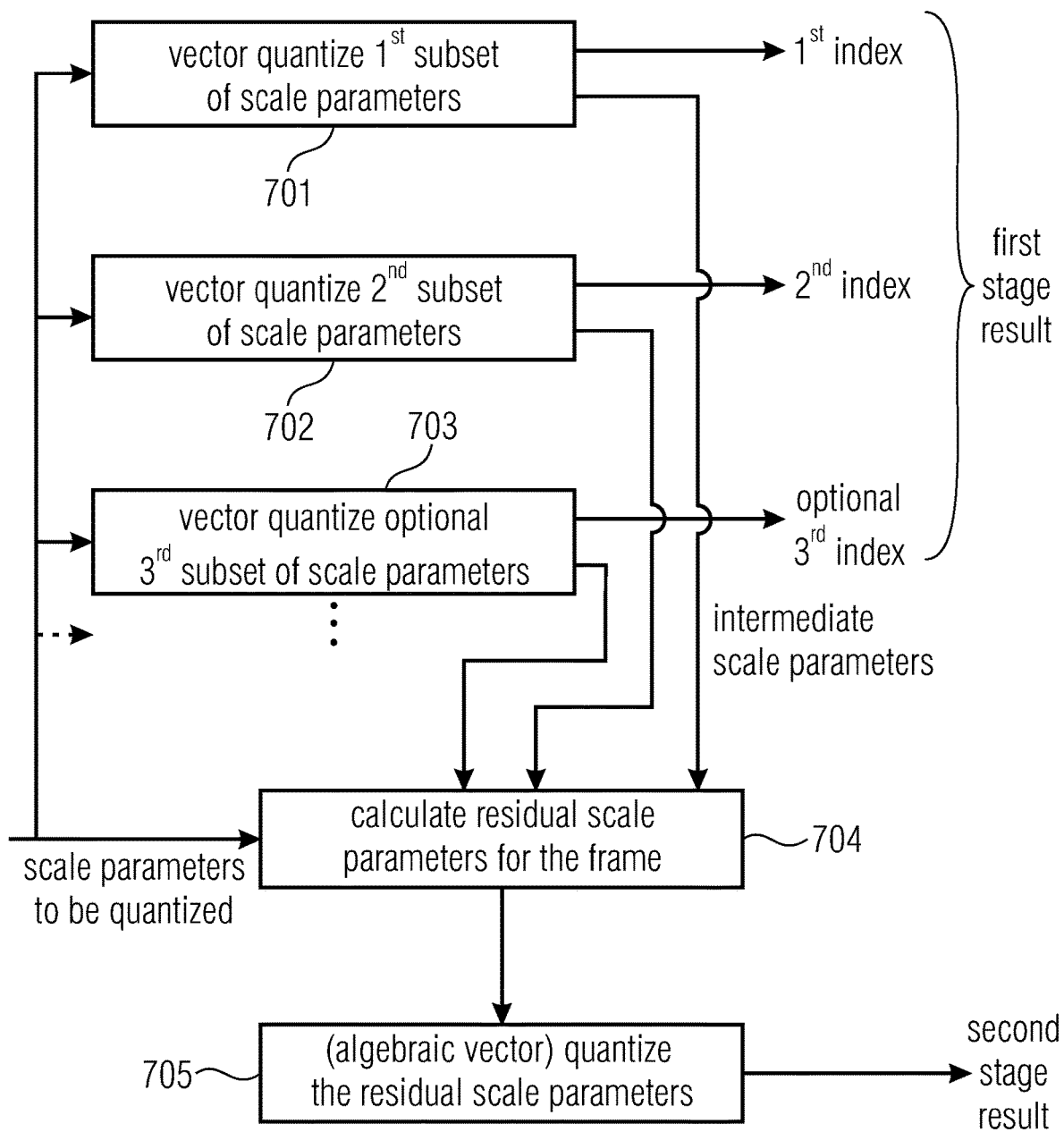
FIG. 7a illustrates an implementation of a vector quantizer in accordance with a first or second aspect.

FIG. 7a illustrates an implementation of the first stage vector quantizer 141, 143 of FIG. 9a. In step 701, a vector quantization of a first subset of scale parameters is performed to obtain a first quantization index. In a step 702, a vector quantization of a second subset of scale parameters is performed to obtain a second quantization index. Furthermore, dependent on the implementation, a vector quantization of a third subset of scale parameters is performed as illustrated in block 703 to obtain a third quantization index that is an optional index. The procedure in FIG. 7a is applied when there is a split level quantization. Exemplarily, the audio input signal is separated into 64 bands illustrated in FIG. 21. These 64 bands are downsampled to 16 bands/scale factors, so that the whole band is covered by 16 scale factors. These 16 scale factors are quantized by the first stage vector quantizer 141, 143 in a split-level mode illustrated in FIG. 7a. The first 8 scale factors of the 16 scale factors of FIG. 21 that are obtained by downsampling the original 64 scale factors are vector-quantized by step 701 and, therefore, represent the first subset of scale parameters. The remaining 8 scale parameters for the 8 upper bands represent the second subset of scale parameters that are vector-quantized in step 702. Dependent on the implementation, a separation of the whole set of scale parameters or audio information items does not necessarily have to be done in exactly two subsets, but can also be done in three subsets or even more subsets.

Independent on how many splits are performed, the indexes for each level together represent the first stage result. As discussed with respect to FIG. 14, these indexes can be combined via an index combiner in FIG. 14 to have a single first stage index. Alternatively, the first stage result can consist of the first index, and the second index and a potential third index and probably even more indexes that are not combined, but that are entropy encoded as they are.

Figure 7B:
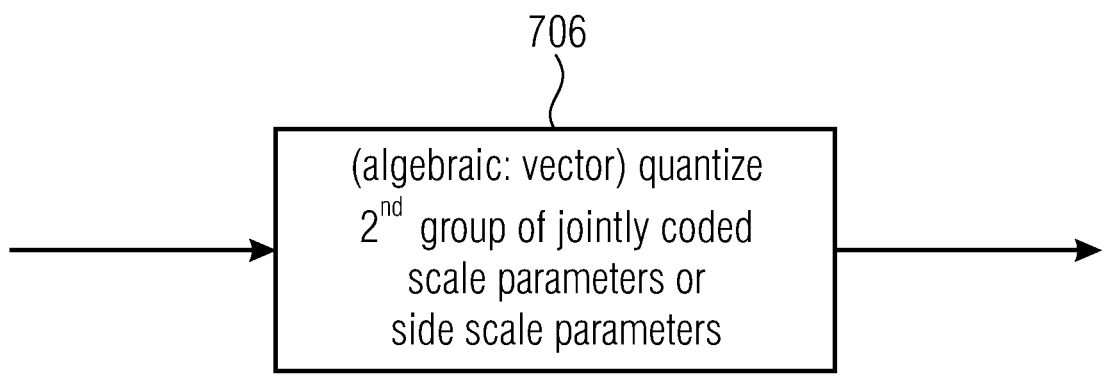
FIG. 7b illustrates a further quantizer in accordance with the first or second aspect.

In addition to the corresponding indexes forming the first stage result, step 701, 702, 703 also provide the intermediate scale parameters that are used in block 704 for the purpose of calculating the residual scale parameters for the frame. Hence, step 705 that is performed by, for example, block 142 of FIG. 9a, results in the residual scale parameters that are then processed by an (algebraic) vector quantization performed by step 705 in order to generate the second stage result. Thus, the first stage result and the second stage result are generated for the separate scale parameters L, the separate scale parameters R and the first group of joint scale parameters M. However, as illustrated in FIG. 7b, the (algebraic) vector quantization of the second group of jointly coded scale parameters or side scale parameters is only performed by step 706 that is in an implementation identical to step 705 and is performed again by block 142 of FIG. 9a.

In a further embodiment, the information on the jointly encoded scale parameters for one of the two groups such as the second group advantageously related to the side scale parameters does not comprise quantization indices or other quantization bits but only information such as a flag or single bit indicating that the scale parameters for the second group are all zero for a portion or frame of the audio signal or are all at a certain value such as a small value. This information is determined by the encoder by an analysis or by other means and is used by the decoder to synthesize the second group of scale parameters based on this information such as by generating zero scale parameters for the time portion or frame of the audio signal or by generating certain value scale parameters or by generating small random scale parameters all being e.g. smaller then the smallest or first quantization stage or is used by the decoder to calculate the first and the second set of scale parameters only using the first group of jointly encoded scale parameters. Hence, instead of performing stage 705 in FIG. 7a, only the all zero flag for the second group of jointly encoded scale parameters is written as the second stage result. The calculation in block 704 can be omitted as well in this case and can be replaced by a decider for deciding whether the all zero flag is to be activated and transmitted or not. This decider can be controlled by a user input indicating a skip of the coding of the S parameters altogether or a bitrate information or can actually perform an analysis of the residual items. Hence, for the frame having the all zero bit, the scale parameter decoder does not perform any combination but calculates the second set of scale parameters only using the first group of jointly encoded scale parameters such as by dividing the encoded scale parameters of the first group by two or by weighting using another predetermined value.

In a further embodiment, the second group of jointly encoded scale parameters is quantized only using the second quantization stage of the two stage quantizer, which may be a variable rate quantizer stage. In this case, it is assumed that the first stage results in all zero quantized values, so that only the second stage is effective. This case is illustrated in FIG. 7b.

In an even further embodiment, only the first quantization stage such as 701, 702, 703 of the two stage quantizer in FIG. 7a, which may be a fixed rate quantization stage, is applied and the second stage 705 is not used at all for a time portion or frame of the audio signal. This case corresponds to a situation, where all the residual items are assumed to be zero or smaller than the smallest or first quantization step size of the second quantization stage. Then, FIG. 7b, item 706 would correspond to items 701, 702, 703 of FIG. 7a and item 704 could be omitted as well and can be replaced by a decider for deciding that only the first stage quantization is used or not. This decider can be controlled by a user input or a bitrate information or can actually perform an analysis of the residual items to determine that the residual items are small enough so that the accuracy of the second group of jointly encoded scale parameters quantized by the single stage only is sufficient.

Figure 14:
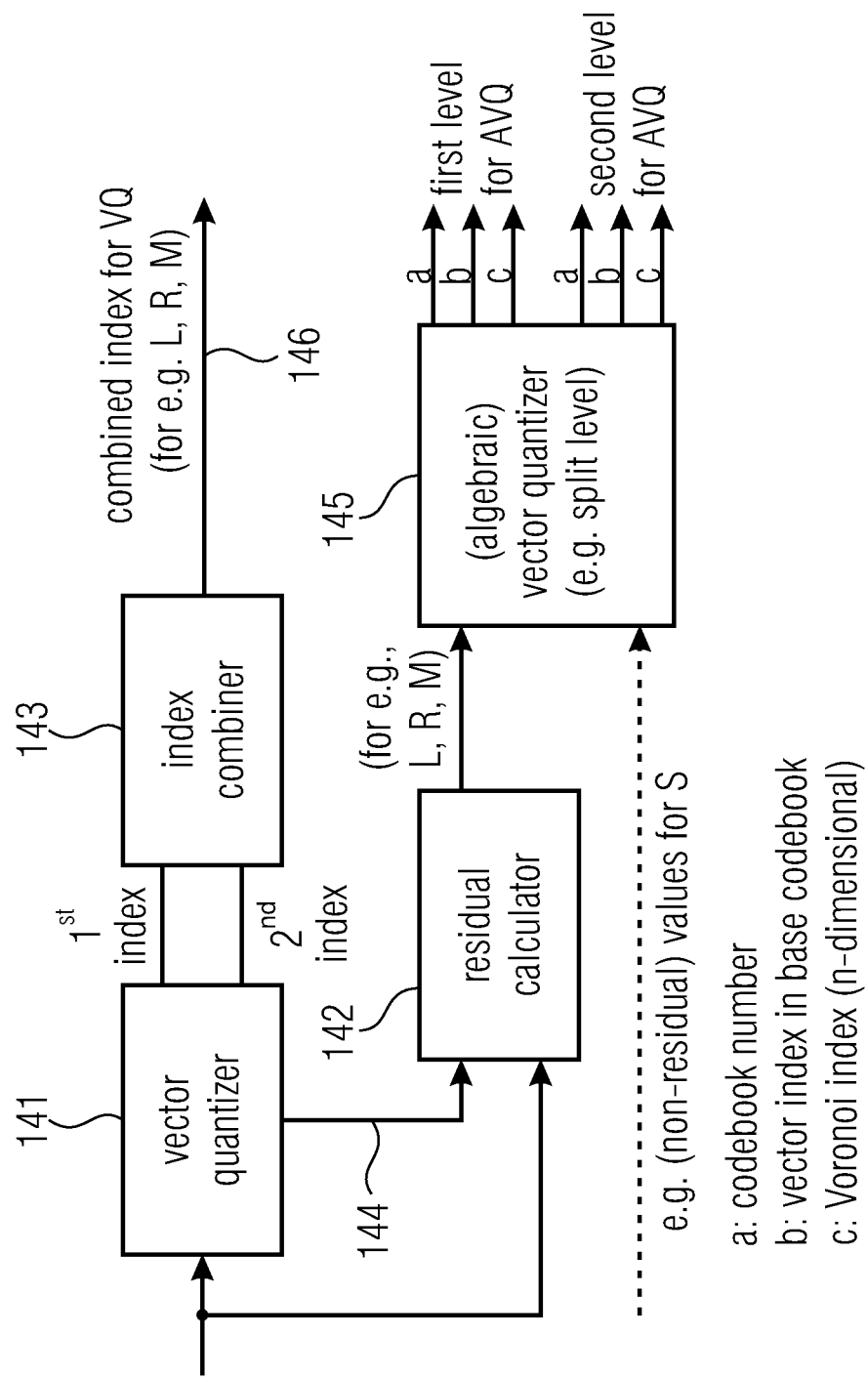
FIG. 14 is a schematic representation of the scale factor encoder of FIG. 4.

In an implementation of the present invention that is additionally illustrated in FIG. 14, the algebraic vector quantizer 145 additionally performs a split level calculation and, advantageously, performs the same split level operation as is performed by the vector quantizer. Thus, the subsets of the residual values correspond, with respect to the band number, to the subset of scale parameters. For the case of having two split levels, i.e., for the first 8 downsampled bands of FIG. 21, the algebraic vector quantizer 145 generates the first level result. Furthermore, the algebraic vector quantizer 145 generates a second level result for the upper 8 downsampled scale factors or scale parameters or, generally, audio information items.

Advantageously, the algebraic vector quantizer 145 is implemented as the algebraic vector quantizer defined in section 5.2.3.1.6.9 of ETSI TS 126 445 V13.2.0 (2016-08) mentioned as reference (4) where, the result of the corresponding split multi-rate lattice vector quantization is a codebook number for each 8 items, a vector index in the base codebook and an 8-dimensional Voronoi index. However, in case of only having a single codebook, the codebook number can be avoided and only the vector index in the base codebook and the corresponding n-dimensional Voronoi index is sufficient. Thus, these items which are item a, item b and item c or only item b and item c for each level for the algebraic vector quantization result represent the second stage quantization result.

Figure 10:
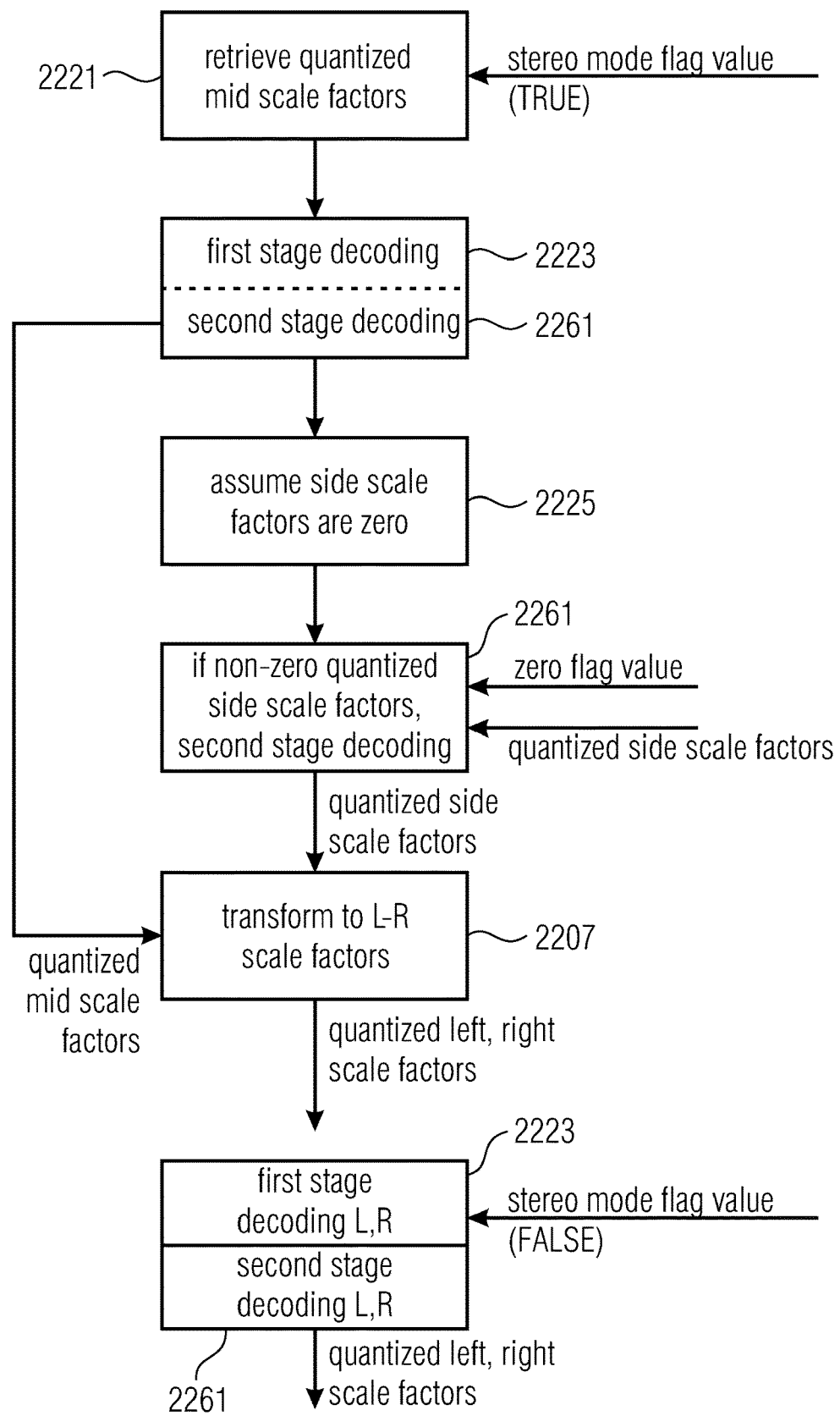
FIG. 10 illustrates an implementation of a decoder in accordance with the first or second aspect.

Subsequently, reference is made to FIG. 10 illustrating a corresponding decoding operation matching with the encoding of FIG. 7a, 7b or the encoding of FIG. 14 in accordance with the first or the second aspect of the present invention or in accordance with both aspects.

In step 2221 of FIG. 10, the quantized mid scale factors, i.e., the second group of jointly encoded scale factors are retrieved. This is done when the stereo mode flag or item 1403 of FIG. 5 indicates a true value. Then, a first stage decoding 2223 and a second stage decoding 2261 is performed in order to re-do the procedures done by the encoder of FIG. 14 and, particularly, by the algebraic vector quantizer 145 described with respect to FIG. 14 or described with respect to FIG. 7a. In step 2225, it is assumed that the side scale factors are all 0. In step 2261, it is checked by means of the 0 flag value, whether there actually come non-zero quantized scale factors for the frame. In case the 0 flag value indicates that there are non-zero side scale factors for the frame, then the quantized side scale factors are retrieved and decoded using the second stage decoding 2261 or performing block 706 of FIG. 7b only. In block 2207, the jointly encoded scale parameters are transformed back to the separately encoded scale parameters in order to then output the quantized left and right scale parameters that can then be used for inverse scaling of the spectrum in the decoder.

When the stereo mode flag value indicates a value of zero or when it is determined that a separate coding has been used within the frame, then only first stage decoding 2223 and second stage decoding 2261 is performed for the left and right scale factors and, since the left and right scale factors are already in the separately encoded representation, any transformation such as block 2207 is not required. The process of efficiently coding and decoding the SNS scale factors that are needed for scaling the spectrum before the stereo processing at the encoder side and after the inverse stereo processing in the decoder side is described below to show an advantageous implementation of the present invention as an exemplary pseudo code with comments.

Joint Quantization and Coding of Scale Factors

```
Compute side from the M scale factors of each channel snsl and snsr and compute the total energy of side
ener_side.
ener_side=0;
    for (i = 0; i < M; i++)
{
side[i] = snsl[i] –snsr[i];
ener_side = ener_side + side[i]^2;
}
    If ener_side is lower than a certain threshold, the two signals are highly correlated and coding should be
    done jointly else independently.
if (ener_side < threshold ) code scale factors jointly
{
Signal MS coding to bits tream
Compute mid from the M scale factors of each channel snsl and snsR
for (i = 0; i < M; i++)
{
   mid[i] = (snsl[i] + snsr[i]) * 0.5f;
}
        Quantize mid with first stage vector quantization (VQ), function returns the index of the stochastic
        codebook indexl_1 and the intermediate quantized mid parameters mid_q.
indexl_1 = sns_1st_cod( mid, mid_q );
        Quantize mid with second stage algebraic vector quantization (AVQ), function returns indices of split
        dimensions and the final quantized mid mid_q.
indexl_2 = sns_2st_cod( mid, mid_q );
        Quantize side – assume coarse quantization and set all "quantized" parameters to zero.
        for ( i = 0; i < M; i++ )
        {
            side_q[i] = 0.f;
        }
        Quantize side with second stage algebraic vector quantization (AVQ), function returns indices of split
        dimensions and the final quantized side side_q.
indexr_2 = sns_2st_cod( side, side_q);
        Detect whether quantized scale factors are zero, if so signal it to the bitstream with a bit
        if ( flag_zero )
{
            send signal bit to bits tream
}
Transform quantized scale factors back to L – R representation
for (i = 0; i < M; i++)
{
```

```
    snsl_q[i]= mid_q[i] + side_q[i] * 0.5f;
    snsr_q[i]= mid_q[i]-side_q[i] * 0.5f;
  }
}
else code scale factors independently
{
  Signal LR coding to bits tream
    Quantize left channel scale factors with first stage vector quantization (VQ), function returns the index of
    the stochastic codebook indexl _1 and the quantized snsl parameters snsl_q
    indexl_1 = sns_1st_cod( snsl, sns _q );
    Quantize left channel scale factors with second stage algebraic vector quantization (AVQ), function
    returns indices of split dimensions and the final quantized snslsnsl_q
    indexl_2 = sns_2st_cod( snsl, sns_q );
    Quantize right channel scale factors with firs stage vector quantization (VQ), function returns the index
    of the stochastic codebook indexr_1 and the quantized snsr parameters snsr_q
    indexr_1 = sns_1st_cod( snsr, snsr_q );
    Quantize right channel scale factors with second stage algebraic vector quantization (AVQ), function
    returns indices of split dimensions and the final quantized snsr snsr_q
    indexr_2 = sns_2st_cod( snsr, snsr_q );
}
Output quantized SNS scale factors snsl_q and snsr_q to perform the scaling of the spectrum.
```

Any sort of quantization e. g. uniform or non-uniform scalar quantization and entropy or arithmetic coding can be used to represent the parameters. In the described implementation, as can be seen in the algorithm description, a 2-stage vector quantization scheme is implemented:

First stage: 2 splits (8 dimension each) with 5 bits each, therefore, coded with 10 bits Second stage: algebraic vector quantization (AVQ), again 2-split with scaling of the residual, where codebook indices are entropy coded and therefore, uses variable bitrate.

Since the side signal for highly correlated channels can be considered small, using the e.g. reduced-scale $2^{nd}$ stage AVQ only is sufficient to represent the corresponding SNS parameters. By skipping the $1^{st}$ stage VQ for these signals, a significant complexity and bit saving for coding of the SNS parameters can be achieved.

A pseudo code description of each stage of quantization implemented is given below. First stage with 2-split vector quantization using 5 bits for each split:

```
codebook index = sns_1st cod(
            input : sns parameters vector to quantize
            output : sns_q quantized sns scale parameter
)
{
  split vector of coefficients to half
  j0 = 0;
  j1 = M / 2;
  initialize minimum distance
  dist_min = 1.0e30f;
  pointer to memory location of stored codebooks
  p = sns_vq_cdbk1;
  index0 = 0;
  Split Vector Quantization
  Use 5-bit representation 32=2^5 to find the optimal index with the minimum distance
  for ( i = 0; i < 32; i++ )
  {
    dist = 0.0;
    for (j = j0; j < j1; j++ )
    {
        get difference of sns parameters with each one of the 8-dimensional quantized vectors, that are
        sequentially stored in memory.
        temp = sns[i]-*p++;
        calculate distance
        dist = dist + temp * temp;
    }
        return index of codebook with minimum distance
    if ( dist < dist_min )
    {
        dist_min = dist;
        index0 = i;
    }
  }
  Having found the optimal index of the vector get quantized values of the M/2 first SNS scale factors from
  codebook
  Point to the address in memory to the selected codebook
    p = &sns_vq_cdbk1 [index0 * ( M / 2 )];
  for (j = j0; j < j1; j++ )
  {
    snsq[i] = *p++; Increment pointer by one
```

```
}
Repeat the procedure for the second split of the vector
j0 = M / 2;
j1 = M;
dist_min = 1.0e30f;
p = sns_vq_cdbk2;
index1 = 0;
for ( i = 0; i < 32; i++ )
{
  dist = 0.0;
  for (j = j0; j < j1; j++ )
  {
    temp = sns[i]-*p_dico++;
    dist += temp * temp;
  }
  if ( dist < dist_min )
  {
    dist_min = dist;
    index 1 = i;
  }
}
Get the quantized values for the remaining factors from codebook
p = &sns_vq_cdbk2[index1 * ( M /2)];
for (j = j0; j < j1; j++ )
{
  snsq[i] = *p++;
}
  Final index is the sum of the indices from first split + seconds split multiplied with the factor of 2^5=32.
  Therefore, only one index needs to be multiplexed in the bitstream
index = index0 + ( index1 << 5 );
return index;
}
```

Second Stage Algebraic Vector Quantization:
  sns_2st_cod(
    input sns, normalized vector to quantize
    input/output snsq, i:1st stage o:1st+2nd stage
    output index [ ],
  )
  {
    scale=1.0/2.5;
    Compute residual from first-stage quantization and scale residual for finer quantization
    for (i=0; i<M; i++)
    {
    x[i]=(sns[i]−snsq[i])/scale;
    }
    Quantize residual using AVQ (Algebraic code vector) used in EVS for the second-stage quantization of the LPC coefficients [4]. Where x is the residual, xq is the quantized residual returned from the function, 2 marks the 2-split process and indx is an array that contains the indices of the codebooks for each split
    AVQ_cod_lpc (x, xq, indx, 2);
    Refine the quantized SNS scale factors by adding the quantized residual concluding the second stage of quantization
    for (i=0; i<M; i++)
    {
    snsq[i]=snsq[i]+scale*xq[i];
    }
  The indices that are output from the coding process are finally packed to the bitstream and sent to the decoder.
  The AVQ procedure disclosed above for the second stage may be implemented as outlined in EVS referring to is the High-Rate LPC (subclause 5.3.3.2.1.3) in the MDCT-based TCX chapter. Specifically for the second-stage Algebraic vector quantizer used it is stated 5.3.3.2.1.3.4 Algebraic vector quantizer, and the algebraic VQ used for quantizing the refinement is described in subclause 5.2.3.1.6.9. In an embodiment, one has, for each index, a set of codewords for the base codebook index and set of codewords for the Voronoi index, and all this is entropy coded and therefore of variable bit rate. Hence, the parameters of the AVQ in each sub-band j consist of the codebook number, the vector index in base codebook and the n- (such as 8-) dimensional Voronoi index.

Decoding of Scale Factors
  At the decoder end the indices are extracted from the bitstream and are used to decode and derive the quantized values of the scale factors. A pseudo code example of the procedure is given below.
  The procedure of the 2-stage decoding is described in detail in the pseudocode below.
  Read bit signaling stereo coding from bitstream
  if (stereo_mode is true)
  {
    Read indices to retrieve quantized mid scale factors.
      First stage decoding, input indexl_1 and return quantized mid, mid_q
    sns_1st_dec(indexl_1, mid_q);
      Second stage decoding, input indeces indexl_2 and return final quantized mid_q
    sns_2st_dec(mid_q, indexl_2);
      Assume quantized side scale factors are zero after first stage
    for (i=0; i<M; i++)
    {
      side_q[i]=0.f;
    }
      If it is signaled in bits ream that side scale factors are non-zero do second stage decoding if (flag_zero is false)
    {
      Input second-stage indices indexr_2 and return quantized side, side_q

```
            sns_2st_dec(side_q, indexr_2);
        }
        Transform mid-side SNS quantized scale factors to L-R
            for (i=0; i<M; i++)
            {
                SNS_Ql[i]=mid_q[i]+side_q[i]*0.5f;
                SNS_Qr[i]=mid_q[i]−side_q[i]*0.5f;
            }
    }
    else
    {
        Two stage decoding to retrieve the L-R SNS quantized
            scale factors
            First stage decoding L
                sns_1st_dec(indexl_1, SNS_Ql);
            Second stage decoding L
                sns_2st_dec(SNS_Ql, indexl);
            First stage decoding R
                sns_1st_dec(*indexr++, SNS_Qr);
            Second stage decoding R [1]
                sns_2st_dec(SNS_Qr, indexr);
    }
    Return quantized scale factors for each channel to scale
        the decoded spectrum
}
```

The procedure of the 2-stage decoding is described in detail in the pseudocode below.

```
sns_1st_dec(
    input: index, codebook index
    output snsq, quantized sns
)
{
    To retrieve index0 and index1 representing the indices
        for each split from index the inverse operation need
        to be done:
    index0=index % 32; where % represents the remainder
        from dividing with 32
    index1=index/32;
    Pointer to first codebook for the first half of quantized
        SNS parameters
    p=&sns_vq_cdbk1[(index0)*(M/2)];
    Retrieve vector of quantized values sequentially stored
        in memory
    for (i=0; i<M/2; i++)
    {
        snsq[i]=*p++;
    }
    Pointer to second codebook to retrieve the second half
        of SNS parameters
    p=&sns_vq_cdbk2[(index1)*(M/2)];
    Retrieve vector of quantized values sequentially stored
        in memory
    for (i=M/2; i<M; i++)
    {
        snsq[i]=*p++;
    }
}
```

The quantized SNS scale factors retrieved from the first stage are refined by decoding the residual in the second stage. The procedure is given in the pseudocode below:

```
sns_2st_dec(
    input/output snsq, i:1st stage o:1st+2nd stage
    input indx, i: index[ ] (4 bits per words))
)
{
    float scale=1.0/2.5;
    Derive from indices indx the quantized M residuals xq,
        from the 2-split AVQ decoding function. AVQ_de-
        c_lpc(indx, xq, 2);
    Reconstruct the final quantized SNS parameters by
        adding the scaled residuals
    for (i=0; i<M; i++)
    {
        snsq[i]=snsq[i]+scale*(float) xq[i];
    }
}
```

Regarding scaling or amplification/weighting of the residual on the encoder side and scaling or attenuation/weighting on the decoder side, the weighting factors are not calculated separately for each value or split but a single weight or a small number of different weight (as an approximation to avoid complexity) are used to scale all the parameters. This scaling is a factor that determines the trade-off of e.g. coarse quantization (more quantizations to zero) bitrate savings and quantization precision (with respective spectral distortion), and can be predetermined in the encoder so that this predetermined value does not have to be transmitted to the decoder but can be fixedly set or initialized in the decoder to save transmission bits. Therefore, a higher scaling of the residual would entail more bits but have minimal spectral distortion, while reducing the scale would save additional bits and if spectral distortion is kept in an acceptable range, that could serve as a means of additional bitrate saving.

Advantages of Embodiments
  Substantial bit savings when two channels are correlated and SNS parameters are coded jointly.
  An example of bits per frame savings achieved in the system described in the previous section are shown below:
    Independent: 88.1 bits on average
    New-independent: 72.0 bits on average
    New-joint: 52.1 bits on average
  where
    "Independent" is the MDCT stereo implementation described in [8] using SNS [6] for the FDNS coding the two channels only independently with 2 stage VQ
      First stage: 8-bit trained codebook (16 dimension)
      Second stage: AVQ of the residual scaled with a factor of 4 (variable bitrate)
    "New-independent" refers on the previously described embodiment of the invention where correlation of the two channels is not high enough and they are coded separately, using a new VQ 2-stage approach as described above and residual is scaled with a reduced factor of 2.5
    "New-joint" refers to the jointly coded case (also described above), where again in the second stage the residual is scaled with a reduced factor of 2.5.
  Another advantage of the proposed method is computational complexity savings. As shown in [6] the new SNS is more optimal in terms of computational complexity from the LPC-based FDNS described in [5] due the autocorrelation computations that are needed to estimate the LPCs. Therefore, when comparing the computational complexity of the MDCT-based stereo system from [8] where improved LPC-based FDNS [5] is used to an implementation where the new SNS [6]

replaces the LPC-based approach, there are savings of approx. 6 WMOPS at 32 kHz sampling rate.

Additionally, the new two-stage quantization with VQ for the first stage and AVQ with reduced scale for the second stage achieves some further reduction of computational complexity. For the embodiment described in the previous section computational complexity is reduced further by approx. 1 WMOPS at 32 kHz sampling rate, with the trade-off of acceptable spectral distortion.

Summary of Embodiments or Aspects

1. Joint coding of spectral noise shaping parameters, where mid/side representation of the parameters is calculated and mid is coded using quantization and entropy coding and side is coded using a coarser quantization scheme.
2. Adaptively determine whether noise shaping parameters should be coded independently or jointly based on channel correlation or coherence.
3. Signaling bit sent to determine whether parameters where coded independently or jointly.
4. Applications based on the MDCT stereo implementation:
    signaling with bits where side coefficients are zero that the SNS is used
    that the power spectrum is used for calculating SNS
    that 2 splits with 5 bits is used in the first stage.
    Adjusting the scaling of the residual of the second stage AVQ may further reduce the number of bits for the second stage quantization.

Figure 23:
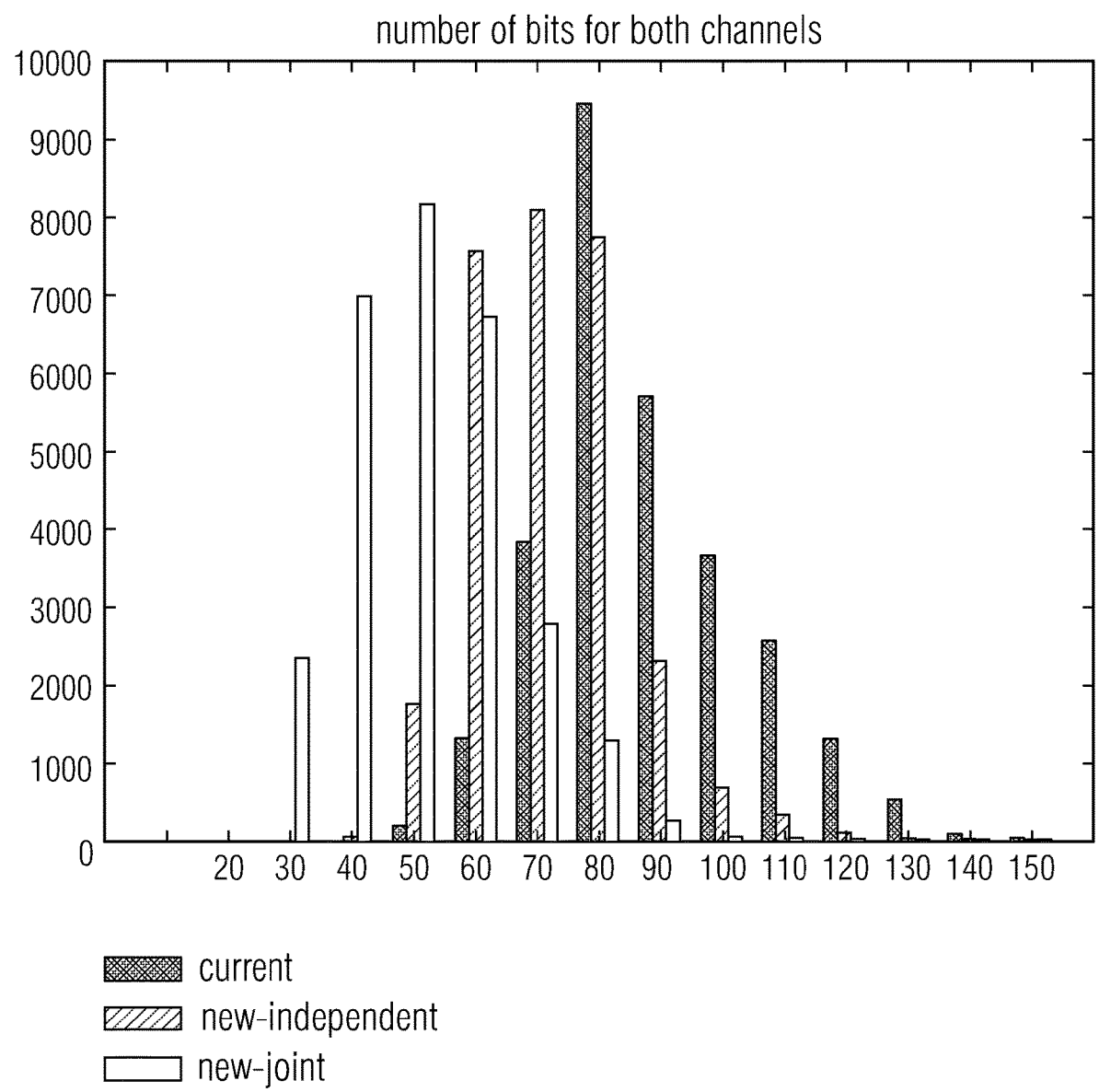
FIG. 23 illustrates a histogram comparing different inventive procedures.
Figure 24:
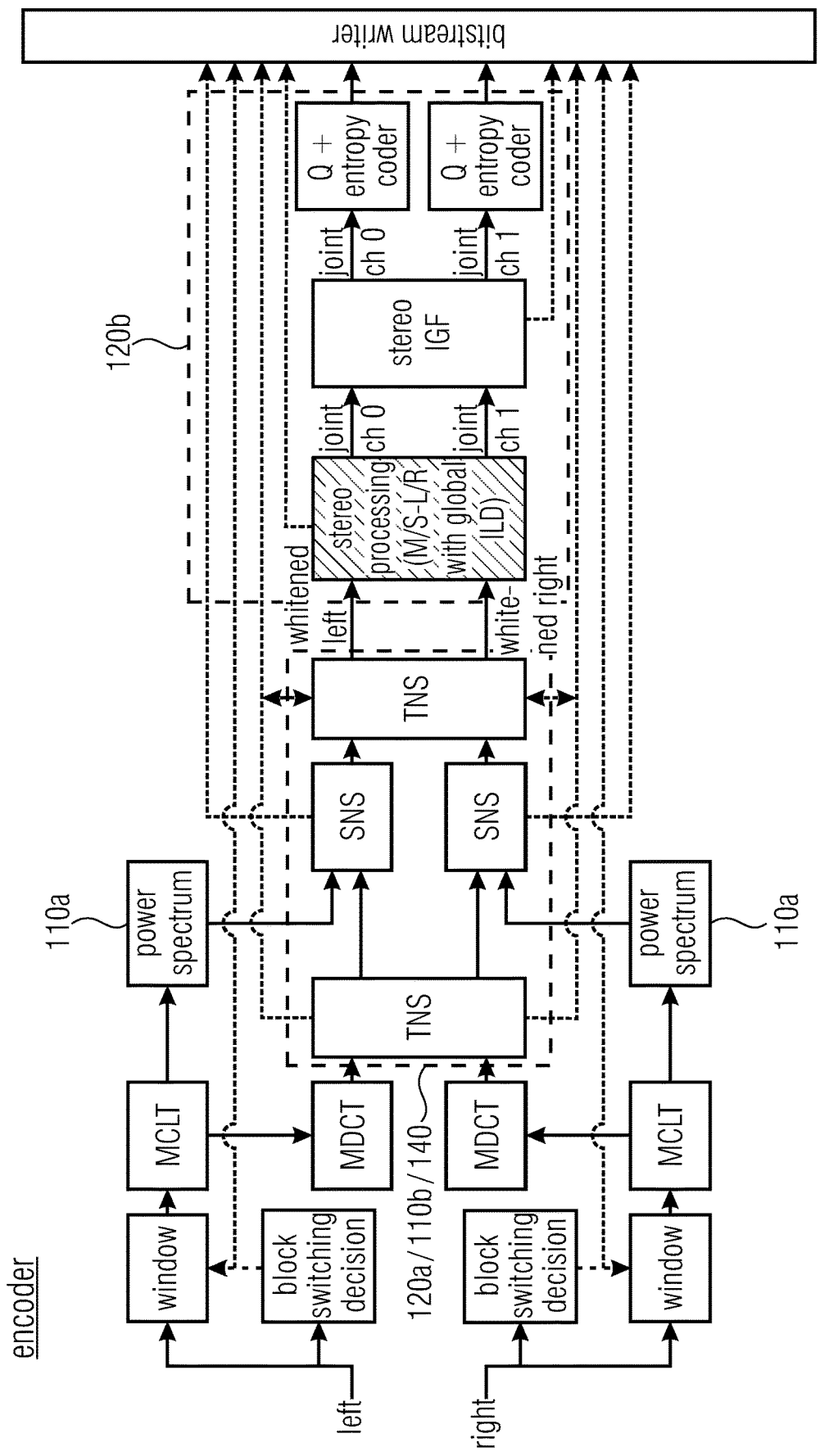
FIG. 24 illustrates an embodiment of an encoder.
Figure 25:
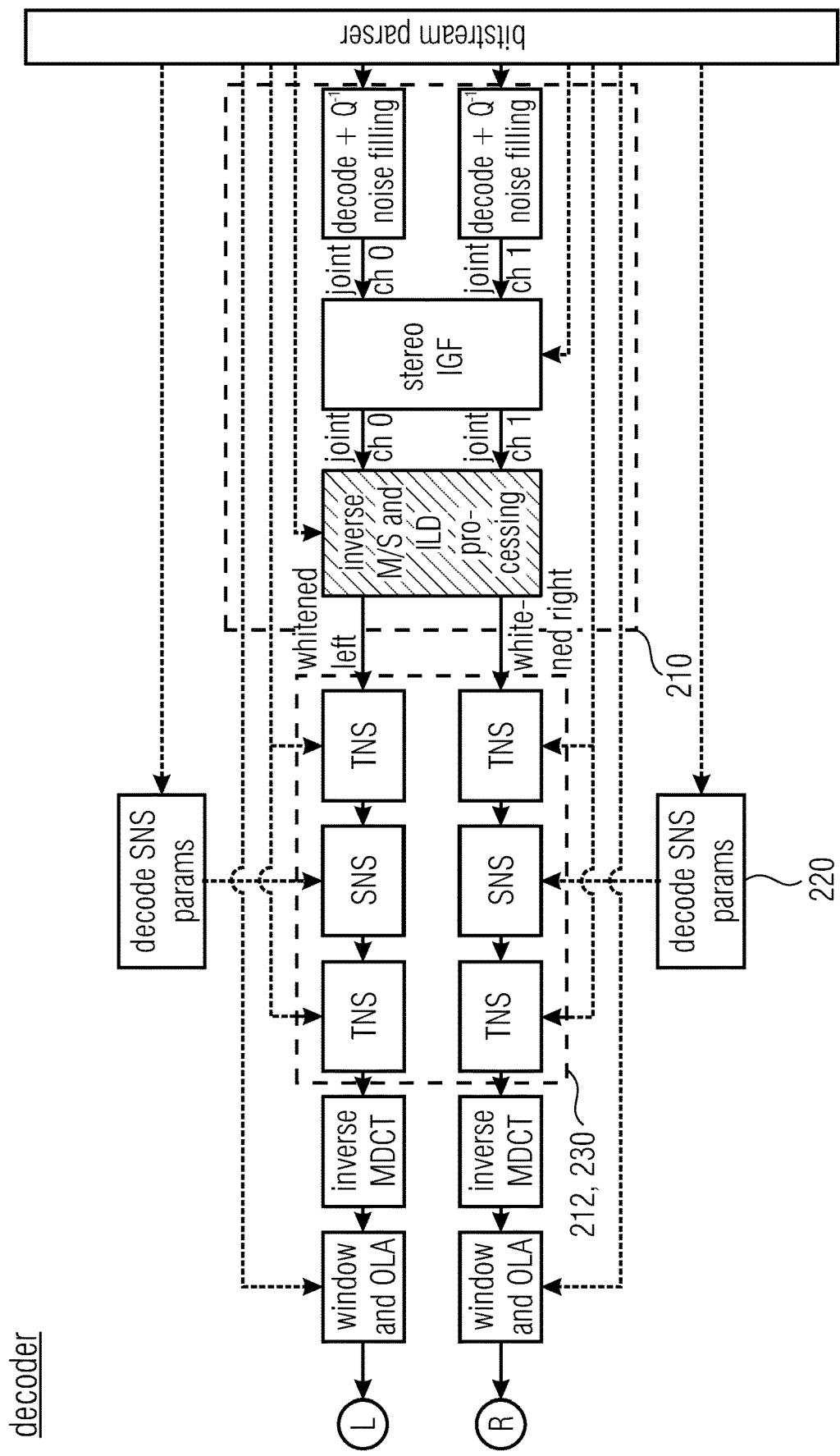
FIG. 25 illustrates an embodiment of a decoder.

FIG. 23 illustrates a comparison in the number of bits for both channels in line with a current known implementation (described as "independent" above), the new independent implementation in accordance with the second aspect of the present invention and for the new joint implementation in accordance with the first aspect of the present invention. FIG. 23 illustrates a histogram where the vertical axis represents the frequency of occurrence and the horizontal axis illustrates the bins of total number of bits for coding the parameters for both channels.

Subsequently, further embodiments are illustrated where a specific emphasis is given to the calculation of the scale factors for each audio channel and where additionally specific emphasis is given to the specific application of downsampling and upsampling of the scale parameters, which is applied either before or subsequent to the calculation of the jointly encoded scale parameters as illustrated with respect to FIG. 3a, FIG. 3b.

Figure 11:
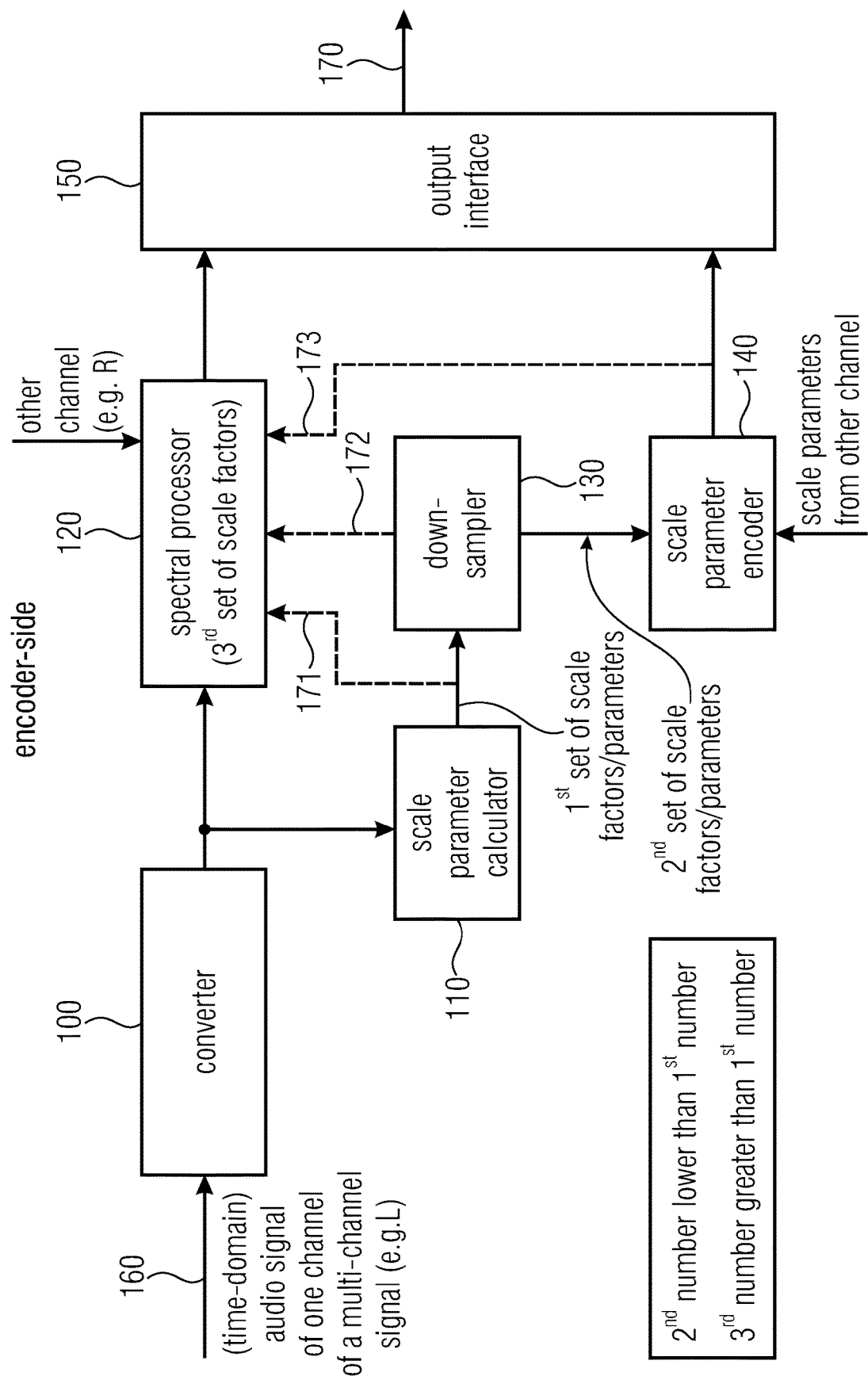
FIG. 11 is a block diagram of an apparatus for encoding an audio signal.

FIG. 11 illustrates an apparatus for encoding an audio signal 160. The audio signal 160 may be available in the time-domain, although other representations of the audio signal such as a prediction-domain or any other domain would principally also be useful. The apparatus comprises a converter 100, a scale factor calculator 110, a spectral processor 120, a downsampler 130, a scale factor encoder 140 and an output interface 150. The converter 100 is configured for converting the audio signal 160 into a spectral representation. The scale factor calculator 110 is configured for calculating a first set of scale parameters or scale factors from the spectral representation. The other channel is received at block 120, and the scale parameters from the other channels are received by block 140.

Throughout the specification, the term "scale factor" or "scale parameter" is used in order to refer to the same parameter or value, i.e., a value or parameter that is, subsequent to some processing, used for weighting some kind of spectral values. This weighting, when performed in the linear domain is actually a multiplying operation with a scaling factor. However, when the weighting is performed in a logarithmic domain, then the weighting operation with a scale factor is done by an actual addition or subtraction operation. Thus, in the terms of the present application, scaling does not only mean multiplying or dividing but also means, depending on the certain domain, addition or subtraction or, generally means each operation, by which the spectral value, for example, is weighted or modified using the scale factor or scale parameter.

The downsampler 130 is configured for downsampling the first set of scale parameters to obtain a second set of scale parameters, wherein a second number of the scale parameters in the second set of scale parameters is lower than a first number of scale parameters in the first set of scale parameters. This is also outlined in the box in FIG. 11 stating that the second number is lower than the first number. As illustrated in FIG. 11, the scale factor encoder is configured for generating an encoded representation of the second set of scale factors, and this encoded representation is forwarded to the output interface 150. Due to the fact that the second set of scale factors has a lower number of scale factors than the first set of scale factors, the bitrate for transmitting or storing the encoded representation of the second set of scale factors is lower compared to a situation, in which the downsampling of the scale factors performed in the downsampler 130 would not have been performed.

Furthermore, the spectral processor 120 is configured for processing the spectral representation output by the converter 100 in FIG. 11 using a third set of scale parameters, the third set of scale parameters or scale factors having a third number of scale factors being greater than the second number of scale factors, wherein the spectral processor 120 is configured to use, for the purpose of spectral processing the first set of scale factors as already available from block 110 via line 171. Alternatively, the spectral processor 120 is configured to use the second set of scale factors as output by the downsampler 130 for the calculation of the third set of scale factors as illustrated by line 172. In a further implementation, the spectral processor 120 uses the encoded representation output by the scale factor/parameter encoder 140 for the purpose of calculating the third set of scale factors as illustrated by line 173 in FIG. 11. Advantageously, the spectral processor 120 does not use the first set of scale factors, but uses either the second set of scale factors as calculated by the downsampler or even more advantageously uses the encoded representation or, generally, the quantized second set of scale factors and, then, performs an interpolation operation to interpolate the quantized second set of spectral parameters to obtain the third set of scale parameters that has a higher number of scale parameters due to the interpolation operation.

Thus, the encoded representation of the second set of scale factors that is output by block 140 either comprises a codebook index for a advantageously used scale parameter codebook or a set of corresponding codebook indices. In other embodiments, the encoded representation comprises the quantized scale parameters of quantized scale factors that are obtained, when the codebook index or the set of codebook indices or, generally, the encoded representation is input into a decoder-side vector decoder or any other decoder.

Advantageously, the spectral processor 120 uses the same set of scale factors that is also available at the decoder-side, i.e., uses the quantized second set of scale parameters together with an interpolation operation to finally obtain the third set of scale factors.

In an embodiment, the third number of scale factors in the third set of scale factors is equal to the first number of scale factors. However, a smaller number of scale factors is also useful. Exemplarily, for example, one could derive 64 scale factors in block 110, and one could then downsample the 64 scale factors to 16 scale factors for transmission. Then, one could perform an interpolation not necessarily to 64 scale factors, but to 32 scale factors in the spectral processor 120. Alternatively, one could perform an interpolation to an even higher number such as more than 64 scale factors as the case may be, as long as the number of scale factors transmitted in the encoded output signal 170 is smaller than the number of scale factors calculated in block 110 or calculated and used in block 120 of FIG. 11.

Figure 12:
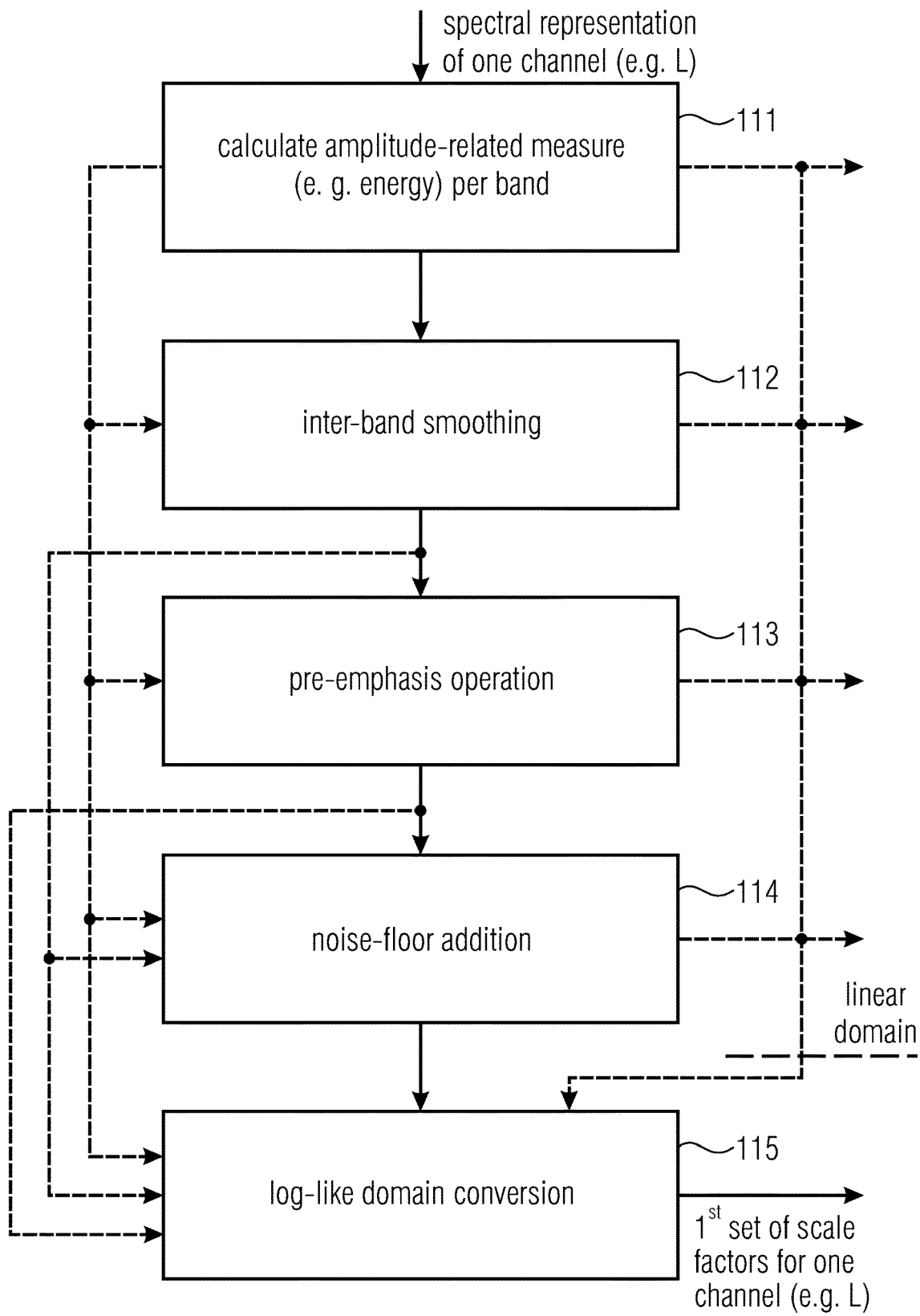
FIG. 12 is a schematic representation of an implementation of the scale factor calculator of FIG. 1.

Advantageously, the scale factor calculator 110 is configured to perform several operations illustrated in FIG. 12. These operations refer to a calculation 111 of an amplitude-related measure per band, where the spectral representation for one channel is input into block 111. The calculation for the other channel will take place in a similar manner. An advantageous amplitude-related measure per band is the energy per band, but other amplitude-related measures can be used as well, for example, the summation of the magnitudes of the amplitudes per band or the summation of squared amplitudes which corresponds to the energy. However, apart from the power of 2 used for calculating the energy per band, other powers such as a power of 3 that would reflect the loudness of the signal could also be used and, even powers different from integer numbers such as powers of 1.5 or 2.5 can be used as well in order to calculate amplitude-related measures per band. Even powers less than 1.0 can be used as long as it is made sure that values processed by such powers are positive-valued.

A further operation performed by the scale factor calculator can be an inter-band smoothing 112. This inter-band smoothing may be used to smooth out the possible instabilities that can appear in the vector of amplitude-related measures as obtained by step 111. If one would not perform this smoothing, these instabilities would be amplified when converted to a log-domain later as illustrated at 115, especially in spectral values where the energy is close to 0. However, in other embodiments, inter-band smoothing is not performed.

A further operation performed by the scale factor calculator 110 is the pre-emphasis operation 113. This pre-emphasis operation has a similar purpose as a pre-emphasis operation used in an LPC-based perceptual filter of the MDCT-based TCX processing as discussed before with respect to the known technology. This procedure increases the amplitude of the shaped spectrum in the low-frequencies that results in a reduced quantization noise in the low-frequencies.

However, depending on the implementation, the pre-emphasis operation—as the other specific operations—does not necessarily have to be performed.

A further optional processing operation is the noise-floor addition processing 114. This procedure improves the quality of signals containing very high spectral dynamics such as, for example, Glockenspiel, by limiting the amplitude amplification of the shaped spectrum in the valleys, which has the indirect effect of reducing the quantization noise in the peaks, at the cost of an increase of quantization noise in the valleys, where the quantization noise is anyway not perceptible due to masking properties of the human ear such as the absolute listening threshold, the pre-masking, the post-masking or the general masking threshold indicating that, typically, a quite low volume tone relatively close in frequency to a high volume tone is not perceptible at all, i.e., is fully masked or is only roughly perceived by the human hearing mechanism, so that this spectral contribution can be quantized quite coarsely.

The noise-floor addition operation 114, however, does not necessarily have to be performed.

Furthermore, block 115 indicates a log-like domain conversion. Advantageously, a transformation of an output of one of blocks 111, 112, 113, 114 in FIG. 12 is performed in a log-like domain. A log-like domain is a domain, in which values close to 0 are expanded and high values are compressed. Advantageously, the log domain is a domain with basis of 2, but other log domains can be used as well. However, a log domain with the basis of 2 is better for an implementation on a fixed-point signal processor.

The output of the scale factor calculator 110 is a first set of scale factors.

As illustrated in FIG. 12, each of the blocks 112 to 115 can be bridged, i.e., the output of block 111, for example, could already be the first set of scale factors. However, all the processing operations and, particularly, the log-like domain conversion are of advantage. Thus, one could even implement the scale factor calculator by only performing steps 111 and 115 without the procedures in steps 112 to 114, for example. At the output of block 115, a set of scale parameters for a channel (such as L) is obtained and a set of scale parameters for the other channel (such as R) can also be obtained by a similar calculation.

Thus, the scale factor calculator is configured for performing one or two or more of the procedures illustrated in FIG. 12 as indicated by the input/output lines connecting several blocks.

Figure 13:
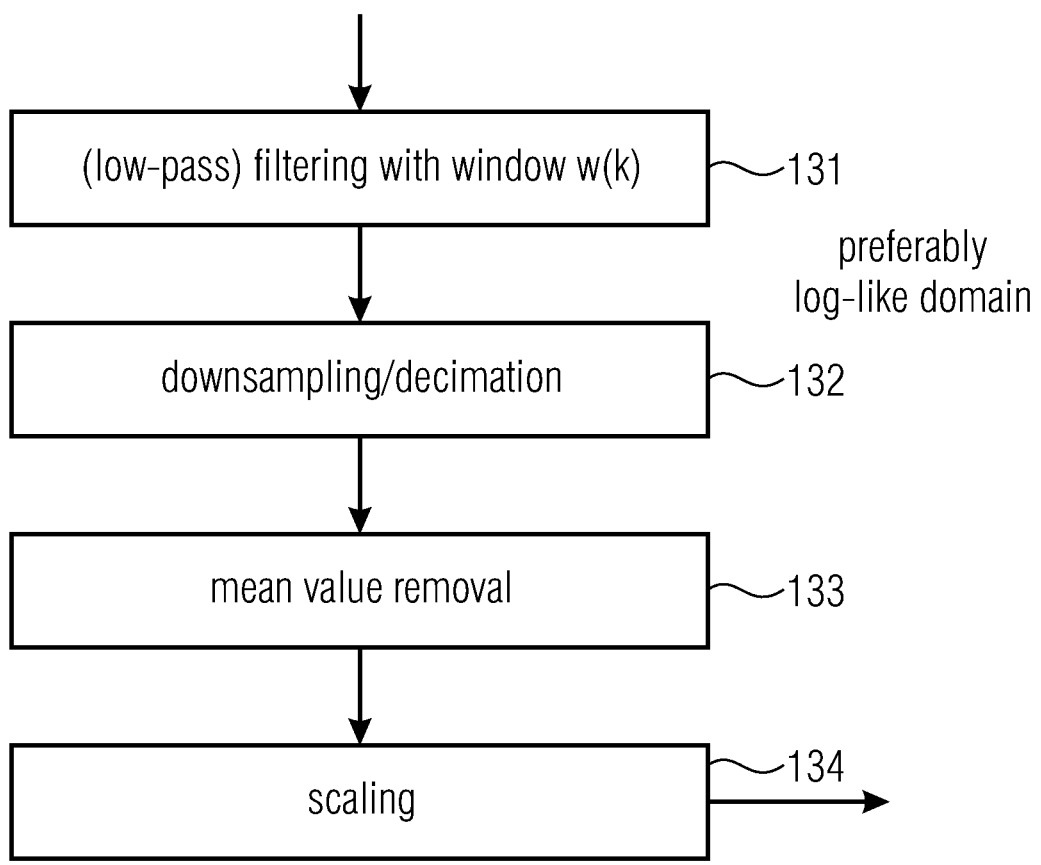
FIG. 13 is a schematic representation of an implementation of the downsampler of FIG. 1.

FIG. 13 illustrates an implementation of the downsampler 130 of FIG. 11 again for a single channel. The data for the other channel is calculated in a similar way. Advantageously, a low-pass filtering or, generally, a filtering with a certain window w(k) is performed in step 131, and, then, a down-sampling/decimation operation of the result of the filtering is performed. Due to the fact that low-pass filtering 131 and in embodiments the downsampling/decimation operation 132 are both arithmetic operations, the filtering 131 and the downsampling 132 can be performed within a single operation as will be outlined later on. Advantageously, the down-sampling/decimation operation is performed in such a way that an overlap among the individual groups of scale parameters of the first set of scale parameters is performed. Advantageously, an overlap of one scale factor in the filtering operation between two decimated calculated parameters is performed. Thus, step 131 performs a low-pass filter on the vector of scale parameters before decimation. This low-pass filter has a similar effect as the spreading function used in psychoacoustic models. It reduces the quantization noise at the peaks, at the cost of an increase of quantization noise around the peaks where it is anyway perceptually masked at least to a higher degree with respect to quantization noise at the peaks.

Furthermore, the downsampler additionally performs a mean value removal 133 and an additional scaling step 134. However, the low-pass filtering operation 131, the mean value removal step 133 and the scaling step 134 are only optional steps. Thus, the downsampler illustrated in FIG. 13 or illustrated in FIG. 11 can be implemented to only perform step 132 or to perform two steps illustrated in FIG. 13 such as step 132 and one of the steps 131, 133 and 134. Alternatively, the downsampler can perform all four steps or only three steps out of the four steps illustrated in FIG. 13 as long as the downsampling/decimation operation 132 is performed.

As outlined in FIG. 13, audio operations in FIG. 13 performed by the downsampler are performed in the log-like domain in order to obtain better results.

Figure 15:
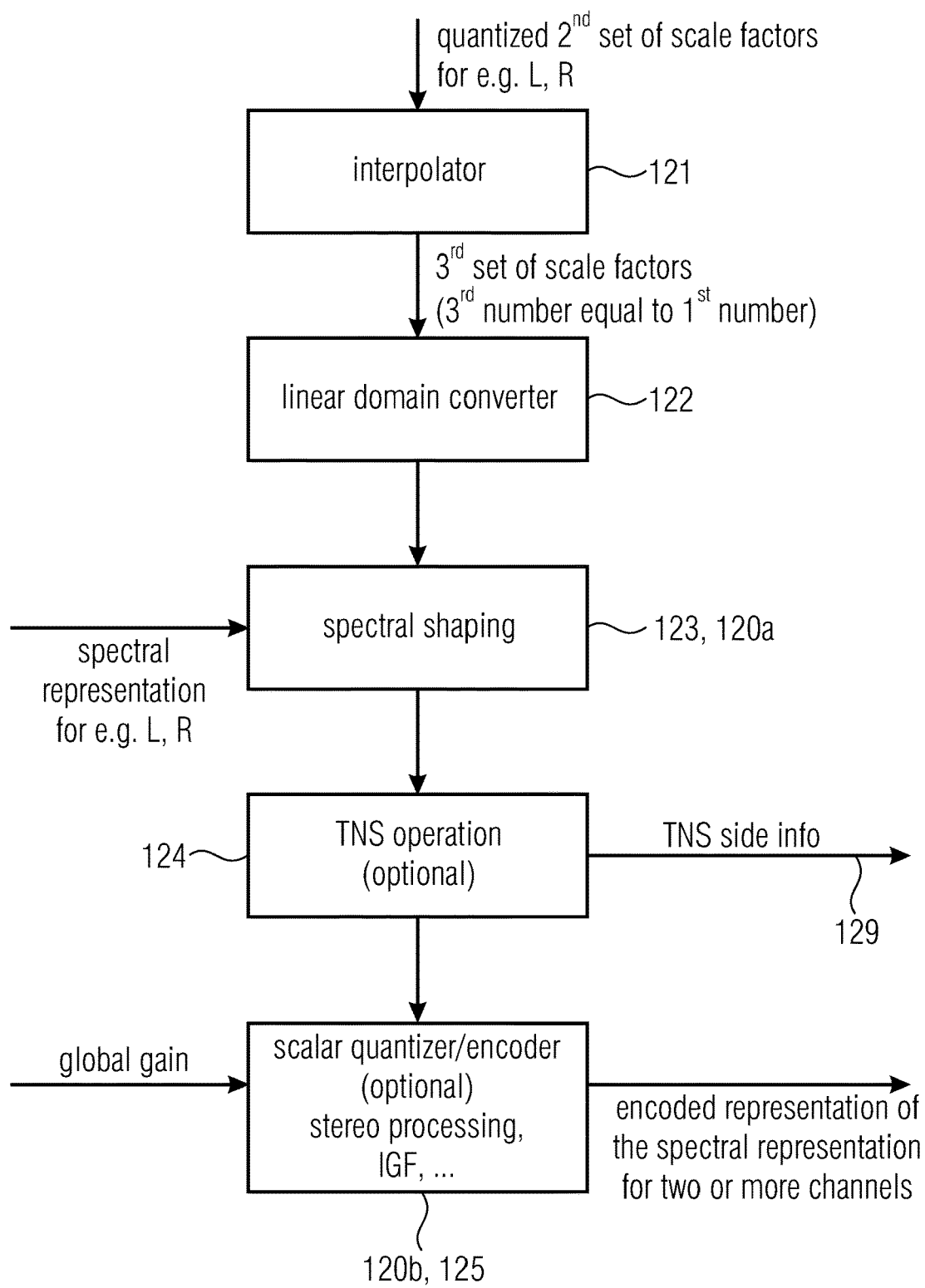
FIG. 15 is a schematic illustration of the spectral processor of FIG. 1.

FIG. 15 illustrates an implementation of the spectral processor. The spectral processor 120 included within the encoder of FIG. 11 comprises an interpolator 121 that receives the quantized second set of scale parameters for each channel or alternatively for a group of jointly encoded scale parameters and that outputs the third set of scale parameters for a channel of for a group of jointly encoded scale parameters where the third number is greater than the second number and advantageously equal to the first number. Furthermore, the spectral processor comprises a linear domain converter 120. Then, a spectral shaping is performed in block 123 using the linear scale parameters on the one hand and the spectral representation on the other hand that is obtained by the converter 100. Advantageously, a subsequent temporal noise shaping operation, i.e., a prediction over frequency is performed in order to obtain spectral residual values at the output of block 124, while the TNS side information is forwarded to the output interface as indicated by arrow 129.

Finally, the spectral processor 125, 120b has at least one of a scalar quantizer/encoder that is configured for receiving a single global gain for the whole spectral representation, i.e., for a whole frame, and a stereo processing functionality and an IGF processing functionality, etc. Advantageously, the global gain is derived depending on certain bitrate considerations. Thus, the global gain is set so that the encoded representation of the spectral representation generated by block 125, 120b fulfils certain requirements such as a bitrate requirement, a quality requirement or both. The global gain can be iteratively calculated or can be calculated in a feed forward measure as the case may be. Generally, the global gain is used together with a quantizer and a high global gain typically results in a coarser quantization where a low global gain results in a finer quantization. Thus, in other words, a high global gain results in a higher quantization step size while a low global gain results in a smaller quantization step size when a fixed quantizer is obtained. However, other quantizers can be used as well together with the global gain functionality such as a quantizer that has some kind of compression functionality for high values, i.e., some kind of non-linear compression functionality so that, for example, the higher values are more compressed than lower values. The above dependency between the global gain and the quantization coarseness is valid, when the global gain is multiplied to the values before the quantization in the linear domain corresponding to an addition in the log domain. If, however, the global gain is applied by a division in the linear domain, or by a subtraction in the log domain, the dependency is the other way round. The same is true, when the "global gain" represents an inverse value.

Subsequently, implementations of the individual procedures described with respect to FIG. 11 to FIG. 15 are given.
Detailed Step-by-Step Description of Embodiments
Encoder:
Step 1: Energy Per Band (111)
The energies per band $E_B(n)$ are computed as follows:

$$E_B(b) = \sum_{k=Ind(b)}^{Ind(b+1)-1} \frac{X(k)^2}{Ind(b+1) - Ind(b)} \text{ for } b = 0 \ldots N_B - 1$$

with $X(k)$ are the MDCT coefficients, $N_B=64$ is the number of bands and $Ind(n)$ are the band indices. The bands are non-uniform and follow the perceptually-relevant bark scale (smaller in low-frequencies, larger in high-frequencies).

Step 2: Smoothing (112)

The energy per band $E_B(b)$ is smoothed using $$E_S(b) = \begin{cases} 0.75 \cdot E_B(0) + 0.25 \cdot E_B(1) & , \text{if } b = 0 \\ 0.25 \cdot E_B(62) + 0.75 \cdot E_B(63) & , \text{if } b = 63 \\ 0.25 \cdot E_B(b-1) + 0.5 \cdot E_B(b) + 0.25 \cdot E_B(b+1) & , \text{otherwise} \end{cases}$$

Remark: this step is mainly used to smooth the possible instabilities that can appear in the vector $E_B(b)$. If not smoothed, these instabilities are amplified when converted to log-domain (see step 5), especially in the valleys where the energy is close to 0.

Step 3: Pre-Emphasis (113)

The smoothed energy per band $E_S(b)$ is then pre-emphasized using $$E_P(b) = E_S(b) \cdot 10^{\frac{b \cdot g_{tilt}}{10 \cdot 63}} \text{ for } b = 0 \ldots 63$$

with $g_{tilt}$ controls the pre-emphasis tilt and depends on the sampling frequency. It is for example 18 at 16 kHz and 30 at 48 KHz. The pre-emphasis used in this step has the same purpose as the pre-emphasis used in the LPC-based perceptual filter of known technology 2, it increases the amplitude of the shaped Spectrum in the low-frequencies, resulting in reduced quantization noise in the low-frequencies.

Step 4: Noise Floor (114)

A noise floor at −40 dB is added to $E_P(b)$ using $$E_P(b) = \max(E_P(b), \text{noiseFloor}) \text{ for } b=0 \ldots 63$$

with the noise floor being calculated by $$noiseFloor = \max\left(\frac{\sum_{b=0}^{63} E_P(b)}{64} \cdot 10^{-\frac{40}{10}}, 2^{-32}\right)$$

$$noiseFloor = \max\left(\frac{\sum_{b=0}^{63} E_P(b)}{64} \cdot 10^{-\frac{40}{10}}, 2^{-32}\right)$$

This step improves quality of signals containing very high spectral dynamics such as e.g. glockenspiel, by limiting the amplitude amplification of the shaped spectrum in the valleys, which has the indirect effect of reducing the quantization noise in the peaks, at the cost of an increase of quantization noise in the valleys where it is anyway not perceptible.

Step 5: Logarithm (115)

A transformation into the logarithm domain is then performed using $$E_L(b) = \frac{\log_2(E_P(b))}{2} \text{ for } b = 0 \ldots 63$$

Step 6: Downsampling (131, 132)

The vector $E_L(b)$ is then downsampled by a factor of 4 using $$E_4(b) = \begin{cases} w(0)E_L(0) + \sum_{k=1}^{5} w(k)E_L(4b+k-1) & , \text{if } b = 0 \\ \sum_{k=0}^{4} w(k)E_L(4b+k-1)w(5)E_L(63) & , \text{if } b = 15 \\ \sum_{k=0}^{5} w(k)E_L(4b+k-1) & , \text{otherwise} \end{cases}$$

With $$w(k) = \left\{\frac{1}{12}, \frac{2}{12}, \frac{3}{12}, \frac{3}{12}, \frac{2}{12}, \frac{1}{12}\right\}$$

$$w(k) = \left\{\frac{1}{12}, \frac{2}{12}, \frac{3}{12}, \frac{3}{12}, \frac{2}{12}, \frac{1}{12}\right\}$$

This step applies a low-pass filter (w(k)) on the vector $E_L(b)$ before decimation. This low-pass filter has a similar effect as the spreading function used in psychoacoustic models: it reduces the quantization noise at the peaks, at the cost of an increase of quantization noise around the peaks where it is anyway perceptually masked.

Step 7: Mean Removal and Scaling (133, 134)

The final scale factors are obtained after mean removal and scaling by a factor of 0.85

$$scf(n) = 0.85\left(E_4(n) - \frac{\sum_{b=0}^{15} E_4(b)}{16}\right) \text{ for } n = 0 \ldots 15$$

$$scf(n) = 0.85\left(E_4(n) - \frac{\sum_{b=0}^{15} E_4(b)}{16}\right) \text{ for } n = 0 \ldots 15$$

Since the codec has an additional global-gain, the mean can be removed without any loss of information. Removing the mean also allows more efficient vector quantization. The scaling of 0.85 slightly compress the amplitude of the noise shaping curve. It has a similar perceptual effect as the spreading function mentioned in Step 6: reduced quantization noise at the peaks and increased quantization noise in the valleys.

Step 8: Quantization (141, 142)

The scale factors are quantized using vector quantization, producing indices which are then packed into the bitstream and sent to the decoder, and quantized scale factors scfQ(n).

Step 9: Interpolation (121, 122)

The quantized scale factors scfQ(n) are interpolated using $$scfQint(0) = scfQ(0)$$

$$scfQint(1) = scfQ(0)$$

$$scfQint(4n+2) = scfQ(n) + \frac{1}{8}(scfQ(n+1) - scfQ(n)) \text{ for } n = 0 \ldots 14$$

$$scfQint(4n+3) = scfQ(n) + \frac{3}{8}(scfQ(n+1) - scfQ(n)) \text{ for } n = 0 \ldots 14$$

$$scfQint(4n+4) = scfQ(n) + \frac{5}{8}(scfQ(n+1) - scfQ(n)) \text{ for } n = 0 \ldots 14$$

$$scfQint(4n+5) = scfQ(n) + \frac{7}{8}(scfQ(n+1) - scfQ(n)) \text{ for } n = 0 \ldots 14$$

$$scfQint(62) = scfQ(15) + \frac{1}{8}(scfQ(15) - scfQ(14))$$

$$scfQint(63) = scfQ(15) + \frac{3}{8}(scfQ(15) - scfQ(14))$$

and transformed back into linear domain using $$g_{SNS}(b) = 2^{scfQint(b)} \text{ for } b = 0 \ldots 63$$

$$g_{SNS}(b) = 2^{scfQint(b)} \text{ for } b = 0 \ldots 63$$

Interpolation is used to get a smooth noise shaping curve and thus to avoid any big amplitude jumps between adjacent bands.

Step 10: Spectral Shaping (123)

The SNS scale factors $g_{SNS}(b)$ are applied on the MDCT frequency lines for each band separately in order to generate the shaped spectrum $X_s(k)$ $$X_s(k) = \frac{X(k)}{g_{SNS}(b)} \text{ for } k = Ind(b) \ldots Ind(b+1) - 1, \text{ for } b = 0 \ldots 63$$

Figure 18:
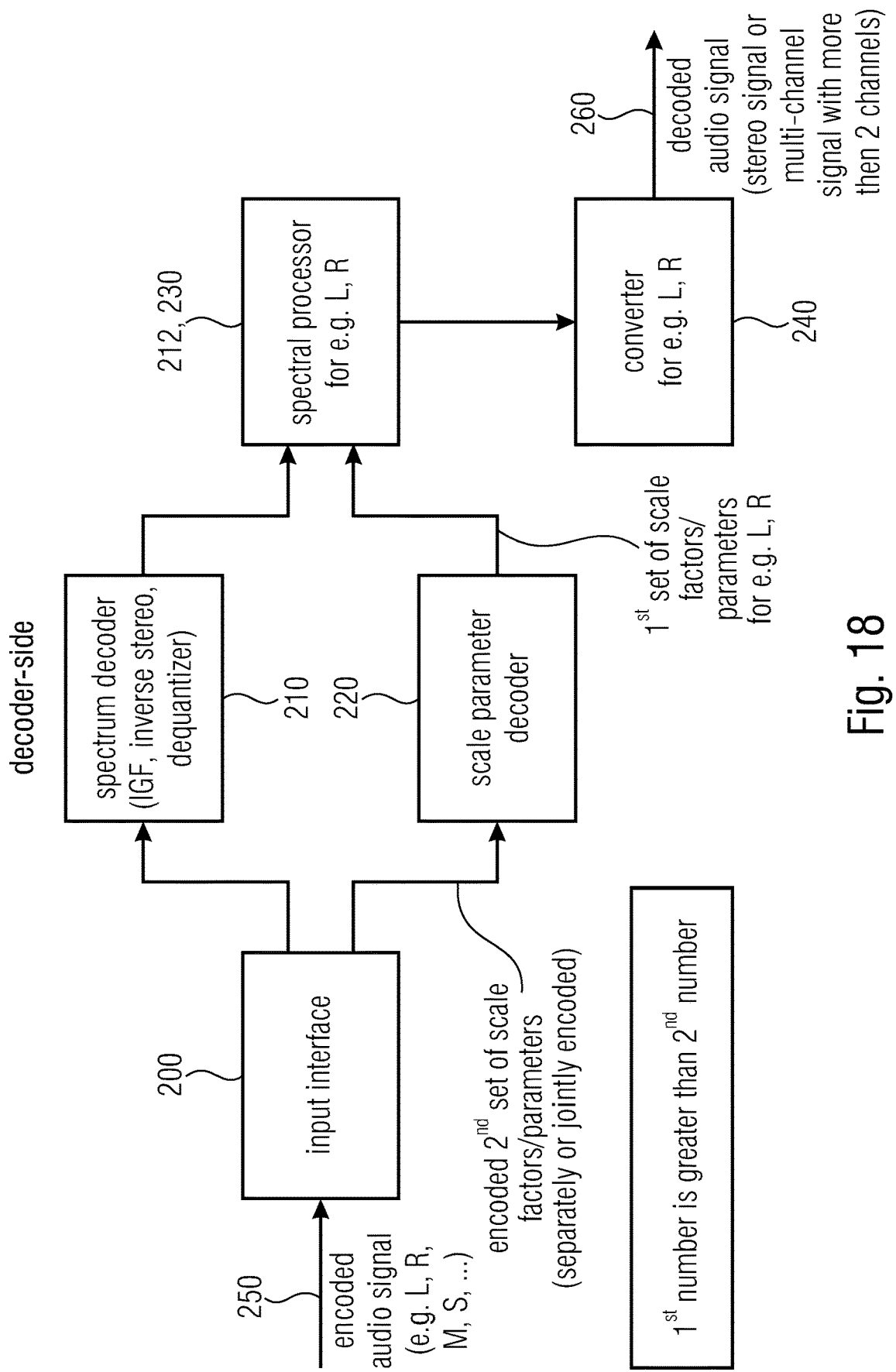
FIG. 18 illustrates a block diagram of an apparatus for decoding an encoded audio signal.

FIG. 18 illustrates an implementation of an apparatus for decoding an encoded audio signal 250 (a stereo signal encoded as L, R or M, S) comprising information on an encoded spectral representation and information on an encoded representation of a second set of scale parameters (separately of jointly encoded). The decoder comprises an input interface 200, a spectrum decoder 210 (e.g. performing IGF processing or inverse stereo processing or dequantization processing), a scale factor/parameter decoder 220, a spectral processor 230 (e.g. for R, L) and a converter 240 (e.g. for R, L). The input interface 200 is configured for receiving the encoded audio signal 250 and for extracting the encoded spectral representation that is forwarded to the spectrum decoder 210 and for extracting the encoded representation of the second set of scale factors that is forwarded to the scale factor decoder 220. Furthermore, the spectrum decoder 210 is configured for decoding the encoded spectral representation to obtain a decoded spectral representation that is forwarded to the spectral processor 230. The scale factor decoder 220 is configured for decoding the encoded second set of scale parameters to obtain a first set of scale parameters forwarded to the spectral processor 230. The first set of scale factors has a number of scale factors or scale parameters that is greater than the number of scale factors or scale parameters in the second set. The spectral processor 230 is configured for processing the decoded spectral representation using the first set of scale parameters to obtain a scaled spectral representation. The scaled spectral representation is then converted by the converter 240 to finally obtain the decoded audio signal 260 being a stereo signal or a multichannel signal with more than two channels.

Figure 19:
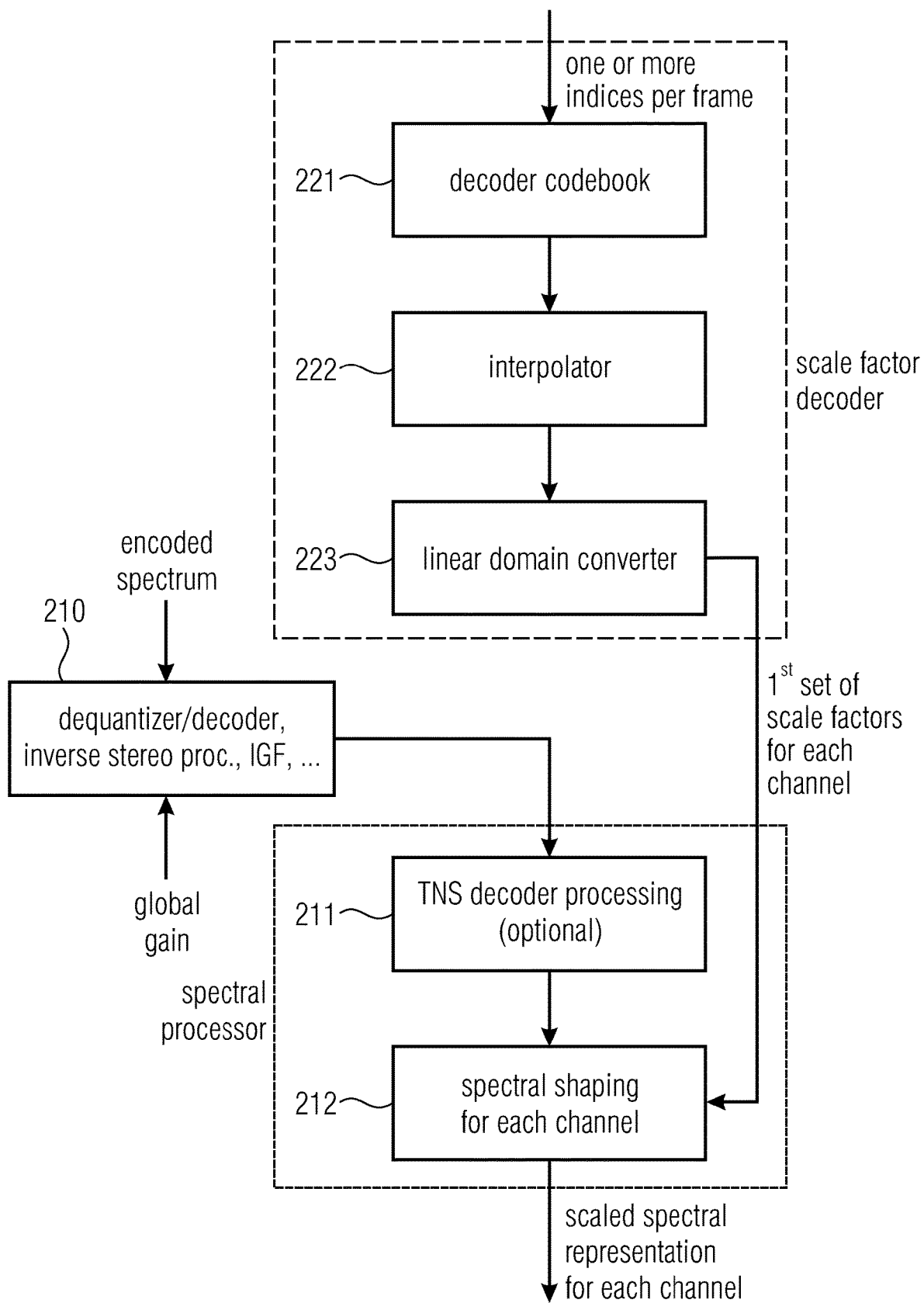
FIG. 19 illustrates a schematic illustration illustrating details of the scale factor decoder, the spectral processor and the spectrum decoder of FIG. 8.

Advantageously, the scale factor decoder 220 is configured to operate in substantially the same manner as has been discussed with respect to the spectral processor 120 of FIG. 11 relating to the calculation of the third set of scale factors or scale parameters as discussed in connection with blocks 141 or 142 and, particularly, with respect to blocks 121, 122 of FIG. 15. Particularly, the scale factor decoder is configured to perform the substantially same procedure for the interpolation and the transformation back into the linear domain as has been discussed before with respect to step 9. Thus, as illustrated in FIG. 19, the scale factor decoder 220 is configured for applying a decoder codebook 221 to the one or more indices per frame representing the encoded scale parameter representation. Then, an interpolation is performed in block 222 that is substantially the same interpolation as has been discussed with respect to block 121 in FIG. 15. Then, a linear domain converter 223 is used that is substantially the same linear domain converter 122 as has been discussed with respect to FIG. 15. However, in other implementations, blocks 221, 222, 223 can operate different from what has been discussed with respect to the corresponding blocks on the encoder-side.

Furthermore, the spectrum decoder 210 illustrated in FIG. 18 or 19 comprises a dequantizer/decoder block that receives, as an input, the encoded spectrum and that outputs a dequantized spectrum that may be dequantized using the global gain that is additionally transmitted from the encoder side to the decoder side within the encoded audio signal in an encoded form. The block 210 may also perform IGF processing or inverse stereo processing such as MS decoding. The dequantizer/decoder 210 can, for example, comprise an arithmetic or Huffman decoder functionality that receives, as an input, some kind of codes and that outputs quantization indices representing spectral values. Then, these quantization indices are input into a dequantizer together with the global gain and the output are dequantized spectral values that can then be subjected to a TNS processing such as an inverse prediction over frequency in a TNS decoder processing block 211 that, however, is optional. Particularly, the TNS decoder processing block additionally receives the TNS side information that has been generated by block 124 of FIG. 15 as indicated by line 129. The output of the TNS decoder processing step 211 is input into a spectral shaping block 212 operating for each channel separately using the separate scale factors, where the first set of scale factors as calculated by the scale factor decoder are applied to the decoded spectral representation that can or cannot be TNS processed as the case may be, and the output is the scaled spectral representation for each channel that is then input into the converter 240 of FIG. 18.

Further procedures of embodiments of the decoder are discussed subsequently.
Decoder:
Step 1: Quantization (221)
The vector quantizer indices produced in encoder step 8 are read from the bitstream and used to decode the quantized scale factors scfQ(n).
Step 2: Interpolation (222, 223)
Same as Encoder Step 9.
Step 3: Spectral Shaping (212)
The SNS scale factors $g_{SNS}(b)$ are applied on the quantized MDCT frequency lines for each band separately in order to generate the decoded spectrum $\hat{X}(k)$ as outlined by the following code.

Figure 16:
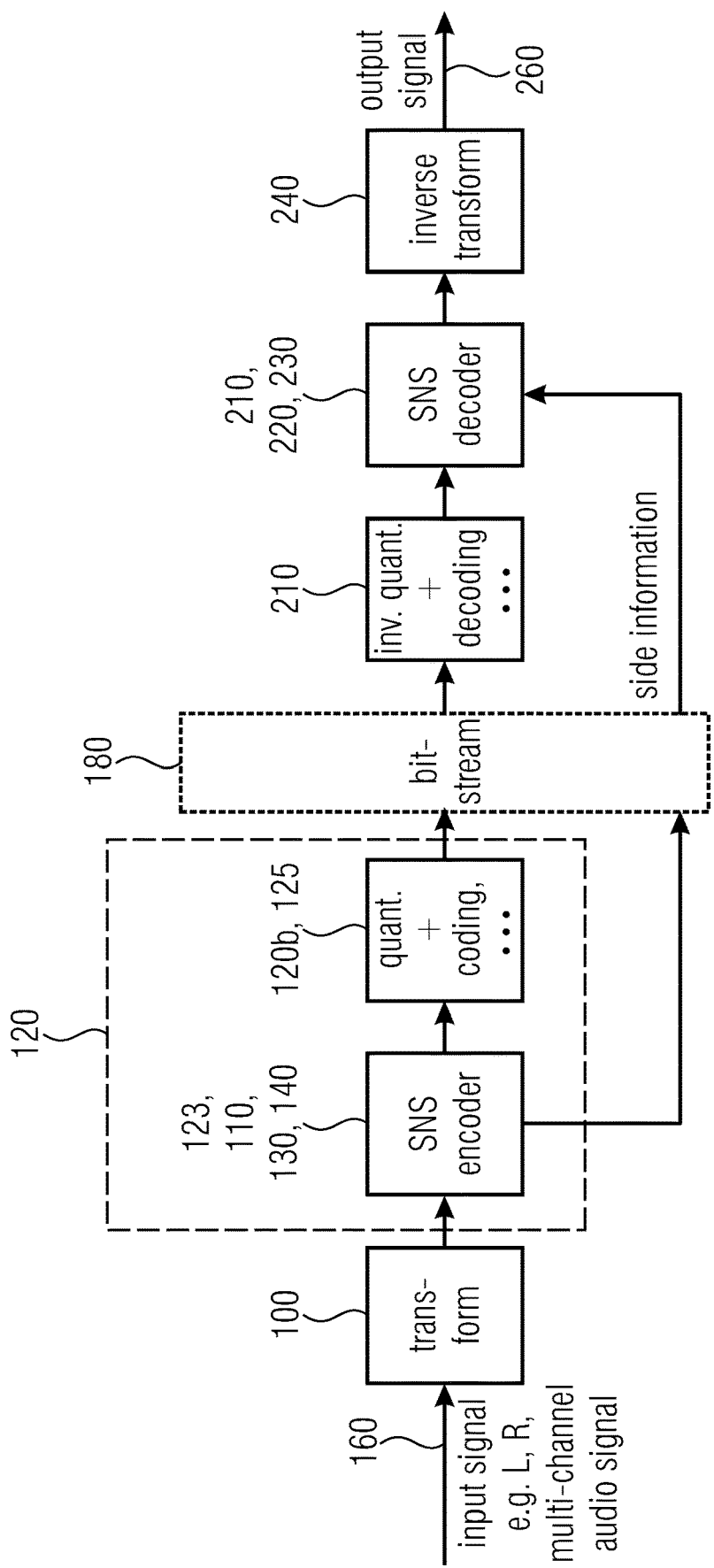
FIG. 16 illustrates a general representation of an encoder on the one hand and a decoder on the other hand implementing spectral noise shaping (SNS)
Figure 17:
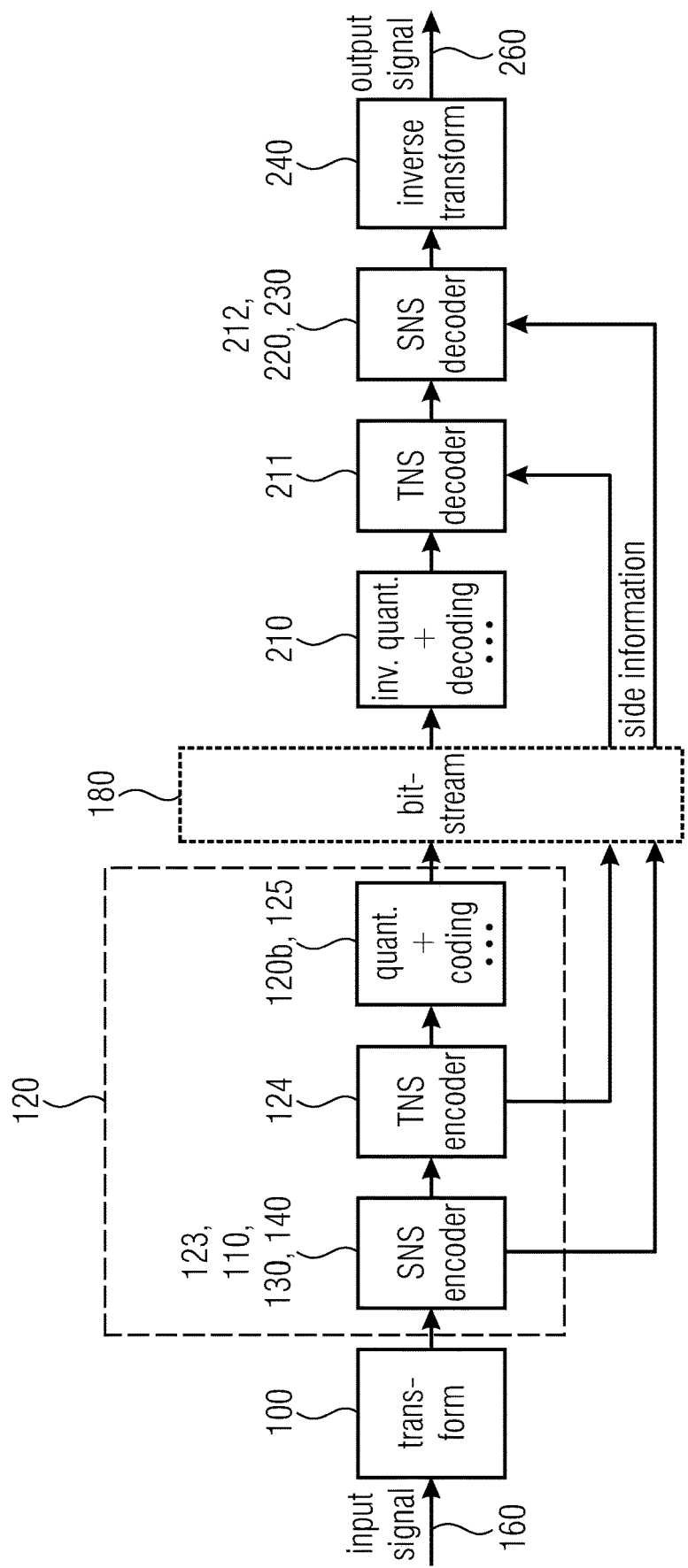
FIG. 17 illustrates a more detailed representation of the encoder-side on the one hand and the decoder-side on the other hand where temporal noise shaping (TNS) is implemented together with spectral noise shaping (SNS)

$\hat{X}(k) = \widehat{X_S}(k) \cdot g_{SNS}(b)$ for $k = \text{Ind}(b) \ldots \text{Ind}(b+1)-1$, for $b = 0 \ldots 63$ FIG. 16 and FIG. 17 illustrate a general encoder/decoder setup where FIG. 16 represents an implementation without TNS processing, while FIG. 17 illustrates an implementation that comprises TNS processing. Similar functionalities illustrated in FIG. 16 and FIG. 17 correspond to similar functionalities in the other figures when identical reference numerals are indicated. Particularly, as illustrated in FIG. 16, the input signal 160 e.g. a stereo signal or a multichannel signal is input into a transform stage 110 and, subsequently, the spectral processing 120 is performed. Particularly, the spectral processing is reflected by an SNS encoder indicated by reference numerals 123, 110, 130, 140 indicating that the block SNS encoder implements the functionalities indicated by these reference numerals. Subsequently to the SNS encoder block, a quantization encoding operation 120b, 125 is performed, and the encoded signal is input into the bitstream as indicated at 180 in FIG. 16. The bitstream 180 then occurs at the decoder-side and subsequent to an inverse quantization and decoding illustrated by reference numeral 210, the SNS decoder operation illustrated by blocks 210, 220, 230 of FIG. 18 are performed so that, in the end, subsequent to an inverse transform 240, the decoded output signal 260 is obtained.

FIG. 17 illustrates a similar representation as in FIG. 16, but it is indicated that, advantageously, the TNS processing is performed subsequent to SNS processing on the encoder-side and, correspondingly, the TNS processing 211 is performed before the SNS processing 212 with respect to the processing sequence on the decoder-side.

Advantageously, the additional tool TNS between Spectral Noise Shaping (SNS) and quantization/coding (see block diagram below) is used. TNS (Temporal Noise Shaping) also shapes the quantization noise but does a time-domain shaping (as opposed to the frequency-domain shaping of SNS) as well. TNS is useful for signals containing sharp attacks and for speech signals.

TNS is usually applied (in AAC for example) between the transform and SNS. Advantageously, however, it is of advantage to apply TNS on the shaped spectrum. This avoids some artifacts that were produced by the TNS decoder when operating the codec at low bitrates.

Figure 20:
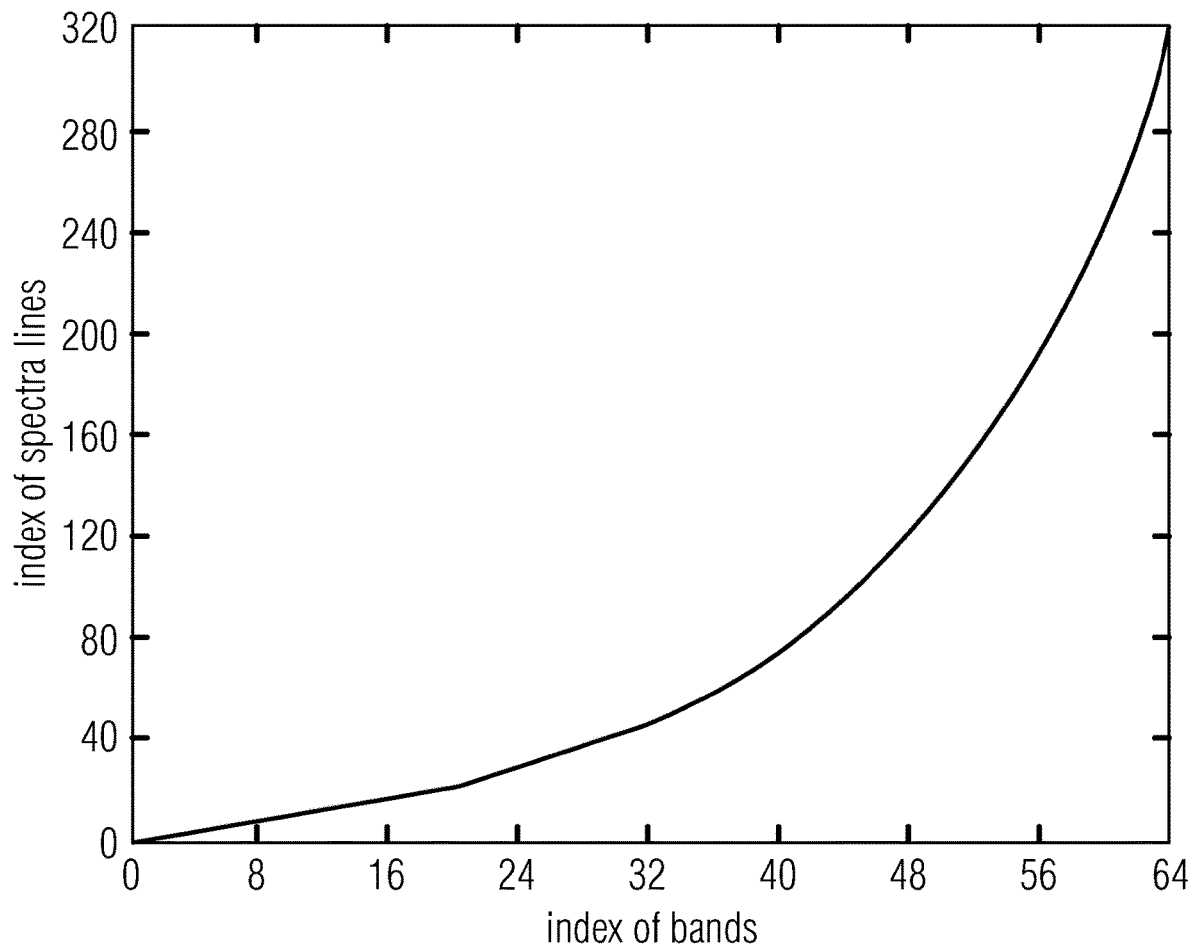
FIG. 20 illustrates a subdivision of the spectrum into 64 bands.

FIG. 20 illustrates a subdivision of the spectral coefficients or spectral lines as obtained by block 100 on the encoder-side into bands. Particularly, it is indicated that lower bands have a smaller number of spectral lines than higher bands.

Particularly, the x-axis in FIG. 20 corresponds to the index of bands and illustrates the embodiment of 64 bands and the y-axis corresponds to the index of the spectral lines illustrating 320 spectral coefficients in one frame. Particularly, FIG. 20 illustrates exemplarily the situation of the super wide band (SWB) case where there is a sampling frequency of 32 KHz.

For the wide band case, the situation with respect to the individual bands is so that one frame results in 160 spectral lines and the sampling frequency is 16 kHz so that, for both cases, one frame has a length in time of 10 milliseconds.

Figure 21:
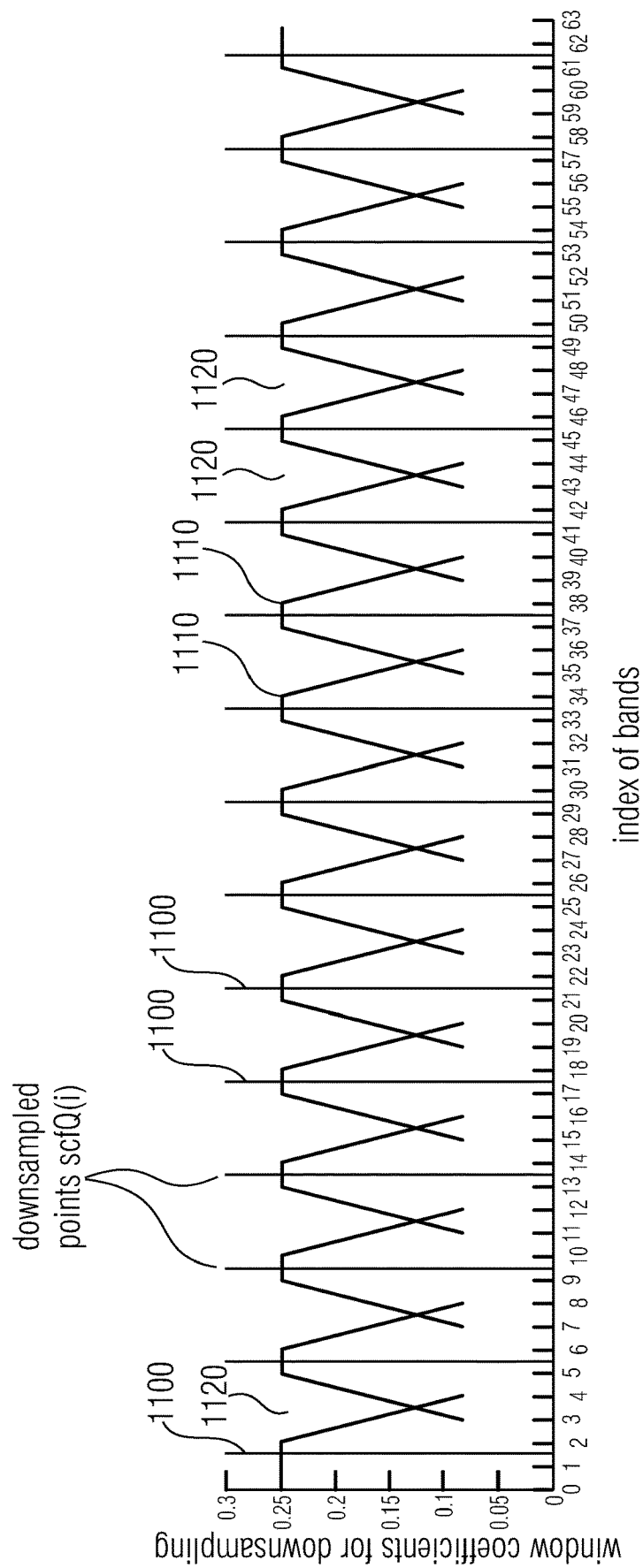
FIG. 21 illustrates a schematic illustration of the downsampling operation on the one hand and the interpolation operation on the other hand.

FIG. 21 illustrates more details on the downsampling performed in the downsampler 130 of FIG. 11 or the corresponding upsampling or interpolation as performed in the scale factor decoder 220 of FIG. 18 or as illustrated in block 222 of FIG. 19.

Along the x-axis, the index for the bands 0 to 63 is given. Particularly, there are 64 bands going from 0 to 63.

The 16 downsample points corresponding to scfQ(i) are illustrated as vertical lines 1100. Particularly, FIG. 21 illustrates how a certain grouping of scale parameters is performed to finally obtain the downsampled point 1100. Exemplarily, the first block of four bands consists of (0, 1, 2, 3) and the middle point of this first block is at 1.5 indicated by item 1100 at the index 1.5 along the x-axis.

Correspondingly, the second block of four bands is (4, 5, 6, 7), and the middle point of the second block is 5.5.

The windows 1110 correspond to the windows w(k) discussed with respect to the step 6 downsampling described before. It can be seen that these windows are centered at the downsampled points and there is the overlap of one block to each side as discussed before.

The interpolation step 222 of FIG. 19 recovers the 64 bands from the 16 downsampled points. This is seen in FIG. 21 by computing the position of any of the lines 1120 as a function of the two downsampled points indicated at 1100 around a certain line 1120. The following example exemplifies that.

The position of the second band is calculated as a function of the two vertical lines around it (1.5 and 5.5): 2=1.5+1/8×(5.5−1.5).

Correspondingly, the position of the third band as a function of the two vertical lines 1100 around it (1.5 and 5.5): 3=1.5+3/8×(5.5−1.5).

A specific procedure is performed for the first two bands and the last two bands. For these bands, an interpolation cannot be performed, because there would not exist vertical lines or values corresponding to vertical lines 1100 outside the range going from 0 to 63. Thus, in order to address this issue, an extrapolation is performed as described with respect to step 9: interpolation as outlined before for the two bands 0, 1 on the one hand and 62 and 63 on the other hand.

Subsequently, an implementation of the converter 100 of FIG. 11 on the one hand and the converter 240 of FIG. 18 on the other hand are discussed.

Figure 22A:
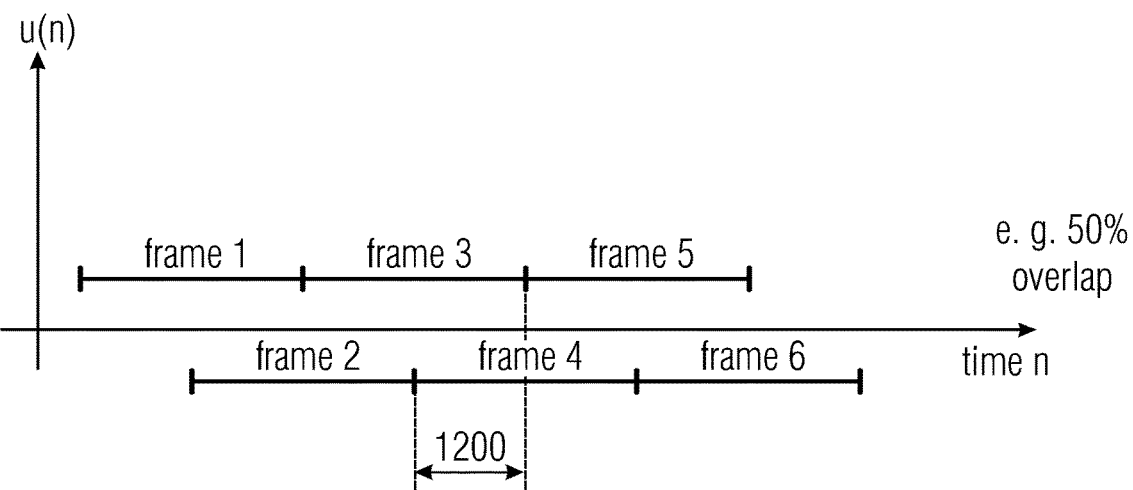
FIG. 22a illustrates a time-domain audio signal with overlapping frames.
Figure 22B:
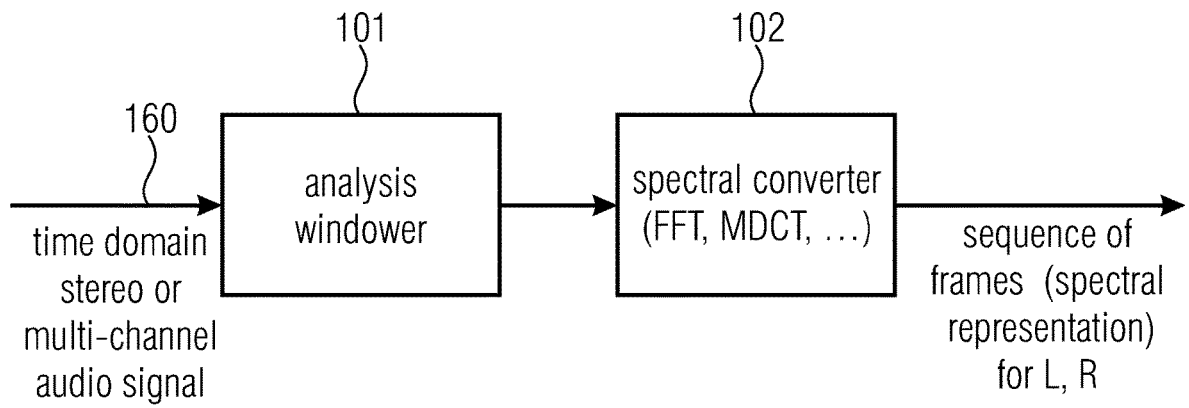
FIG. 22b illustrates an implementation of the converter of FIG. 1.
Figure 22C:
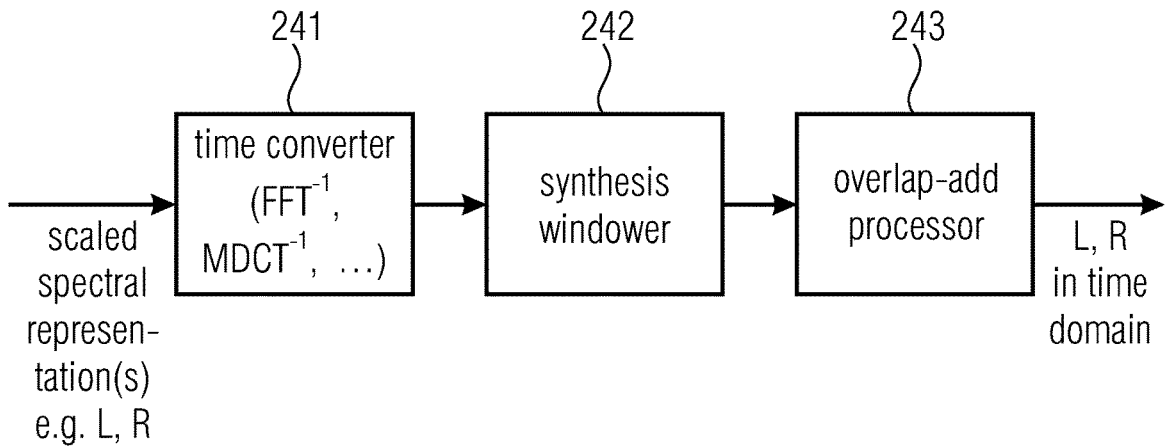
FIG. 22c illustrates a schematic illustration of the converter of FIG. 8.

Particularly, FIG. 22a illustrates a schedule for indicating the framing performed on the encoder-side within converter 100. FIG. 22b illustrates an implementation of the converter 100 of FIG. 11 on the encoder-side and FIG. 22c illustrates an implementation of the converter 240 on the decoder-side.

The converter 100 on the encoder-side may be implemented to perform a framing with overlapping frames such as a 50% overlap so that frame 2 overlaps with frame 1 and frame 3 overlaps with frame 2 and frame 4. However, other overlaps or a non-overlapping processing can be performed as well, but it is of advantage to perform a 50% overlap together with an MDCT algorithm. To this end, the converter 100 comprises an analysis window 101 and a subsequently-connected spectral converter 102 for performing an FFT processing, an MDCT processing or any other kind of time-to-spectrum conversion processing to obtain a sequence of frames corresponding to a sequence of spectral representations as input in FIG. 11 to the blocks subsequent to the converter 100.

Correspondingly, the scaled spectral representation(s) are input into the converter 240 of FIG. 18. Particularly, the converter comprises a time-converter 241 implementing an inverse FFT operation, an inverse MDCT operation or a corresponding spectrum-to-time conversion operation. The output is inserted into a synthesis window 242 and the output of the synthesis window 242 is input into an overlap-add processor 243 to perform an overlap-add operation in order to finally obtain the decoded audio signal. Particularly, the overlap-add processing in block 243, for example, performs a sample-by-sample addition between corresponding samples of the second half of, for example, frame 3 and the first half of frame 4 so that the audio sampling values for the overlap between frame 3 and frame 4 as indicated by item 1200 in FIG. 22a is obtained. Similar overlap-add operations in a sample-by-sample manner are performed to obtain the remaining audio sampling values of the decoded audio output signal.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

Although more aspects are described above, the attached claims indicate two different aspects, i.e., an Audio Decoder, an Audio Encoder, and Related Methods Using Joint Coding of Scale Parameters for Channels of a Multi-Channel Audio Signal, or an Audio Quantizer, an Audio Dequantizer, or Related Methods. These two aspects can be combined or used separately, as the case may be, and the inventions in accordance with these aspects are applicable to other application of audio processing different from the above described specific applications.

Furthermore, reference is made to the additional FIGS. 3a, 3b, 4a, 4b, 5, 6, 8a, 8b illustrating the first aspect and FIGS. 9a, 9b illustrating the second aspect and FIGS. 7a, 7b illustrating the second aspect as applied within the first aspect.

An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

Subsequently, further embodiments/examples are summarized:

1. Audio decoder for a decoding an encoded audio signal comprising multi-channel audio data comprising data for two or more audio channels, and information on jointly encoded scale parameters, comprising:
   a scale parameter decoder (220) for decoding the information on the jointly encoded scale parameters to obtain a first set of scale parameters for a first channel of a decoded audio signal and a second set of scale parameters for a second channel of the decoded audio signal; and
   a signal processor (210, 212, 230) for applying the first set of scale parameters to a first channel representation derived from the multi-channel audio data and for applying the second set of scale parameters to a second channel representation derived from the multi-channel audio data to obtain the first channel and the second channel of the decoded audio signal,
   wherein the jointly encoded scale parameters comprise information on a first group of jointly encoded scale parameters and information on a second group of jointly encoded scale parameters, and
   wherein the scale parameter decoder (220) is configured to combine a jointly encoded scale parameter of the first group and a jointly encoded scale parameter of the second group using a first combination rule to obtain a scale parameter of the first set of scale parameters, and using a second combination rule being different from the first combination rule to obtain a scale parameter of the second set of scale parameters.

2. Audio decoder of example 1, wherein the first group of jointly encoded scale parameters comprises mid scale parameters and the second group of jointly encoded scale parameters comprises side scale parameters, and wherein the scale parameter decoder (220) is configured to use, in the first combination rule, an addition, and to use, in the second combination rule, a subtraction.

3. Audio decoder of example 1 or 2, wherein the encoded audio signal is organized in a sequence of frames, wherein a first frame comprises the multi-channel audio data and the information on the jointly encoded scale parameters, and wherein a second frame comprises separately encoded scale parameter information, and
   wherein the scale parameter decoder (220) is configured to detect that the second frame comprises the separately encoded scale parameter information and to calculate the first set of scale parameters and the second set of scale parameters.

4. Audio decoder of example 3, wherein the first frame and the second frame each comprise a state side information indicating, in a first state, that the first frame comprises the information on the jointly encoded scale parameters and, in a second state, that the second frame comprises the separately encoded scale parameter information, and
   wherein the scale parameter decoder (220) is configured to read the state side information of the second frame, to detect that the second frame comprises the separately encoded scale parameter information based on the state side information read, or to read the state side information of the first frame, and to detect that the first frame comprises the information on the jointly encoded scale parameters using the state side information read.

5. Audio decoder of one of the preceding examples, wherein the signal processor (210, 212, 230) is configured to decode the multi-channel audio data to derive the first channel representation and the second channel representation, wherein the first channel representation and the second channel representation are spectral domain representations having spectral sampling values, and
   wherein the signal processor (210, 212, 230) is configured to apply each scale parameter of the first set and the second set to a corresponding plurality of the spectral sampling values to obtain a shaped spectral representation of the first channel and a shaped spectral representation of the second channel.

6. Audio decoder of example 5, wherein the signal processor (210, 212, 230) is configured to convert the shaped spectral representation of the first channel and the shaped spectral representation of the second channel into a time domain to obtain a time domain representation of the first channel and a time domain representation of the second channel of the decoded audio signal.

7. Audio decoder of one of the preceding examples, wherein the first channel representation comprises a first number of bands, wherein the first set of scale parameters comprises a second number of scale parameters, the second number being lower than the first number, and
   wherein the signal processor (210, 212, 230) is configured to interpolate the second number of scale parameters to obtain a number of interpolated scale parameters being greater than or equal to the first number of bands, and wherein the signal processor (210, 212, 230) is configured to scale the first channel representation using the interpolated scale parameters, or wherein the first channel representation comprises a first number of bands, wherein the information on the first group of jointly encoded scale parameters comprises a second number of jointly encoded scale parameters, the second number being lower than the first number, wherein the scale parameter decoder (220) is configured to interpolate the second number of jointly encoded scale parameters to obtain a number of interpolated jointly encoded scale parameters being greater than or equal to the first number of bands, and wherein the scale parameter decoder (220) is configured to process the interpolated jointly encoded scale parameters to determine the first set of scale parameters and the second set of scale parameters.

8. Audio decoder of one of the preceding examples, wherein the encoded audio signal is organized in a sequence of frames, wherein the information on the second group of jointly encoded scale parameters comprises, in a certain frame, a zero side information, wherein the scale parameter decoder (220) is configured to detect the zero side information to determine that the second group of jointly encoded scale parameters are all zero for the certain frame, and wherein the scale parameter decoder (220) is configured to derive the scale parameters of the first set of scale parameters and the second set of scale parameters only from the first group of jointly encoded scale parameters or to set, in the combining the jointly encoded scale parameter of the first group and the jointly encoded scale parameter of the second group, to zero values or values being smaller than a noise threshold.

9. Audio decoder of one of the preceding examples, wherein the scale parameter decoder (220) is configured
   to de-quantize the information on the first group of jointly encoded scale parameters using a first de-quantization mode, and
   to de-quantize the information on the second group of jointly encoded scale parameters using a second de-quantization mode, the second de-quantization mode being different from the first de-quantization mode.

10. Audio decoder of example 9, wherein the scale parameter decoder (220) is configured to use the second de-quantization mode having associated a lower or higher quantization precision than the first de-quantization mode.

11. Audio decoder of example 9 or 10, wherein the scale parameter decoder (220) is configured to use, as the first de-quantization mode, a first de-quantization stage (2220) and a second de-quantization stage (2260) and a combiner (2240), the combiner (2240) receiving, as an input, a result of the first de-quantization stage (2220) and a result of the second de-quantization stage (2260), and
   to use, as the second de-quantization mode, the second de-quantization stage (2220) of the first de-quantization mode receiving, as an input, the information on the second group of jointly encoded scale parameters.

12. Audio decoder of example 11, wherein the first de-quantization stage (2220) is a vector de-quantization stage and wherein the second de-quantization stage (2260) is an algebraic vector de-quantization stage, or wherein the first de-quantization stage (2220) is a fixed rate de-quantization stage and wherein the second de-quantization stage (2260) is a variable rate de-quantization stage.

13. Audio decoder of example 11 or 12, wherein the information on the first group of jointly encoded scale parameters comprises, for a frame of the encoded audio signal, two or more indexes and wherein the information on the second group of jointly encoded scale parameters comprises a single index or a lower number of indexes or the same number of indexes as in the first group, and
    wherein the scale parameter decoder (220) is configured to determine, in the first de-quantization stage (2220) e.g., for each index of the two or more indexes, intermediate jointly encoded scale parameters of the first group, and wherein the scale parameter decoder (220) is configured to calculate, in the second de-quantization stage (2260), residual jointly encoded scale parameters of the first group e.g. from the single or lower or the same number of indexes of the information on the first group of jointly encoded scale parameters and to calculate, by the combiner (2240) the first group of jointly encoded scale parameters from the intermediate jointly encoded scale parameters of the first group and the residual jointly encoded scale parameters of the first group.

14. Audio decoder of one of examples 11-13, wherein the first de-quantization stage (2220) comprises using an index for a first codebook having a first number of entries or using an index representing a first precision, wherein the second de-quantization stage (2260) comprises using an index for a second codebook having a second number of entries or using an index representing a second precision, and wherein the second number is lower or higher than the first number or the second precision is lower or higher than the first precision.

15. Audio decoder of one of the preceding examples, wherein the information on the second group of jointly encoded scale parameters indicates that the second group of jointly encoded scale parameters are all zero or at a certain value for a frame of the encoded audio signal, and wherein the scale parameter decoder (220) is configured to use, in the combining using the first rule or the second rule, a jointly encoded scale parameter being zero or being at the certain value or being a synthesized jointly encoded scale parameter, or
    wherein, for the frame comprising the all zero or certain value information, the scale parameter decoder (220) is configured to determine the second set of scale parameters only using the first group of jointly encoded scale parameters without a combining operation.

16. Audio decoder of one of the examples 9 or 10, wherein the scale parameter decoder (220) is configured to use, as the first de-quantization mode, the first de-quantization stage (2220) and the second de-quantization stage (2260) and the combiner (2240), the combiner (2240) receiving, as an input, a result of the first de-quantization stage (2220) and a result of the second de-quantization stage (2260), and to use, as the second de-quantization smoke, the first de-quantization stage (2220) of the first de-quantization mode.

17. Audio encoder for encoding a multi-channel audio signal comprising two or more channels, comprising:
    a scale parameter calculator (140) for calculating a first group of jointly encoded scale parameters and a second group of jointly encoded scale parameters from a first set of scale parameters for a first channel of the multi-channel audio signal and from a second set of scale parameters for a second channel of the multi-channel audio signal;
a signal processor (120) for applying the first set of scale parameters to the first channel of the multi-channel audio signal and for applying the second set of scale parameters to the second channel of the multi-channel audio signal and for deriving multi-channel audio data; and
an encoded signal former (1480, 1500) for using the multi-channel audio data and information on the first group of jointly encoded scale parameters and information on the second group of jointly encoded scale parameters to obtain an encoded multi-channel audio signal.

18. Audio encoder of example 17, wherein the signal processor (120) is configured, in the applying,
to encode the first group of jointly encoded scale parameters and the second group of jointly encoded scale parameters to obtain the information on the first group of jointly encoded scale parameters and the information on the second group of jointly encoded scale parameters,
to locally decode the information on the first and the second groups of jointly encoded scale parameters to obtain a locally decoded first set of scale parameters and a locally decoded second set of scale parameters, and
to scale the first channel using the locally decoded first set of scale parameters and to scale the second channel using the locally decoded second set of scale parameters, or
wherein the signal processor (120) is configured, in the applying,
to quantize the first group of jointly encoded scale parameters and the second group of jointly encoded scale parameters to obtain a quantized first group of jointly encoded scale parameters and a quantized second group of jointly encoded scale parameters,
to locally decode the quantized first and the second groups of jointly encoded scale parameters to obtain a locally decoded first set of scale parameters and a locally decoded second set of scale parameters, and
to scale the first channel using the locally decoded first set of scale parameters and to scale the second channel using the locally decoded second set of scale parameters.

19. Audio encoder of example 17 or 18,
wherein the scale parameter calculator (140) is configured to combine a scale parameter of the first set of scale parameters and a scale parameter of the second set of scale parameters using a first combination rule to obtain a jointly encoded scale parameter of the first group of jointly encoded scale parameters, and using a second combination rule different from the first combination rule to obtain a jointly encoded scale parameter of the second group of jointly encoded scale parameters.

20. Audio encoder of example 19, wherein the first group of jointly encoded scale parameters comprises mid scale parameters and the second group of jointly encoded scale parameters comprises side scale parameters, and wherein the scale parameter calculator (140) is configured to use, in the first combination rule, an addition, and to use, in the second combination rule, a subtraction.

21. Audio encoder of one of examples 17-20, wherein the scale parameters calculator is configured to process a sequence of frames of the multi-channel audio signal,
wherein the scale parameter calculator (140) is configured
to calculate first and second groups of jointly encoded scale parameters for a first frame of the sequence of frames, and
to analyze a second frame of the sequence of frames to determine a separate coding mode for the second frame, and
wherein the encoded signal former (1480, 1500) is configured to introduce a state side information into the encoded audio signal indicating a separate encoding mode for the second frame or a joint encoding mode for the first frame, and information on the first set and the second set of separately encoded scale parameters for the second frame.

22. Audio encoder of one of examples 17-21, wherein the scale parameter calculator (140) is configured
to calculate the first set of scale parameters for the first channel and the second set of scale parameters for the second channel,
to downsample the first and the second sets of scale parameters to obtain a downsampled first set and a downsampled second set; and
to combine a scale parameter from the downsampled first set and the downsampled second set using different combination rules to obtain a jointly encoded scale parameter of the first group and a jointly encoded scale parameter of the second group, or
wherein the scale parameter calculator (140) is configured
to calculate the first set of sale parameters for the first channel and the second set of scale parameters for the second channel,
to combine a scale parameter from the first set and a scale parameter from the second set using different combination rules to obtain a jointly encoded scale parameter of the first group and a jointly encoded scale parameter of the second group, and
to downsample the first group of jointly encoded scale parameters to obtain a downsampled first group of jointly encoded scale parameters, and to downsample the second group of jointly encoded scale parameters to obtain a downsampled second group of jointly encoded scale parameters,
wherein the downsampled first group and the downsampled second group represent the information on the first group of jointly encoded scale parameters and the information on the second group of jointly encoded scale parameters.

23. Audio encoder of example 21 or 22,
wherein the scale parameter calculator (140) is configured to calculate a similarity of the first channel and the second channel in the second frame and to determine the separate encoding mode in case a calculated similarity is in a first relation to a threshold or to determine the joint encoding mode in case the calculated similarity is in a different second relation to the threshold.

24. Audio encoder of example 23, wherein the scale parameter calculator (140) is configured
to calculate, for the second frame, a difference between the scale parameter of the first set and the scale parameter of the second set for each band, to process each difference of the second frame so that negative signs are removed to obtain processed differences of the second frame,
to combine the processed differences to obtain a similarity measure,
to compare the similarity measure to the threshold, and
to decide in favor of the separate coding mode, when the similarity measure is greater than the threshold, or to decide in favor of the joint coding mode, when the similarity measure is lower than the threshold.

25. Audio encoder of one of examples 17-24, wherein the signal processor (120) is configured
to quantize the first group of jointly encoded scale parameters using a first stage quantization function (141, 143) to obtain one or more first quantization indexes as a first stage result and to obtain an intermediate first group of jointly encoded scale parameters,
to calculate (142) a residual first group of jointly encoded scale parameters from the first group of jointly encoded scale parameters and the intermediate first group of jointly encoded scale parameters, and
to quantize the residual first group of jointly encoded scale parameters using a second stage quantization function (145) to obtain one or more quantization indexes as a second stage result.

26. Audio encoder of one of examples 17-25,
wherein the signal processor (120) is configured to quantize the second group of jointly encoded scale parameters using a single stage quantization function to obtain one or more quantization indexes as the single stage result, or
wherein the signal processor (120) is configured for quantizing the first group of jointly encoded scale parameters using at least a first stage quantization function and a second stage quantization function, and wherein the signal processor (120) is configured for quantizing the second group of jointly encoded scale parameters using a single stage quantization function, wherein the single stage quantization function is selected from the first stage quantization function and the second stage quantization function.

27. Audio encoder of one of examples 21-26, wherein the scale parameter calculator (140) is configured
to quantize the first set of scale parameters using a first stage quantization function (141, 143) to obtain one or more first quantization indexes as a first stage result and to obtain an intermediate first set of scale parameters,
to calculate (142) a residual first set of scale parameters from the first set of scale parameters and the intermediate first set of scale parameters, and
to quantize the residual first set of scale parameters using a second stage quantization function (145) to obtain one or more quantization indexes as a second stage result, or
wherein the scale parameter calculator (140) is configured
to quantize the second set of scale parameters using a first stage quantization function (141, 143) to obtain one or more first quantization indexes as a first stage result and to obtain an intermediate second set of scale parameters,
to calculate (142) a residual second set of scale parameters from the second set of scale parameters and the intermediate second set of scale parameters, and
to quantize the residual second set of scale parameters using a second stage quantization function (145) to obtain one or more quantization indexes as a second stage result.

28. Audio encoder of example 25 or 27,
wherein the second stage quantization function (145) uses an amplification or weighting value lower than 1 to increase the residual first group of jointly encoded scaling parameters or the residual first or second set of scale parameters before performing a vector quantization, wherein the vector quantization is performed using increased residual values, and/or
wherein, exemplarily, the weighting or amplification value is used to divide a scaling parameter by the weighting or amplification value, wherein the weighting value is advantageously between 0.1 and 0.9, or more advantageously between 0.2 and 0.6 or even more advantageously between 0.25 and 0.4, and/or
wherein the same amplification value is used for all scaling parameters of the residual first group of jointly encoded scaling parameters or the residual first or second set of scale parameters.

29. Audio encoder of one of examples 25-28,
wherein the first stage quantization function (141, 143) comprises at least one codebook with a first number of entries corresponding to a first size of the one or more quantization indexes,
wherein the second stage quantization function (145) or the single stage quantization function comprises at least one codebook with a second number of entries corresponding to a second size of the one or more quantization indexes, and
wherein the first number is greater or lower than the second number or the first size is greater or lower than the second size, or
wherein the wherein the first stage quantization function (141, 143) is a fixed rate quantization function and wherein the second stage quantization function (145) is a variable rate quantization function.

30. Audio encoder of one of examples 15-29, wherein the scale parameter calculator (140) is configured
to receive a first MDCT representation for the first channel and a second MDCT representation for the second channel,
to receive a first MDST representation for the first channel and a second MDST representation for the second channel,
to calculate a first power spectrum for the first channel from the first MDCT representation and the first MDST representation and a second power spectrum for the second channel from the second MDCT representation and the second MDST representation, and
to calculate the first set of scale parameters for the first channel from the first power spectrum and to calculate the second set of scale parameters for the second channel from the second power spectrum.

31. Audio encoder of example 30,
wherein the signal processor (120) is configured to scale the first MDCT representation using information derived from the first set of scale parameters, and to scale the second MDCT representation using information derived from the second set of scale parameters.

32. Audio encoder of one of examples 17-31,
wherein the signal processor (120) is configured to further process a scaled first channel representation and a scaled second channel representation using a joint multi-channel processing to derive a multi-channel processed representation of the multi-channel audio signal, to optionally further process using a spectral band replication processing or an intelligent gap filling processing or a bandwidth enhancement processing and to quantize and encode a representation of the channels of the multi-channel audio signal to obtain the multi-channel audio data.

33. Audio encoder of one of examples 17-34, being configured to determine, for a frame of the multi-channel audio signal, the information on the second group of jointly encoded scale parameters as an all zero or all certain value information indicating the same value or a zero value for all jointly encoded scale parameters of the frame and wherein the encoded signal former (1480, 1500) is configured to use the all zero or all certain value information to obtain the encoded multi-channel audio signal.

34. Audio encoder of one of examples 17-34, wherein the scale parameter calculator (140) is configured
for calculating the first group of jointly encoded scale parameters and the second group of jointly encoded scale parameters for a first frame,
for calculating the first group of jointly encoded scale parameters for a second frame,
wherein, in the second frame, the jointly encoded scale parameters are not calculated or encoded, and
wherein the encoded signal former (1480, 1500) is configured to use a flag as the information on the second group of jointly encoded scale parameters indicating that, in the second frame, any jointly encoded scale parameters of the second group are not included in the encoded multichannel audio signal.

35. Method of decoding an encoded audio signal comprising multi-channel audio data comprising data for two or more audio channels, and information on jointly encoded scale parameters, comprising:
decoding the information on the jointly encoded scale parameters to obtain a first set of scale parameters for a first channel of a decoded audio signal and a second set of scale parameters for a second channel of the decoded audio signal; and
applying the first set of scale parameters to a first channel representation derived from the multi-channel audio data and for applying the second set of scale parameters to a second channel representation derived from the multi-channel audio data to obtain the first channel and the second channel of the decoded audio signal,
wherein the jointly encoded scale parameters comprise information on a first group of jointly encoded scale parameters and information on a second group of jointly encoded scale parameters, and
wherein the decoding comprises combining a jointly encoded scale parameter of the first group and a jointly encoded scale parameter of the second group using a first combination rule to obtain a scale parameter of the first set of scale parameters, and using a second combination rule being different from the first combination rule to obtain a scale parameter of the second set of scale parameters.

36. A method of encoding a multi-channel audio signal comprising two or more channels, comprising:
calculating a first group of jointly encoded scale parameters and a second group of jointly encoded scale parameters from a first set of scale parameters for a first channel of the multi-channel audio signal and from a second set of scale parameters for a second channel of the multi-channel audio signal;
applying the first set of scale parameters to the first channel of the multi-channel audio signal and applying the second set of scale parameters to the second channel of the multi-channel audio signal and for deriving multi-channel audio data; and
using the multi-channel audio data and information on the first group of jointly encoded scale parameters and information on the second group of jointly encoded scale parameters to obtain an encoded multi-channel audio signal.

37. Computer program for performing, when running on a computer or a processor, the method of example 31 or example 32.

REFERENCES

[1] ISO/IEC 11172-3, Information technology-Coding of moving pictures and associated audio for digital storage media at up to about 1.5 Mbit/s-Part 3: Audio, 1993.
[2] ISO/IEC 13818-7, Information technology-Generic coding of moving pictures and associated audio information-Part 7: Advanced Audio Coding (AAC), 2003.
[3] ISO/IEC 23003-3; Information technology-MPEG audio technologies-Part 3: Unified speech and audio coding.
[4] 3GPP TS 26.445, Codec for Enhanced Voice Services (EVS); Detailed algorithmic description.
[5] G. Markovic, G. Fuchs, N. Rettelbach, C. Helmrich und B. Schubert, "LINEAR PREDICTION BASED CODING SCHEME USING SPECTRAL DOMAIN NOISE SHAPNG". U.S. Pat. No. 9,595,262 B2, 14 Mar. 2017.
[6] E. Ravelli, M. Schnell, C. Benndorf, M. Lutzky und M. Dietz, "Apparatus and method for encoding and decoding an audio signal using downsampling or interpolation of scale parameters". WO Publication WO 2019091904 A1, May 11, 2018.
[7] A. Biswas, Advances Advances in Perceptual Stereo Audio Coding Using LinearPrediction Techniques, Eindhoven: Technical University of Eindhoven, 2017.
[8] G. Markovic, E. Ravelli, M. Schnell, S. Dohla, W. Jaegars, M. Dietz, C. Heimrich, E. Fotopoulou, M. Multrus, S. Bayer, G. Fuchs und J. Herre, "APPARATUS AND METHOD FOR MDCT M/S STEREO WITH GLOBAL ILD WITH IMPROVED MID/SIDE DECISION". WO Publication WO2017EP5117.

The invention claimed is:

1. An audio quantizer for quantizing a plurality of audio information items, comprising:
a first stage vector quantizer for quantizing the plurality of audio information items to determine a first stage vector quantization result and a plurality of intermediate quantized items corresponding to the first stage vector quantization result;
a residual item determiner for calculating a plurality of residual items from the plurality of intermediate quantized items and the plurality of audio information items; and
a second stage vector quantizer for quantizing the plurality of residual items to acquire a second stage vector quantization result, wherein the first stage vector quantization result and the second stage vector quantization result are a quantized representation of the plurality of audio information items, wherein the audio information items comprise, for a first frame of a multichannel audio signal, a first plurality of scale parameters for a first channel of the multichannel audio signal, and a second plurality of scale parameters for a second channel of the multichannel audio signal, wherein the audio quantizer is configured to apply the first stage vector quantizer and the second stage vector quantizer to the first plurality of scale parameters for the first channel and the second plurality of scale parameters for the second channel of the first frame, wherein the audio information items comprise, for a second frame of the multichannel audio signal, a third plurality of mid scale parameters and a fourth plurality of side scale parameters, and wherein the audio quantizer is configured to apply the first stage vector quantizer and the second stage vector quantizer to the third plurality of mid scale parameters of the second frame, and to apply the second stage vector quantizer to the fourth plurality of side scale parameters of the second frame and to not apply the first stage vector quantizer to the fourth plurality of side scale parameters of the second frame.

2. The audio quantizer of claim 1, wherein the residual item determiner is configured to calculate, for each residual item, a difference between a corresponding audio information item and a corresponding intermediate quantized item.

3. The audio quantizer of claim 1, wherein the residual item determiner is configured to amplify or weight, for each residual item, a difference between a corresponding audio information item and a corresponding intermediate quantized item, or to amplify or weight the plurality of audio information items and/or the plurality of intermediate quantized items before calculating a difference between amplified items to acquire the residual items.

4. The audio quantizer of claim 1,
wherein the residual item determiner is configured to divide corresponding differences between the plurality of intermediate quantized items and the audio information items by a predetermined factor being lower than 1 or to multiply corresponding differences between the plurality of intermediate quantized items and the audio information items by a predetermined factor being greater than 1.

5. The audio quantizer of claim 1,
wherein the first stage vector quantizer is configured to perform the quantization with a first quantization precision, wherein the second stage vector quantizer is configured to perform the quantization with a second quantization precision, and wherein the second quantization precision is lower or higher than the first quantization precision, or
wherein the first stage vector quantizer is configured to perform a fixed rate quantization and
wherein the second stage vector quantizer is configured to perform a variable rate quantization.

6. The audio quantizer of claim 1, wherein the first stage vector quantizer is configured to use a first stage codebook comprising a first number of entries, wherein the second stage vector quantizer is configured to use a second stage codebook comprising a second number of entries, and wherein the second number of entries is lower or higher than the first number of entries.

7. The audio quantizer of claim 1,
wherein the audio information items are the scale parameters for a frame of the multichannel audio signal usable for scaling time domain audio samples of the multichannel audio signal in a time domain or usable for scaling spectral domain audio samples of the multichannel audio signal in a spectral domain, wherein each scale parameter is usable for scaling at least two time domain or spectral domain audio samples, wherein the frame comprises a first number of scale parameters,
wherein the first stage vector quantizer is configured to perform a split of the first number of scale parameters into two or more sets of scale parameters comprising a first set of scale parameters and a second set of scale parameters, and wherein the first stage vector quantizer is configured to determine a quantization index for each set of scale parameters to obtain a plurality of quantization indices representing the first stage vector quantization result.

8. The audio quantizer of claim 7, wherein the first stage vector quantizer is configured to combine a first quantization index for the first set of scale parameters and a second quantization index for the second set of scale parameters to obtain a single index as the first stage vector quantization result.

9. The audio quantizer of claim 8,
wherein the first stage vector quantizer is configured to multiply one of the first quantization index and the second quantization index by a number corresponding to the number of bits of the first quantization index and the second quantization index and to add a multiplied index and a non-multiplied index to obtain the single index.

10. The audio quantizer of claim 1,
wherein the second stage vector quantizer is an algebraic vector quantizer, wherein each quantization index comprises a base codebook index and a Voronoi extension index.

11. The audio quantizer of claim 1,
wherein the first stage vector quantizer is configured to perform a first split of the plurality of audio information items,
wherein the second stage vector quantizer is configured to perform a second split of the plurality of residual items,
wherein the first split results in a first number of subsets of audio information items and the second split results in a second number of subsets of residual items, wherein the first number of subsets is equal to the second number of subsets.

12. The audio quantizer of claim 1,
wherein the first stage vector quantizer is configured to output, from a first codebook search, a first quantization index having a first number of bits,
wherein the second stage vector quantizer is configured to output, from a second codebook search, a second quantization index having a second number of bits, the second number of bits being lower or higher than the first number of bits.

13. The audio quantizer of claim 12,
wherein the first number of bits is a number of bits between 4 and 7, and wherein the second number of bits is a number of bits between 3 and 6.

14. The audio quantizer of claim 1,
wherein the residual item determiner is configured to amplify or weight, for the second frame, the fourth plurality of side scale parameters, and wherein the second stage vector quantizer is configured to process amplified or weighted side scale parameters for the second frame of the multichannel audio signal.

15. An audio dequantizer for dequantizing a quantized plurality of audio information items, comprising:
   a first stage vector dequantizer for dequantizing a first stage vector quantization result included in the quantized plurality of audio information items to acquire a plurality of intermediate quantized audio information items;
   a second stage vector dequantizer for dequantizing a second stage vector quantization result included in the quantized plurality of audio information items to acquire a plurality of residual items; and
   a combiner for combining the plurality of intermediate quantized information audio items and the plurality of residual items to acquire a dequantized plurality of audio information items,
   wherein the quantized plurality of audio information items comprise, for a first frame of a multichannel audio signal, a first plurality of scale parameters for a first channel of a multichannel audio signal and a second plurality of scale parameters for a second channel of the multichannel audio signal,
   wherein the audio dequantizer is configured to apply the first stage vector dequantizer and the second stage vector dequantizer to the first plurality of scale parameters for the first channel and the second plurality of scale parameters for the second channel of the first frame,
   wherein the quantized plurality of audio information items comprises, for a second frame of the multichannel audio signal, a third plurality of mid scale parameters and a fourth plurality of side scale parameters, and
   wherein the audio dequantizer is configured to apply the first stage vector dequantizer and the second stage vector dequantizer to the third plurality of mid scale parameters of the second frame and to apply the second stage vector dequantizer to the fourth plurality of side scale parameters of the second frame and to not apply the first stage vector dequantizer to the fourth plurality of side scale parameters of the second frame.

16. The audio dequantizer of claim 15, wherein the combiner is configured to calculate, for each dequantized information item, a sum between a corresponding intermediate quantized audio information item and a corresponding residual item.

17. The audio dequantizer of claim 15,
   wherein the combiner is configured to attenuate or weight the plurality of residual items, and
   wherein the combiner is configured to add the attenuated residual items to corresponding intermediate quantized audio information items, or
   wherein the combiner is configured to use an attenuation or weighting value lower than 1 to attenuate the plurality of residual items or jointly encoded scaling parameters before performing a combination, wherein the combination is performed using attenuated residual values, and/or wherein the weighting or attenuation value is used to multiply a scaling parameter by a weighting value or an amplification value, wherein the weighting value is advantageously between 0.1 and 0.9, and/or
   wherein an identical attenuation value or weighting value is used for all scaling parameters of the plurality of residual items or any jointly encoded scaling parameters.

18. The audio dequantizer of claim 17, wherein the combiner is configured to multiply a corresponding residual item by a weighting factor being lower than one or to divide a corresponding residual item by a weighting factor being greater than one.

19. The audio dequantizer of claim 15,
   wherein the first stage vector dequantizer is configured to perform the dequantization with a first precision,
   wherein the second stage vector dequantizer is configured to perform the dequantization with a second precision, wherein the second precision is lower or higher than the first precision.

20. The audio dequantizer of claim 15,
   wherein the first stage vector dequantizer is configured to use a first stage codebook having a first number of entries, wherein the second stage vector dequantizer is configured to use a second stage codebook having a second number of entries, and wherein the second number of entries is lower than or higher than the first number of entries, or
   wherein the first stage vector dequantizer is configured to receive, for a first stage codebook retrieval, a first quantization index having a first number of bits,
   wherein the second stage vector dequantizer is configured to receive, for a second stage codebook retrieval, a second quantization index having a second number of bits, the second number of bits being lower or higher than the first number of bits, or wherein the first number of bits is a number of bits between 4 and 7, and wherein the second number of bits is a number of bits between 3 and 6.

21. The audio dequantizer of claim 15,
   wherein the dequantized plurality of audio information items are the scale parameters for a frame of the multichannel audio signal usable for scaling time domain audio samples of the multichannel audio signal in a time domain or usable for scaling spectral domain audio samples of the multichannel audio signal in a spectral domain, wherein each scale parameter is usable for scaling at least two time domain or spectral domain audio samples, wherein the frame comprises a first number of scale parameters,
   wherein the first stage vector dequantizer is configured to determine, from two or more result indices for the first stage vector quantization result, a first set of scale parameters and a second set of scale parameters, and
   wherein the first stage vector dequantizer or the combiner is configured to put together the first set of scale parameters and the second set of scale parameters into a vector to acquire a first number of intermediate quantized scale parameters.

22. The audio dequantizer of claim 21,
   wherein the first stage vector dequantizer is configured to retrieve, as a first stage dequantization result, a single combined index and to process the single combined index to acquire the two or more result indices.

23. The audio dequantizer of claim 22,
   wherein the first stage vector dequantizer is configured to retrieve a first result index of the two or more result indices by determining a remainder from a division and to retrieve a second result index of the two or more result indices by determining an integer result from the division.

24. The audio dequantizer of claim 15, wherein the second stage vector dequantizer is an algebraic vector dequantizer, wherein each quantization index comprises a base codebook index and a Voronoi extension index.

25. The audio dequantizer of claim 15,
wherein the first stage vector dequantizer or the combiner is configured to put together a first set of scale parameters and a second set of scale parameters from a quantization split in a frame of the multichannel audio signal,
wherein the second stage vector dequantizer is configured to put together a first set of residual parameters and a second set of residual parameters from a split of residual parameters, and
wherein a number of splits addressed by the first stage vector dequantizer and another number of splits addressed by the second stage vector dequantizer are the same.

26. The audio dequantizer of claim 15,
wherein the first stage vector dequantizer is configured to use a first quantization index having a first number of bits to generate the plurality of intermediate quantized audio information items, and
wherein the second stage vector dequantizer is configured to use, as a quantization index, a second quantization index having a second number of bits to obtain the plurality of residual items, wherein the second number of bits is lower than or higher than the first number of bits.

27. The audio dequantizer of claim 26, wherein the first number of bits is between four and seven, and the second number of bits is between three and six.

28. The audio dequantizer of claim 15,
wherein the combiner is configured to attenuate, for the second frame, the fourth plurality of side scale parameters before further using or further processing the fourth plurality of side scale parameters.

29. A method of quantizing a plurality of audio information items, comprising:
first stage vector quantizing the plurality of audio information items to determine a first stage vector quantization result and a plurality of intermediate quantized items corresponding to the first stage vector quantization result;
calculating a plurality of residual items from the plurality of intermediate quantized items and the plurality of audio information items; and
second stage vector quantizing the plurality of residual items to acquire a second stage vector quantization result, wherein the first stage vector quantization result and the second stage vector quantization result are a quantized representation of the plurality of audio information items,
wherein the audio information items comprise, for a first frame of a multichannel audio signal, a first plurality of scale parameters for a first channel of the multichannel audio signal, and a second plurality of scale parameters for a second channel of the multichannel audio signal,
wherein the method comprises applying the first stage vector quantizing and the second stage vector quantizing to the first plurality of scale parameters for the first channel and the second plurality of scale parameters for the first channel of the first frame,
wherein the audio information items comprise, for a second frame of the multichannel audio signal, a third plurality of mid scale parameters and a fourth plurality of side scale parameters, and
wherein the method comprises applying the first stage vector quantizing and the second stage vector quantizing to the third plurality of mid scale parameters of the second frame, and applying the second stage vector quantizing to the fourth plurality of side scale parameters of the second frame and not applying the first stage vector quantizing to the fourth plurality of side scale parameters of the second frame.

30. A method of dequantizing a quantized plurality of audio information items, comprising:
first stage vector dequantizing a first stage vector quantization result included in the quantized plurality of audio information items to acquire a plurality of intermediate quantized audio information items;
second stage vector dequantizing a second stage vector quantization result included in the quantized plurality of audio information items to acquire a plurality of residual items; and
combining the plurality of intermediate quantized audio information items and the plurality of residual items to acquire a dequantized plurality of audio information items,
wherein the quantized plurality of audio information items comprise, for a first frame of a multichannel audio signal, a first plurality of scale parameters for a first channel of a multichannel audio signal and a second plurality of scale parameters for a second channel of the multichannel audio signal,
wherein the method comprises applying the first stage vector dequantizing and the second stage vector dequantizing to the first plurality of scale parameters for the first channel and the second plurality of scale parameters for the second channel of the first frame,
wherein the quantized plurality of audio information items comprises, for a second frame of the multichannel audio signal, a third plurality of mid scale parameters and a fourth plurality of side scale parameters, and
wherein the method comprises applying the first stage vector dequantizing and the second stage vector dequantizing to the third plurality of mid scale parameters of the second frame and applying the second stage vector dequantizing to the fourth plurality of side scale parameters and not applying the first stage vector dequantizing to the fourth plurality of side scale parameters of the second frame.

31. A non-transitory digital storage medium having stored thereon a computer program for performing, when the computer program is run by a computer, a method of quantizing a plurality of audio information items, the method comprising:
first stage vector quantizing the plurality of audio information items to determine a first stage vector quantization result and a plurality of intermediate quantized items corresponding to the first stage vector quantization result;
calculating a plurality of residual items from the plurality of intermediate quantized items and the plurality of audio information items; and
second stage vector quantizing the plurality of residual items to acquire a second stage vector quantization result, wherein the first stage vector quantization result and the second stage vector quantization result are a quantized representation of the plurality of audio information items,
wherein the audio information items comprise, for a first frame of a multichannel audio signal, a first plurality of scale parameters for a first channel of the multichannel audio signal, and a second plurality of scale parameters for a second channel of the multichannel audio signal,
wherein the method comprises applying the first stage vector quantizing and the second stage vector quantizing to the first plurality of scale parameters for the first channel and the second plurality of scale parameters for the first channel of the first frame, wherein the audio information items comprise, for a second frame of the multichannel audio signal, a third plurality of mid scale parameters and a fourth plurality of side scale parameters, and wherein the method comprises applying the first stage vector quantizing and the second stage vector quantizing to the third plurality of mid scale parameters of the second frame, and applying the second stage vector quantizing to the fourth plurality of side scale parameters of the second frame and not applying the first stage vector quantizing to the fourth plurality of side scale parameters of the second frame.

32. A non-transitory digital storage medium having stored thereon a computer program for performing, when the computer program is run by a computer, a method of dequantizing a quantized plurality of audio information items, the method comprising:

first stage vector dequantizing a first stage vector quantization result included in the quantized plurality of audio information items to acquire a plurality of intermediate quantized audio information items;

second stage vector dequantizing a second stage vector quantization result included in the quantized plurality of audio information items to acquire a plurality of residual items; and combining the plurality of intermediate quantized information items and the plurality of residual items to acquire a dequantized plurality of audio information items, wherein the quantized plurality of audio information items comprise, for a first frame of a multichannel audio signal, a first plurality of scale parameters for a first channel of a multichannel audio signal and a second plurality of scale parameters for a second channel of the multichannel audio signal, wherein the method comprises applying the first stage vector dequantizing and the second stage vector dequantizing to the first plurality of scale parameters for the first channel and the second plurality of scale parameters for the second channel of the first frame, wherein the quantized plurality of audio information items comprises, for a second frame of the multichannel audio signal, a third plurality of mid scale parameters and a fourth plurality of side scale parameters, and wherein the method comprises applying the first stage vector dequantizing and the second stage vector dequantizing to the third plurality of mid scale parameters of the second frame and applying the second stage vector dequantizing to the fourth plurality of side scale parameters and not applying the first stage vector dequantizing to the fourth plurality of side scale parameters of the second frame.

* * * * *